(12) United States Patent
Kondo

(10) Patent No.: US 7,903,100 B2
(45) Date of Patent: Mar. 8, 2011

(54) IMAGE DISPLAY APPARATUS, IMAGE DISPLAY METHOD, AND SIGNAL PROCESSING APPARATUS

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 1574 days.

(21) Appl. No.: 11/227,686

(22) Filed: Sep. 15, 2005

(65) Prior Publication Data

US 2006/0063595 A1    Mar. 23, 2006

(30) Foreign Application Priority Data

Sep. 17, 2004    (JP) .............................. 2004-270718

(51) Int. Cl.
*G06F 3/038*    (2006.01)
(52) U.S. Cl. ................... 345/204; 361/679.06; 248/917
(58) Field of Classification Search ................. 345/204; 361/679.06, 679.07; 211/163–166; 248/130–133, 248/917–924; 318/568.25; 348/836
See application file for complete search history.

(56) References Cited

U.S. PATENT DOCUMENTS

| | | | | |
|---|---|---|---|---|
| 4,959,645 A | * | 9/1990 | Balz | 340/825.72 |
| 6,007,038 A | * | 12/1999 | Han | 248/371 |
| 6,095,476 A | * | 8/2000 | Mathis | 248/422 |
| 6,466,278 B1 | * | 10/2002 | Harrison et al. | 348/836 |
| 6,724,317 B1 | | 4/2004 | Kitano et al. | |
| 6,778,226 B1 | * | 8/2004 | Eshelman et al. | 348/836 |

FOREIGN PATENT DOCUMENTS

| | | |
|---|---|---|
| JP | 10 237989 | 9/1998 |
| JP | 11 177975 | 7/1999 |
| JP | 2000 200349 | 7/2000 |
| JP | 2000 225047 | 8/2000 |
| JP | 2001 69431 | 3/2001 |
| JP | 2002 44564 | 2/2002 |
| JP | 2003 122339 | 4/2003 |
| JP | 2003 125410 | 4/2003 |
| JP | 2003 150067 | 5/2003 |
| JP | 2004 150196 | 5/2004 |
| JP | 2004 150515 | 5/2004 |

* cited by examiner

*Primary Examiner* — Amare Mengistu
*Assistant Examiner* — Koosha Sharifi
(74) *Attorney, Agent, or Firm* — Frommer Lawrence & Haug LLP; William S. Frommer; Thomas F. Presson

(57) ABSTRACT

An image display apparatus functioning as both an apparatus for displaying an image and a partition includes image display means for displaying the image, reception means for receiving an operational input from a user, and drive control means for driving an actuator for moving the image display means to move the image display means. The drive control means changes the arrangement of the image display apparatus functioning as the partition by moving the image display means on the basis of the operational input received by the reception means.

10 Claims, 29 Drawing Sheets

IMAGE DISPLAY APPARATUS, IMAGE DISPLAY METHOD, AND SIGNAL PROCESSING APPARATUS

CROSS REFERENCES TO RELATED APPLICATIONS

The present invention contains subject matter related to Japanese Patent Application JP 2004-270718 filed in the Japanese Patent Office on Sep. 17, 2004, the entire contents of which are incorporated herein by reference.

BACKGROUND OF THE INVENTION

1. Field of the Invention

The present invention generally relates to an image display apparatus, an image display method, and a signal processing apparatus and, in particular, to an image display apparatus, an image display method, and a signal processing apparatus for providing a convenient apparatus functioning as a plurality of tools, such as a tool for displaying an image and a partition.

2. Description of the Related Art

For example, known television receivers solely serve as apparatuses for displaying an image (and apparatuses for outputting sound). The television receiver that functions as an apparatus only for displaying an image is placed at, for example, a certain position in a room.

The television receiver placed at a certain position in a room need not be basically moved. However, in some cases, a user wants to move the direction of the television screen towards the user's position. To change the direction of the television screen, a television table has been developed.

In addition, a television receiver has been proposed that can rotate itself about an axis normal to a screen of the television receiver for a user watching the screen while lying (refer to, for example, Japanese Unexamined Utility Model Registration Application Publication No. 6-73976).

As described above, known television receivers solely serve as apparatuses for displaying an image.

SUMMARY OF THE INVENTION

Accordingly, there is provided a convenient apparatus functioning as a plurality of tools, such as a tool for displaying an image and a partition.

According to an embodiment of the present invention, an image display apparatus functioning as both a partition and an apparatus for displaying an image includes image display means for displaying the image, reception means for receiving an operational input from a user, and drive control means for driving an actuator for moving the image display means to move the image display means. The drive control means changes the arrangement of the image display apparatus functioning as the partition by moving the image display means on the basis of the operational input received by the reception means.

The image display apparatus can further include motion detection means for detecting motion information on motion of the image displayed on the image display means. In this case, the image display apparatus provides, as an operation mode, a display mode in which the image display apparatus functions as the apparatus for displaying the image and a partition mode in which the image display apparatus functions as the partition. When the partition mode is enabled, the drive control means moves the image display means on the basis of the operational input. When the display mode is enabled, the drive control means moves the image display means on the basis of the motion information detected by the motion detection means.

When the display mode is selected while the partition mode is enabled, the drive control means can move the image display means on the basis of the motion information using a position of the image display means when the display mode is enabled as a reference position.

Additionally, when the display mode is selected while the partition mode is enabled, the drive control means can move the image display means to a default position and moves the image display means on the basis of the motion information using the default position as a reference position.

When the partition mode is selected while the display mode is enabled, the drive control means can move the image display means on the basis of the operational input.

The image display apparatus can further include conversion means for converting an image signal of the image displayed on the image display means to a different image signal having higher image quality than the image displayed on the image display means. The conversion means can include classification means, tap coefficient output means, and computing means. The classification means classifies a pixel of the different image signal into one of a plurality of classes on the basis of the image signal and outputs a class code for representing the class of the pixel. The tap coefficient output means stores a tap coefficient obtained from a learning process for each of the plurality of classes and outputs a tap coefficient of a class indicated by the class code output from the classification means, and the computing means determines a pixel value of the different image signal by performing a computation based on the tap coefficient output from the tap coefficient output means and the image signal.

The tap coefficient output means can store a tap coefficient corresponding to each position of the image display means and corresponding to each of the plurality of classes, and can output a tap coefficient corresponding to a class indicated by the class code output from the classification means and corresponding to the position of the image display means.

According to an embodiment of the present invention, a method of controlling an image display apparatus configured to function as both an apparatus for displaying an image and a partition includes the steps of (a) receiving an operational input from a user and (b) driving an actuator configured to move image display means to move the image display means. Step (b) changes the arrangement of the image display apparatus functioning as the partition by moving the image display means on the basis of the operational input received in step (a).

The method can further include the step of (c) detecting motion information on motion of the image displayed on the image display means. The method can provide, as an operation mode, a display mode in which the image display apparatus functions as the apparatus for displaying the image and a partition mode in which the image display apparatus functions as the partition. When the partition mode is enabled, step (b) can move the image display means on the basis of the operational input and, when the display mode is enabled, step (b) can move the image display means on the basis of the motion information detected in step (c).

According to an embodiment of the present invention, a signal processing apparatus functioning as both an apparatus for processing a signal and furniture includes signal processing means for processing an input signal, reception means for receiving an operational input from a user, and drive control means for controlling drive means for driving the signal processing apparatus on the basis of one of a signal obtained by signal processing of the signal processing means and the operational input received by the reception means.

According to an embodiment of the present invention, a signal processing apparatus functioning as both an apparatus configured to process a signal and furniture includes a signal processing unit configured to process an input signal, a reception unit configured to receive an operational input from a user, and a drive control unit configured to control a drive unit configured to drive the signal processing apparatus on the basis of one of a signal obtained by signal processing of the signal processing unit and the operational input received by the reception unit.

In an image display apparatus and method for displaying an image according to an embodiment of the present invention, the image display apparatus functioning as both an apparatus for displaying an image and a partition receives an operational input from a user and changes the arrangement of the image display apparatus functioning as the partition by moving the image display means using an actuator for moving image display means on the basis of the operational input received by the reception means.

In a signal processing apparatus according to an embodiment of the present invention, a signal processing apparatus functioning as both an apparatus for processing a signal and furniture receives an operational input from a user and controls driving means for driving the signal processing apparatus on the basis of a signal obtained by signal processing of signal processing means or the operational input received by the reception means.

DESCRIPTION OF THE PREFERRED EMBODIMENTS

Figure 1:
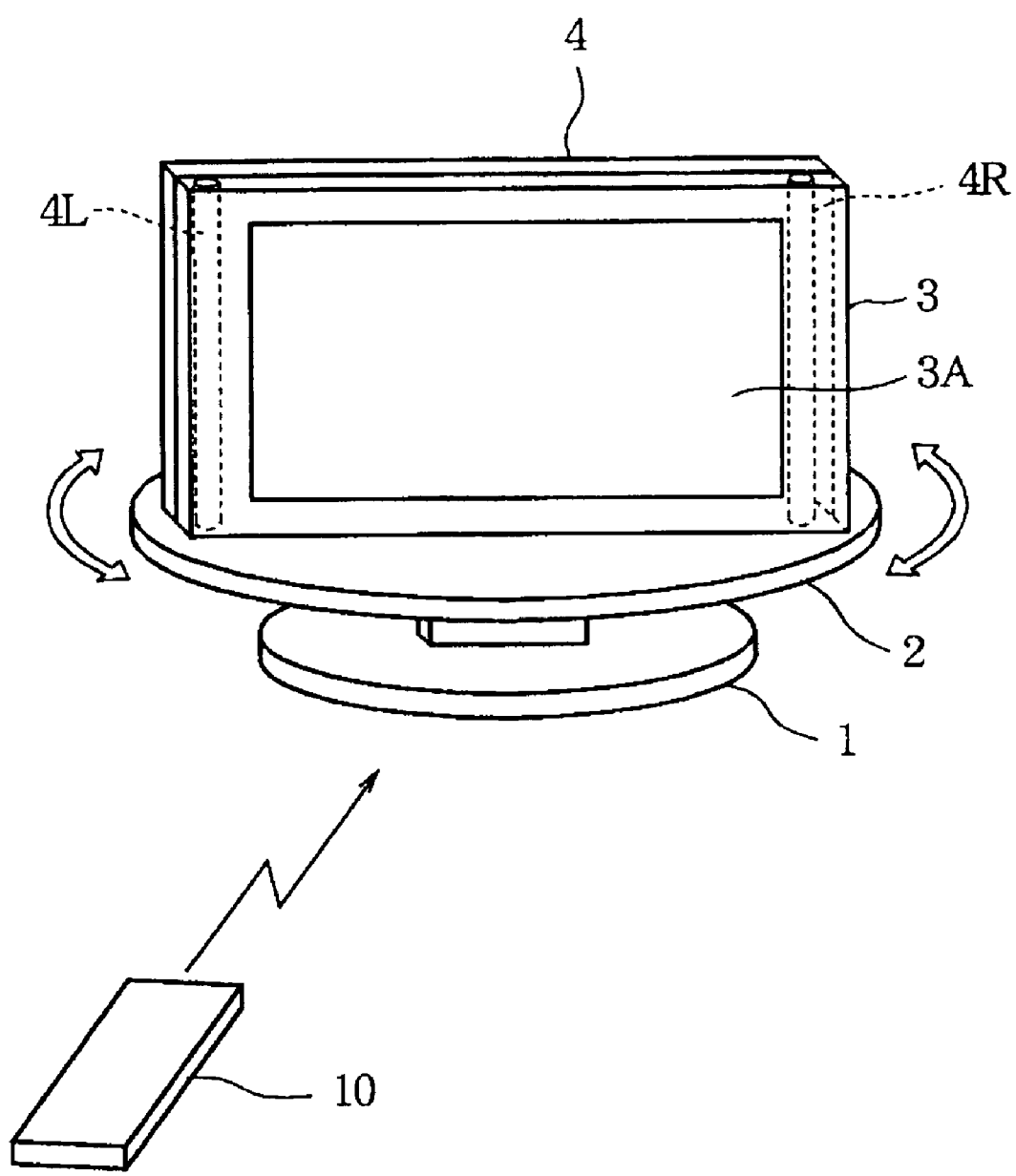
FIG. 1 illustrates a perspective view of a partition TV according to an embodiment of the present invention.

Before describing an embodiment of the present invention, the correspondence between the features of the claims and the specific elements disclosed in an embodiment of the present invention is discussed below. This description is intended to assure that an embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

An image display apparatus according to the claim 1 is characterized in that the apparatus (e.g., a partition TV shown in FIGS. 1 and 5) functions as both an apparatus for displaying an image and a partition. The image display apparatus includes image display means for displaying the image (e.g., a display panel 3 shown in FIG. 5), reception means for receiving an operational input from a user (e.g., a remote control I/F 34 shown in FIG. 8), and drive control means for driving an actuator for moving the image display means to move the image display means (e.g., a drive control unit 42 shown in FIG. 8). The drive control means changes the arrangement of the image display apparatus functioning as the partition by moving the image display means on the basis of the operational input received by the reception means.

An image display apparatus according to the claim 2 is characterized in that the apparatus according to the claim 1 further includes motion detection means (e.g., a motion vector detection unit 41 shown in FIG. 8) for detecting motion information on motion of the image displayed on the image display means. The image display apparatus provides, as an operation mode, a display mode in which the image display apparatus functions as the apparatus for displaying the image and a partition mode in which the image display apparatus functions as the partition. When the partition mode is enabled, the drive control means moves the image display means on the basis of the operational input and, when the display mode is enabled, the drive control means moves the image display means on the basis of the motion information detected by the motion detection means.

An image display apparatus according to the claim 6 is characterized in that the apparatus according to the claim 2 further includes conversion means (e.g., a DRC unit 17 shown in FIG. 8) for converting an image signal of the image displayed on the image display means to a different image signal having higher image quality than the image displayed on the image display means. The conversion means includes classification means (e.g., a classification unit 52 shown in FIG. 9), tap coefficient output means (e.g., a coefficient generation unit 55 shown in FIG. 9), and computing means (e.g., a prediction computing unit 56 shown in FIG. 9). The classification means classifies a pixel of the different image signal into one of a plurality of classes on the basis of the image signal and outputs a class code for representing the class of the pixel, the tap coefficient output means stores a tap coefficient obtained from a learning process for each of the plurality of classes and outputs a tap coefficient of a class indicated by the class code output from the classification means, and the computing means determines a pixel value of the different image signal by performing a computation based on the tap coefficient output from the tap coefficient output means and the image signal.

A method according to the claim 8 controls an image display apparatus (e.g., the partition TV shown in FIGS. 1 and 5) configured to function as both an apparatus for displaying an image and a partition. The method includes the steps of (a) receiving an operational input from a user (e.g., step S31 shown in FIG. 14) and (b) driving an actuator configured to move image display means to move the image display means (e.g., step S32 shown in FIG. 14). Step (b) changes the arrangement of the image display apparatus functioning as the partition by moving the image display means on the basis of the operational input received in step (a).

Figure 15:
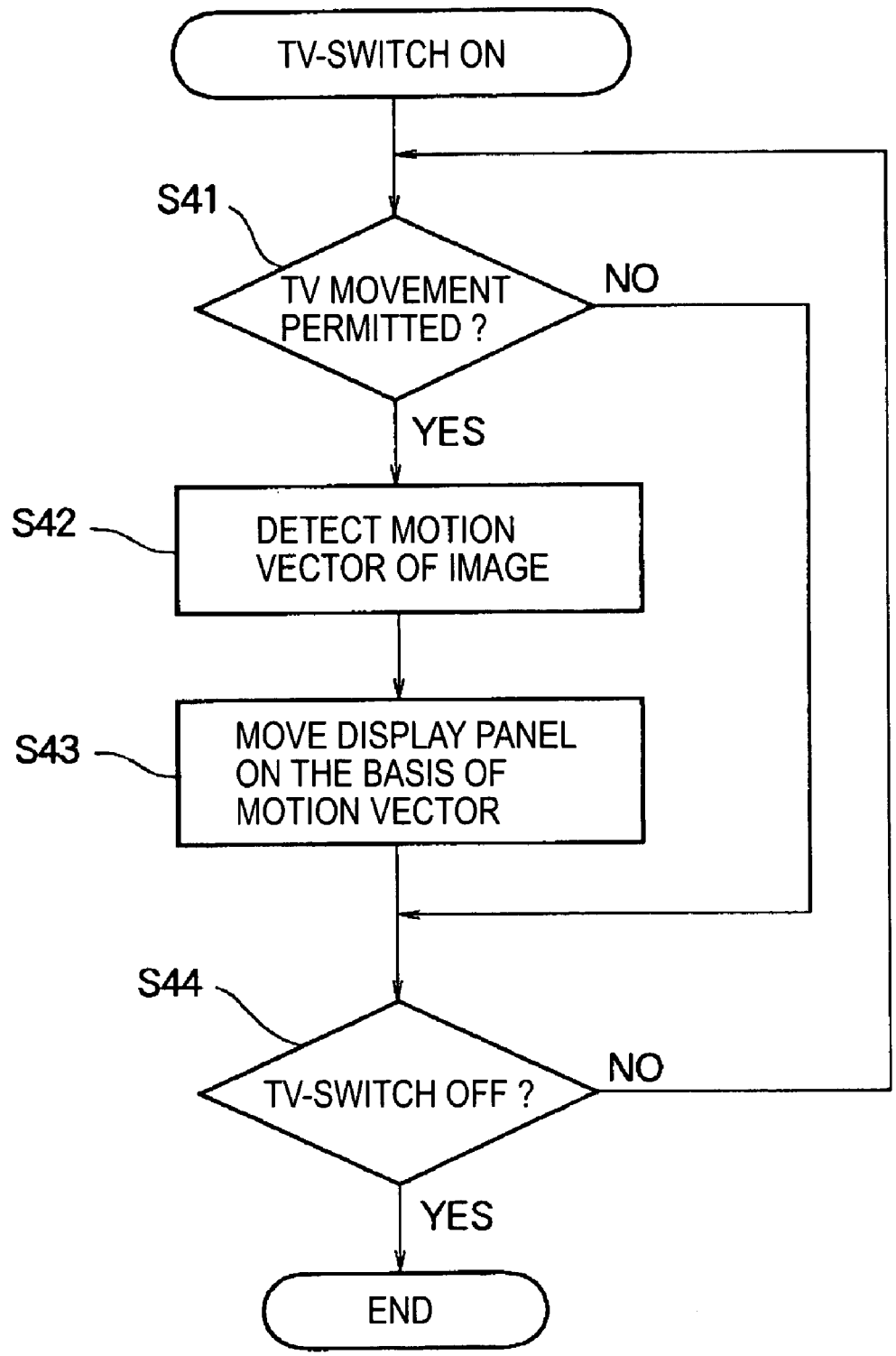
FIG. 15 is a flow chart illustrating the operation of the partition TV when a display mode is enabled.
Figure 16:
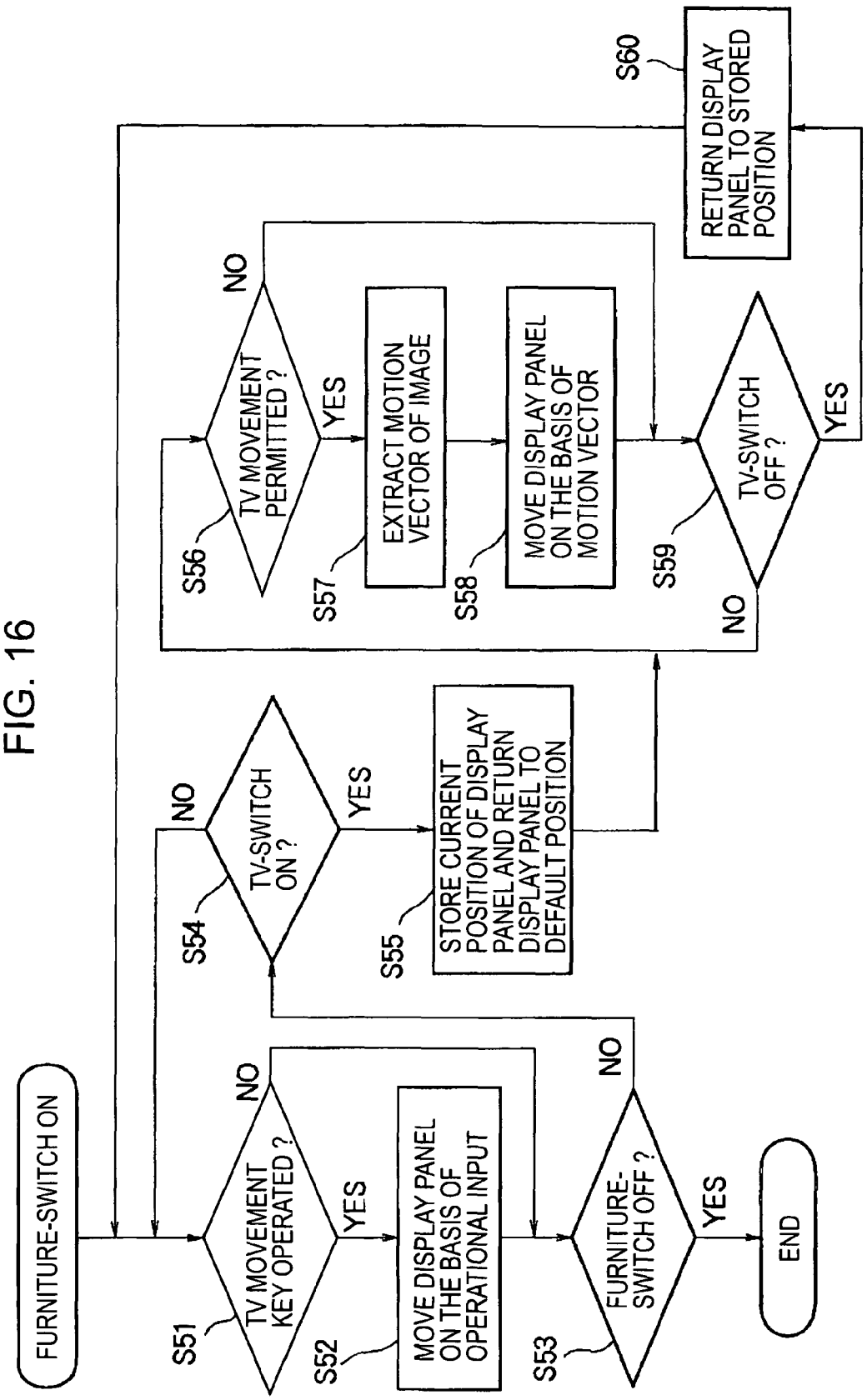
FIG. 16 is a flow chart illustrating the operation of the partition TV when the partition mode is enabled and subsequently the display mode is enabled.

A method according to the claim 9 is characterized in that the method according to the claim 8 further includes the step of (c) detecting motion information on motion of the image displayed on the image display means (e.g., step S42 shown in FIG. 15 or step S57 shown in FIG. 16). The method provides a display mode in which the image display apparatus functions as the apparatus for displaying the image and a partition mode in which the image display apparatus functions as the partition. When the partition mode is enabled, step (b) moves the image display means on the basis of the operational input and, when the display mode is enabled, step (b) moves the image display means on the basis of the motion information detected in step (c).

A signal processing apparatus according to the claim 10 is characterized in that the apparatus (e.g., the partition TV shown in FIGS. 1 and 5) functions as both an apparatus for processing a signal and furniture. The signal processing apparatus includes signal processing means for processing an input signal (e.g., the motion vector detection unit 41 shown in FIG. 8), reception means for receiving an operational input from a user (e.g., the remote control I/F 34 shown in FIG. 8), and drive control means (e.g., the drive control unit 42 shown in FIG. 8) for controlling drive means (e.g., the actuator 43 shown in FIG. 8) for driving the signal processing means on the basis of one of a signal obtained by signal processing of the signal processing means and the operational input received by the reception means.

Embodiments of the present invention are described with reference to the accompanying drawings.

FIG. 1 illustrates a perspective view of a partition TV (partition television) according to an embodiment of the present invention.

The partition TV is a television receiver (image displaying apparatus) functioning as both an apparatus for displaying an image and a partition.

In the partition TV, for example, a circular top panel 2 is mounted on a base frame 1 so that the circular top panel can rotate about its center axis. Additionally, a display panel 3 and a support panel 4 are mounted on the top panel 2.

The display panel 3 has a rectangular flat-plate shape. One surface of the rectangular plate includes a display unit 3A, which is composed of, for example, a liquid crystal panel or a panel of a plasma display screen.

Like the display panel 3, the support panel 4 has a rectangular flat-plate shape. Vertically extending shafts 4L and 4R are attached to the left and right sides of one surface of the rectangular support panel 4, respectively. The support panel 4 is mounted on the top panel 2 along the diameter of the top panel 2 so that the support panel 4 is perpendicular to the top panel 2.

The display panel 3 is attached to the support panel 4 such that the display panel 3 can vertically move along the shafts 4L and 4R of the support panel 4 and the other surface of the display panel 3 opposed to the display unit 3A faces the support panel 4.

Consequently, when the top panel 2 rotates, the display panel 3 can move or rotate about the center axis of the top panel 2 in the counterclockwise direction or the clockwise direction. Additionally, the display panel 3 can vertically move along the shafts 4L and 4R of the support panel 4.

That is, the partition TV shown in FIG. 1 includes an actuator (not shown in FIG. 1) that rotates the top panel 2 and thus the display panel 3 in the counterclockwise direction or the clockwise direction and that vertically moves the display panel 3. The actuator is actuated by a user operating a remote control unit (remote commander) 10. The operating actuator moves the display panel 3.

Figure 2:
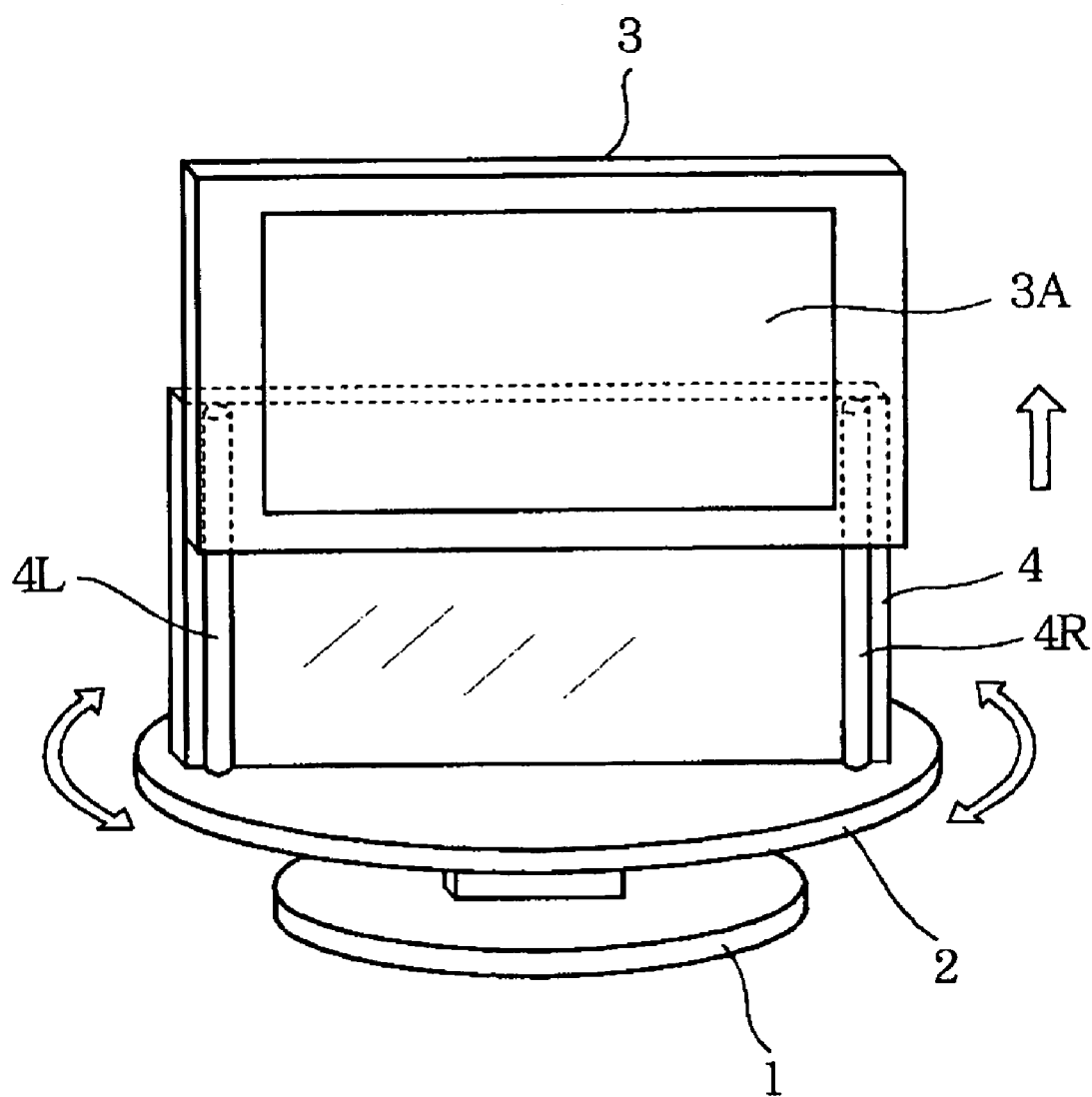
FIG. 2 illustrates a perspective view of the partition TV when a display panel 3 vertically moves upward.

FIG. 2 illustrates the partition TV shown in FIG. 1 when the display panel 3 vertically moves upwards along the shafts 4L and 4R.

Even when the display panel 3 moves upwards, the display panel 3 can rotate in the counterclockwise direction or the clockwise direction together with the rotation of the top panel 2.

The function of the partition TV as a partition is described with reference to FIGS. 3 and 4.

Figure 3:
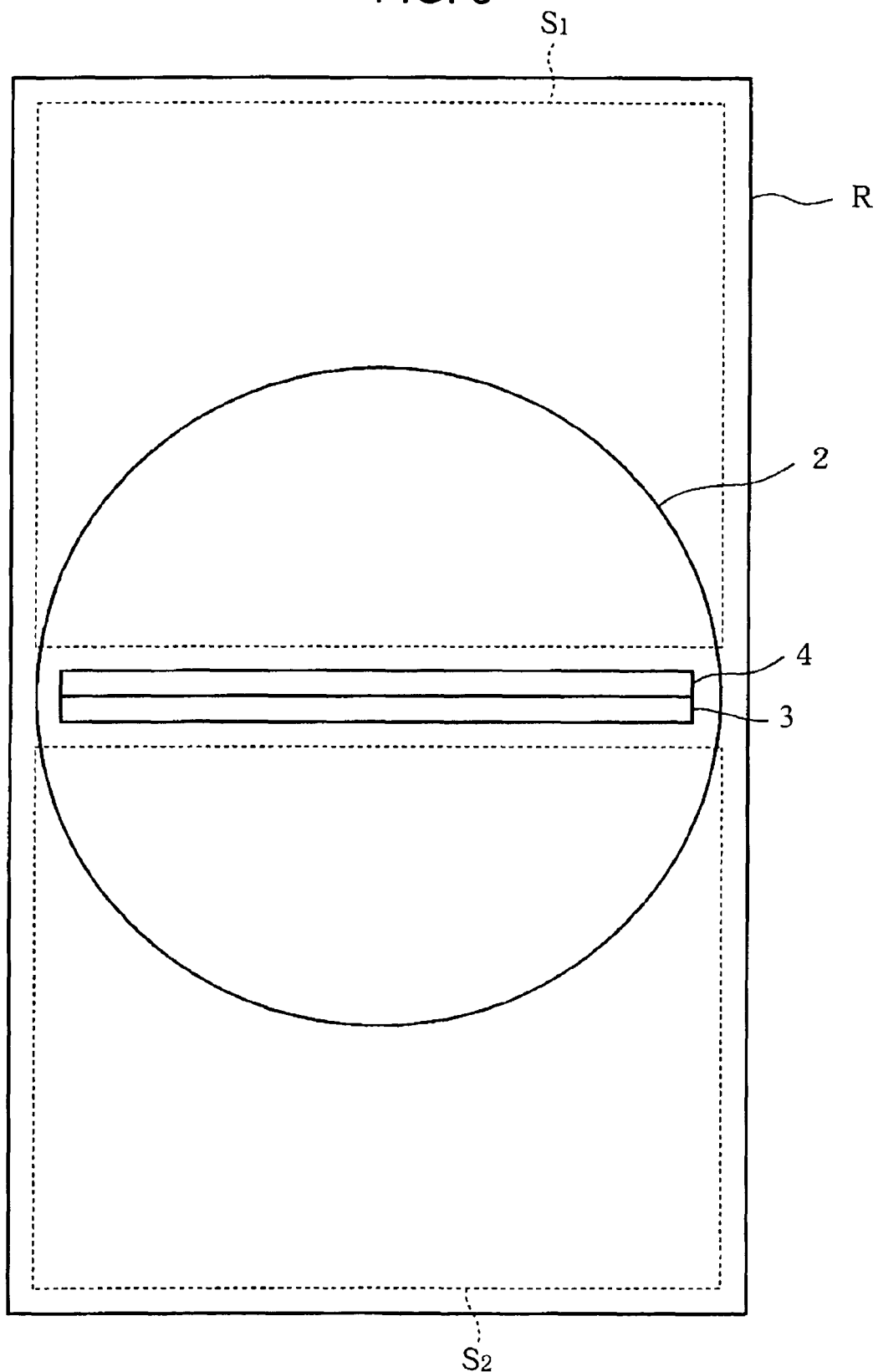
FIG. 3 illustrates a top plan view of an example of the installation layout of the partition TV.

FIG. 3 illustrates an example of the installation layout of the partition TV.

FIG. 3 (FIG. 4 described below) is a top plan view of a room R in which the partition TV is installed.

For example, when partitioning the single room R into two spaces (rooms) $S_1$ and $S_2$, the partition TV is installed so that the center point of the top panel 2 is located on the border line between the spaces $S_1$ and $S_2$. The base frame 1 is sunk into a floor so that the height level of the top panel 2 is identical to that of the floor.

As shown in FIG. 3, by moving the display panel 3 (and the support panel 4) onto the border line between the spaces $S_1$ and $S_2$, the single room R can be separated into the two spaces $S_1$ and $S_2$. In the layout shown in FIG. 3, by moving the display panel 3 downward, the relationship (connection relationship) between the spaces $S_1$ and $S_2$ becomes "thicker". In contrast, by moving the display panel 3 upward, the relationship between the spaces $S_1$ and $S_2$ becomes "thinner". That is, by moving the display panel 3 upward, the spaces $S_1$ and $S_2$ are more clearly separated.

Figure 4:
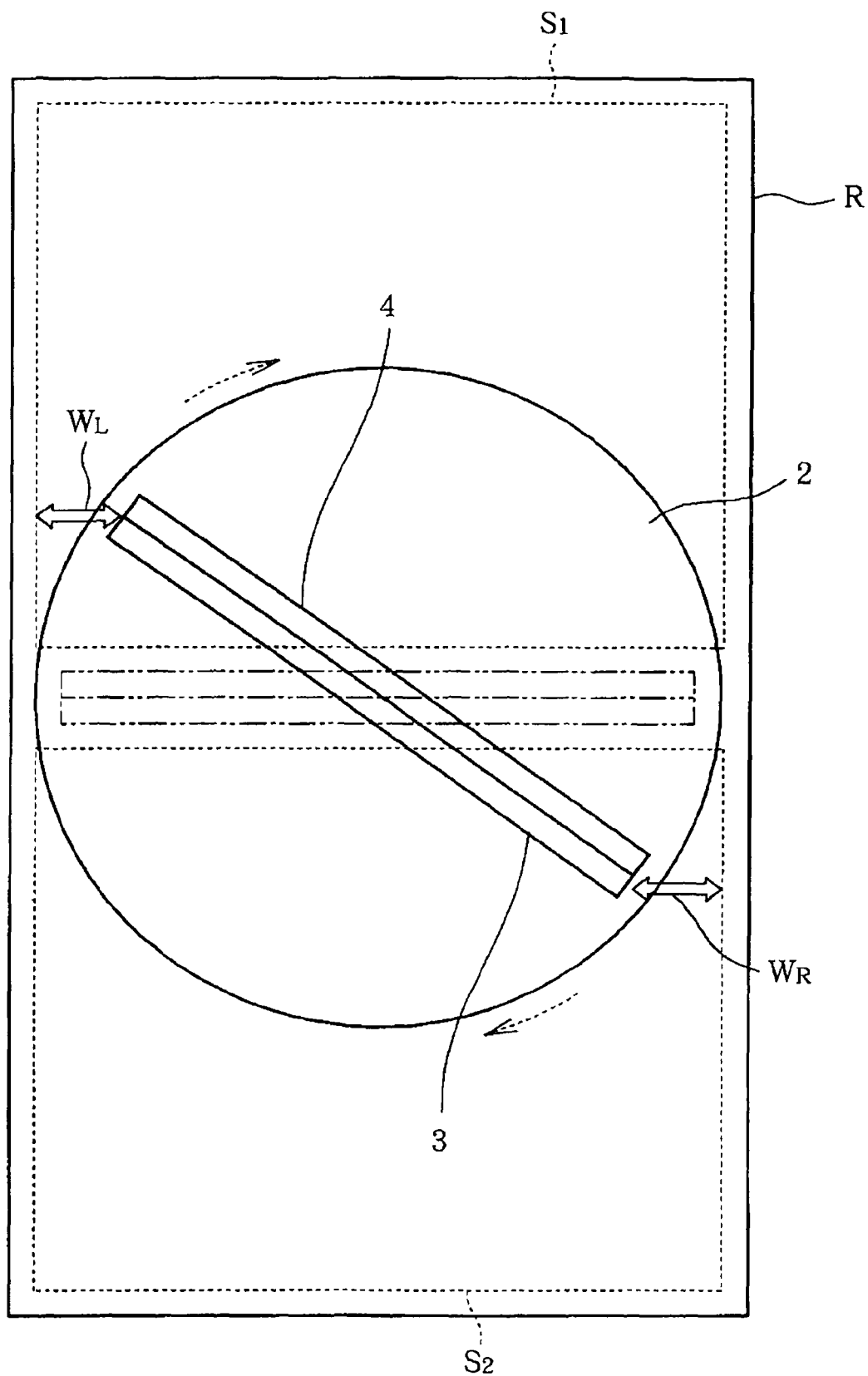
FIG. 4 illustrates a top plan view of another example of the installation layout of the partition TV.

FIG. 4 illustrates another example of the installation layout of the partition TV.

As shown in FIG. 4, the display panel 3 rotates from the position shown in FIG. 3 in the clockwise direction. In this case, walk spaces $W_L$ and $W_R$ are provided on the left and right sides of the room R for a user to pass between the spaces $S_1$ and $S_2$.

Figure 5:
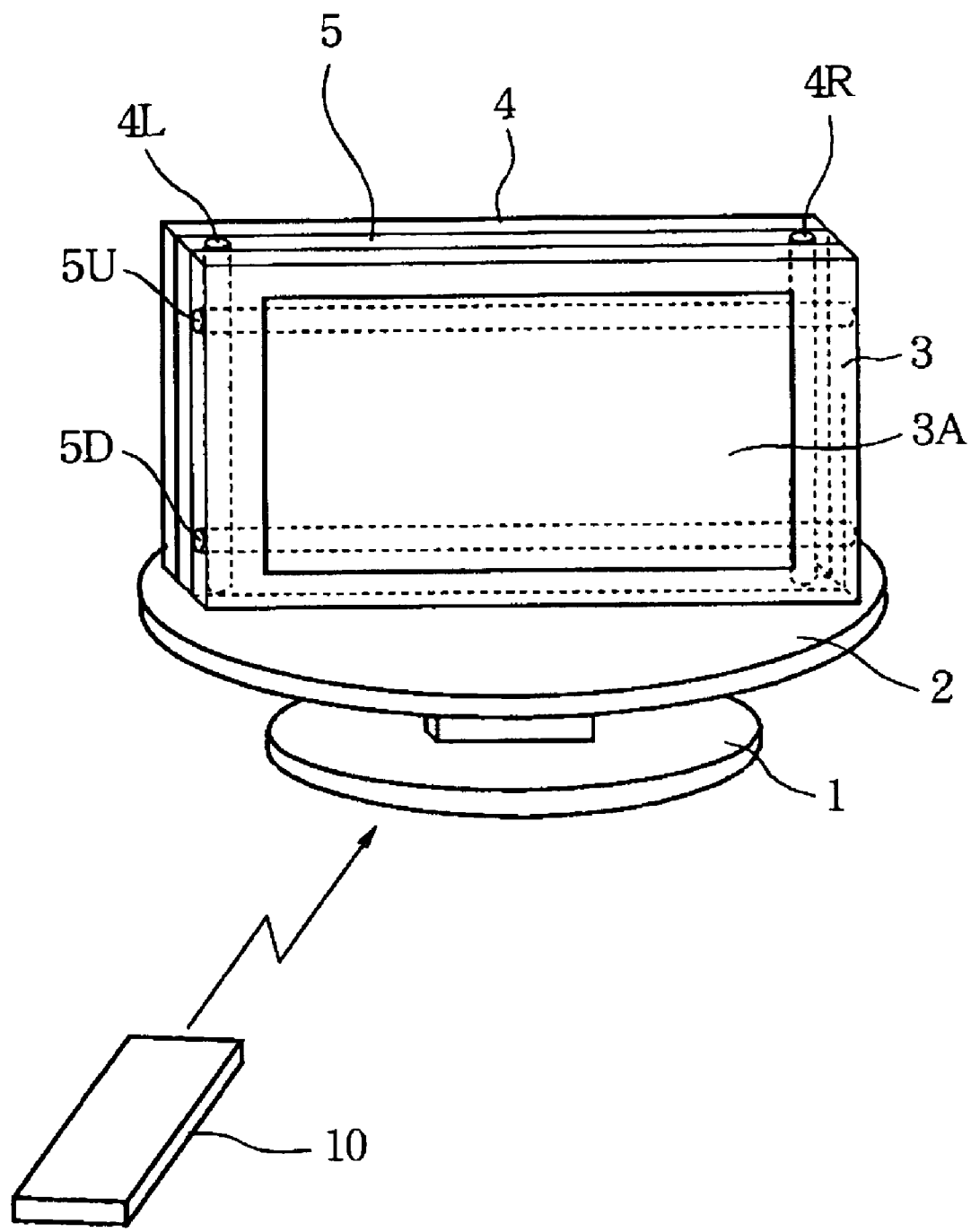
FIG. 5 illustrates a perspective view of a partition TV according to another embodiment of the present invention.

FIG. 5 is a perspective view of a partition TV according to another embodiment of the present invention. In the drawing, identical elements to those illustrated and described in relation to FIG. 1 are designated by identical reference numerals, and therefore, the descriptions are not repeated here. That is, the partition TV shown in FIG. 5 is basically identical to that shown in FIG. 1 except that the partition TV shown in FIG. 5 further includes a support panel 5 between the display panel 3 and the support panel 4.

In the partition TV shown in FIG. 1, the display panel 3 is mounted to the support panel 4. However, in the partition TV shown in FIG. 5, the display panel 3 is mounted to the support panel 5, which is mounted on the support panel 4 secured to the top panel 2.

That is, like the display panel 3 and the support panel 4, the support panel 5 has a rectangular flat-plate shape. Horizontally extending shafts 5U and 5D are attached to the upper and lower sides of one surface of the rectangular support panel 5, respectively.

The display panel 3 is attached to the support panel 5 such that the display panel 3 can horizontally move along the shafts 5U and 5D of the support panel 5 and the other surface of the display panel 3 opposed to the display unit 3A faces the support panel 5.

Additionally, the support panel 5 is attached to the support panel 4 secured to the top panel 2 so that the support panel 5 can vertically move along the shafts 4L and 4R of the support panel 4 and the other surface of the support panel 5 opposed to the display panel 3 faces the support panel 4.

Consequently, like the case shown in FIG. 1, the display panel 3 can rotate about the center axis of the top panel 2 in the counterclockwise direction or the clockwise direction together with the rotation of the top panel 2. Additionally, by vertically moving the support panel 5 along the shafts 4L and 4R of the support panel 4, the display panel 3 attached to the support panel 5 can also move vertically. Furthermore, the display panel 3 can horizontally move along the shafts 5U and 5D of the support panel 5.

That is, the partition TV shown in FIG. 5 includes an actuator (not shown in FIG. 5) that rotates the display panel 3 in the counterclockwise direction or the clockwise direction and that horizontally and vertically moves the display panel 3. The actuator is actuated, for example, by a user operating a remote control unit 10. The operating actuator moves the display panel 3.

Figure 6:
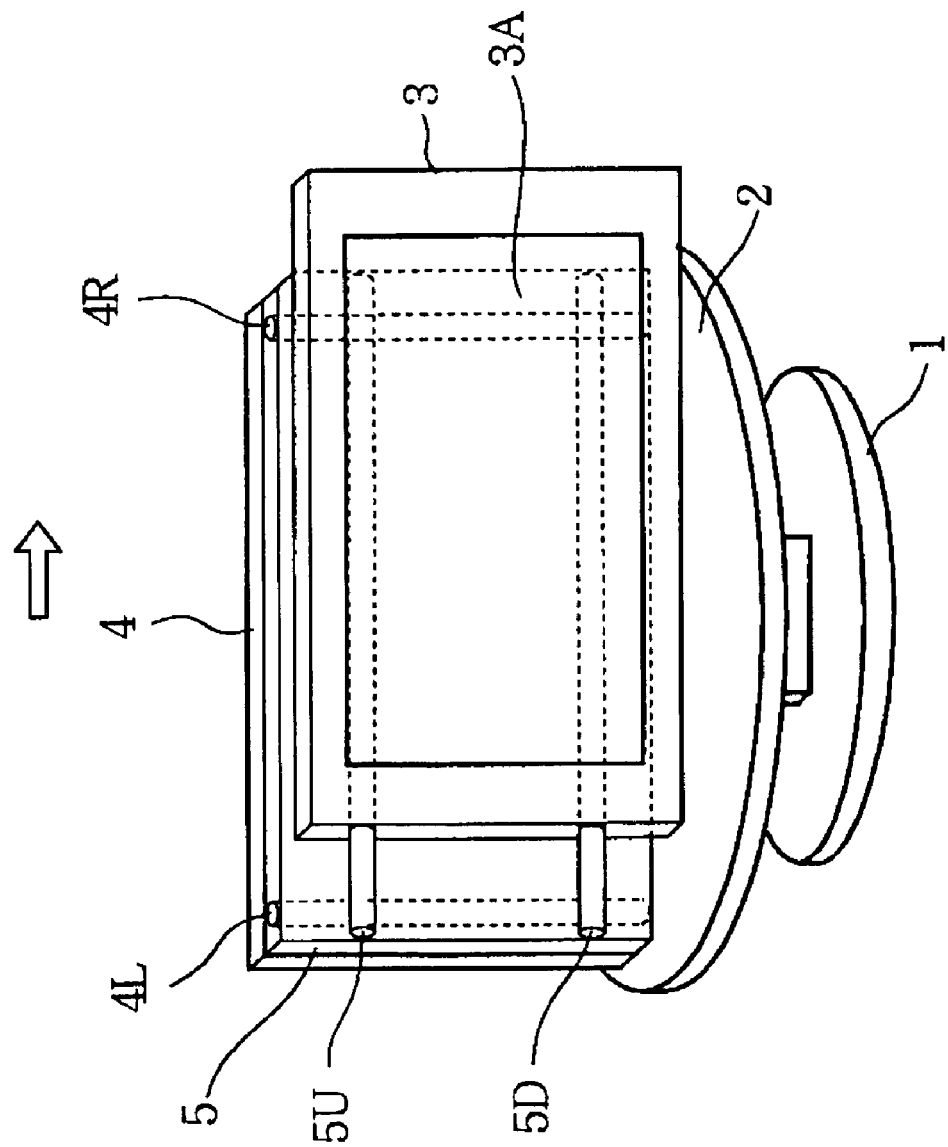
FIG. 6 illustrates a perspective view of the partition TV when a display panel 3 moves to the right.

FIG. 6 illustrates the partition TV shown in FIG. 5 when the display panel 3 horizontally moves to the right along the shafts 5U and 5D.

Even when the display panel 3 moves horizontally, the display panel 3 can rotate in the counterclockwise direction or the clockwise direction together with the rotation of the top panel 2.

Figure 7:
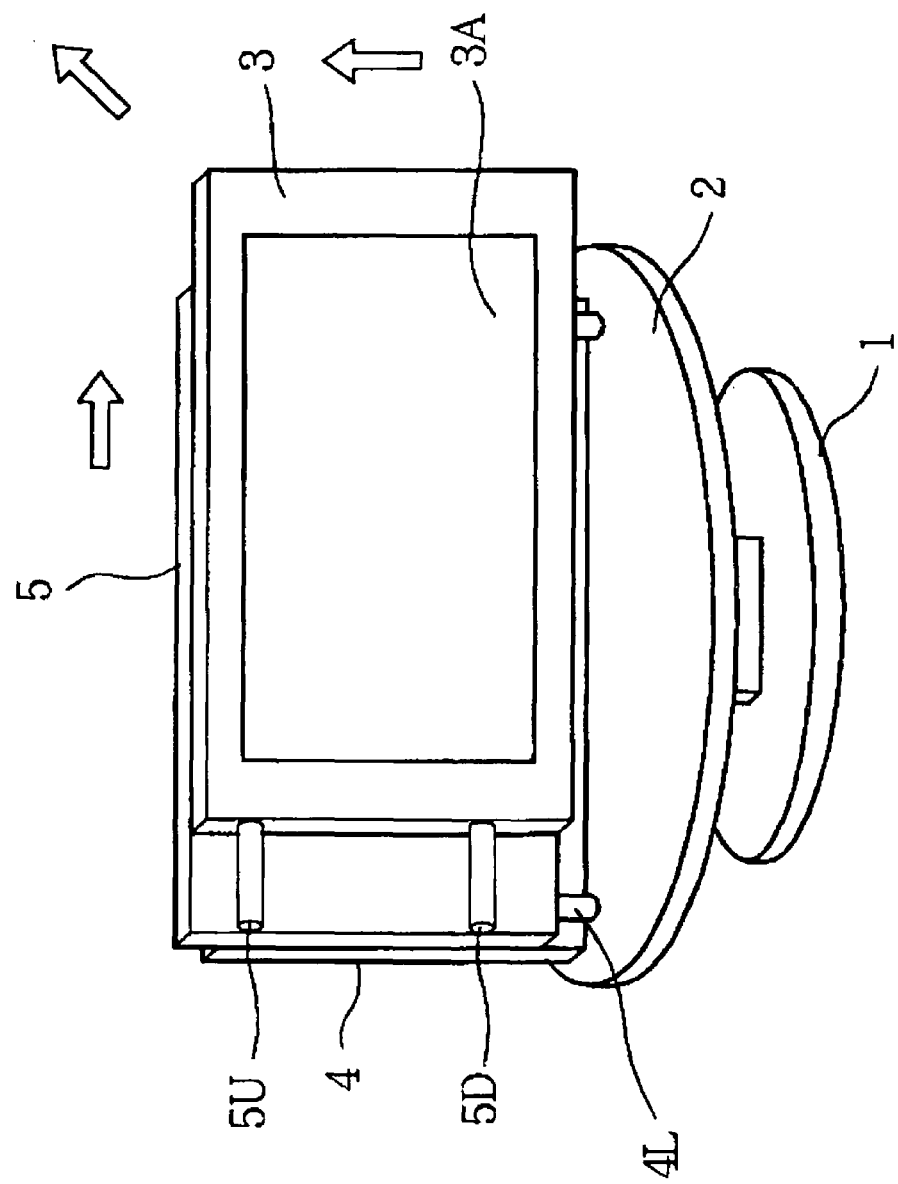
FIG. 7 illustrates a perspective view of the partition TV when the display panel 3 moves to the upper right.

FIG. 7 illustrates the partition TV shown in FIG. 5 when the display panel 3 horizontally moves to the right along the shafts 5U and 5D, the support panel 5 vertically moves upward, and the display panel 3 mounted to the support panel 5 also moves upward.

Since the display panel 3 moves to the right along the shafts 5U and 5D and the support panel 5 holding the display panel 3 moved upward along the shafts 4L and 4R, the display panel 3 can move in a direction towards the upper right corner.

In addition, the partition TV shown in FIG. 5 can move the display panel 3 in any direction on a plane perpendicular to the top panel 2.

Furthermore, in the partition TV shown in FIG. 5, by rotating the top panel 2, the display panel 3 can rotate in the counterclockwise direction or the clockwise direction even when, for example, the display panel 3 moves in a direction towards the upper right corner, as shown in FIG. 7.

Figure 8:
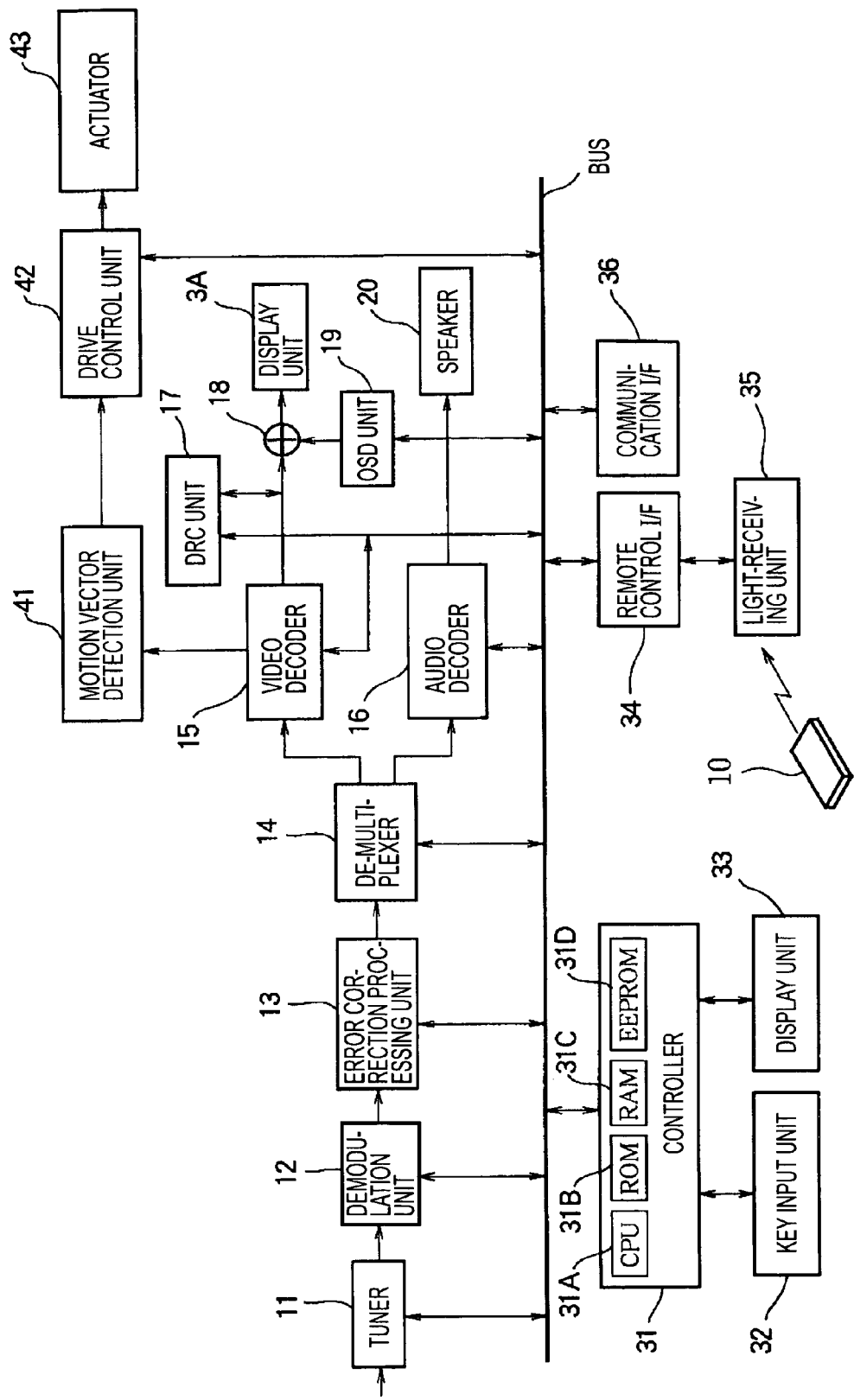
FIG. 8 is a block diagram of the electrical configuration of a partition TV.

FIG. 8 is a block diagram of the electrical configuration of the partition TV shown in FIG. 1 or 5.

A tuner 11 is supplied with a broadcast signal of digital broadcast received by an antenna (not shown). For example, the broadcast signal of digital broadcast is digital data defined by the moving picture experts group (MPEG) 2 and is a broadcast signal of a transport stream (TS) consisting of a plurality of TS packets. Under the control of a controller 31, the tuner 11 selects a broadcast signal of a predetermined channel (frequency) from among broadcast signals of a plurality of channels supplied from the antenna. The tuner 11 then delivers the broadcast signal of the selected channel to a demodulation unit 12.

Under the control of the controller 31, the demodulation unit 12 demodulates a transport stream of the broadcast signal of the predetermined channel delivered from the tuner 11 into a transport stream using, for example, the quadrature phase shift keying (QPSK) technique. The demodulated transport stream is then delivered to an error correction processing unit 13.

Under the control of the controller 31, the error correction processing unit 13 detects and corrects an error in the transport stream delivered from the demodulation unit 12. The error-corrected transport stream is then delivered to a de-multiplexer 14.

Under the control of the controller 31, the de-multiplexer 14 descrambles the transport stream delivered from the error correction processing unit 13 as needed. The de-multiplexer 14 also extracts a TS packet of a predetermined program from the transport stream delivered from the error correction processing unit 13 by referencing a packet identifier (PID) of the TS packet under the control of the controller 31.

Thereafter, the de-multiplexer 14 delivers video data (a TS packet containing the video data), which is one of the TS packets of the predetermined program, to a video decoder 15 and delivers audio data (a TS packet containing the audio data), which is one of the TS packets of the predetermined program, to the video decoder 15.

The video decoder 15 decodes the video data delivered from the de-multiplexer 14 using the MPEG-2 method and delivers the decoded video data to a digital reality creation (DRC) unit 17, a combining unit 18, and a motion vector detection unit 41.

An audio decoder 16 decodes the audio data delivered from the de-multiplexer 14 using the MPEG-2 method and delivers the decoded audio data to a speaker 20 to output it.

The DRC unit 17 converts an image signal (the video data) output from the video decoder 15, which is a first image signal, to a high-quality image signal (video data), which is a second image signal. The DRC unit 17 then delivers (outputs) the high-quality image signal to the combining unit 18. As used herein, the high-quality image signal refers to, for example, a high-quality image signal whose resolution is improved.

When the image signal is delivered from the DRC unit 17, the combining unit 18 selects that image signal. In contrast, when no image signal is delivered from the DRC unit 17, the combining unit 18 selects the image signal delivered from the video decoder 15. Additionally, the combining unit 18 overlaps an image signal delivered from an on screen display (OSD) unit 19 with the image signal delivered from either video decoder 15 or DRC unit 17, and supplies it to the display unit 3A to display it. If no image signal is delivered from the OSD unit 19, the combining unit 18 directly supplies the selected one of the image signals delivered from the video decoder 15 and the DRC unit 17 to the display unit 3A to display it.

Under the control of the controller 31, the OSD unit 19 generates, for example, image signals for the currently selected channel number and the sound volume and delivers them to the combining unit 18.

The controller 31 includes a central processing unit (CPU) 31A, a read only memory (ROM) 31B, a random access memory (RAM) 31C, and an electrically erasable and programmable ROM (EEPROM) 31D. The CPU 31A executes programs stored in the ROM 31B and the EEPROM 31D. The CPU 31A also executes programs loaded in the RAM 31C. The ROM 31B stores a program to be executed first when power is supplied to the controller 31 and data required for the program. The EEPROM 31D stores a variety of application programs to be executed by the CPU 31A and data required for the programs. The application program to be executed by the CPU 31A is loaded in the RAM 31C from the EEPROM 31D. The RAM 31C also stores data required for the execution of the CPU 31A.

The EEPROM 31D also stores flags, which are described below, in addition to the application programs. Furthermore, the EEPROM 31D stores data to be held after the partition TV is powered off. That is, the EEPROM 31D stores the channel selected and the sound volume set immediately before the power is turned off. Next time the power is turned on, the CPU 31A determines the channel and the sound volume to be the previously selected or set ones by referencing the data stored in the EEPROM 31D.

In the controller 31, the CPU 31A carries out a variety of processes including processes described below by executing the programs stored in the ROM 31B and the EEPROM 31D, and the programs loaded in the RAM 31C. Thus, the controller 31 controls, for example, the tuner 11, the demodulation unit 12, the error correction processing unit 13, the de-multiplexer 14, the video decoder 15, the audio decoder 16, the DRC unit 17, the OSD unit 19, and a drive control unit 42. In addition, in the controller 31, the CPU 31A carries out a variety of processes on the basis of operation signals (operational inputs) corresponding to the user operations input via a key input unit 32 and a remote control interface 34.

The programs to be executed by the CPU 31A can be preinstalled in the ROM 31B and the EEPROM 31D. The programs can be supplied as package software by being temporarily or permanently stored (recorded) in a removable recoding medium, such as a flexible disk, a compact disc read only memory (CD-ROM), a magneto optical (MO) disk, a digital versatile disc (DVD), a magnetic disk, and a semiconductor memory.

Furthermore, the programs can be wirelessly transferred to the partition TV from a download site via an artificial satellite for digital satellite broadcast or can be transferred to the partition TV by wire from the download site via a network, such as a local area network (LAN) or the Internet. The partition TV can install the transferred programs in the EEPROM 31D by receiving the programs with a communication interface (I/F) 36, which is described below.

The key input unit 32 is composed of, for example, switch buttons to input the user operation, such as a desired channel selection. The key input unit 32 then delivers an operation signal corresponding to the user operation to the controller 31. A display unit 33 displays, for example, a channel selected by the tuner 11 and information set for the partition TV on the basis of the control signal delivered from the controller 31.

The remote control interface (I/F) 34 receives the operation signal corresponding to the user operation supplied from a light-receiving unit 35 and delivers the signal to the controller 31. The light-receiving unit 35 receives an infrared or radio operation signal corresponding to the user operation transmitted from the remote control unit 10 and delivers the signal to the remote control I/F 34.

Under the control of the controller 31, the communication I/F 36 controls communications with a network, such as the Internet and a LAN, to transmit data including a program to the network and receive data from the network.

The motion vector detection unit 41 detects a motion vector, which is information about motion of an image displayed on the display unit 3A of the display panel 3, from an image signal delivered from the video decoder 15. The motion vector detection unit 41 then delivers the motion vector to the drive control unit 42.

That is, the motion vector detection unit 41 detects "full screen" motion in each frame (or field). For example, when an image is captured by a camera horizontally panning or vertically tilting, the motion vector detection unit 41 detects a motion vector representing the full screen motion of the image caused by the panning or tilting action and delivers the motion vector to the drive control unit 42.

The motion vector representing full screen motion can be detected not only from the image signal delivered from the video decoder 15 but also from, for example, a motion vector in each macro block contained in video data to be decoded by the video decoder 15. That is, for a P (predictive) picture or a B (bi-directionally predictive) picture in video data to be decoded by the video decoder 15, when motion vectors of all macro blocks in a frame are substantially the same, an average value of the motion vectors of all the macro blocks or one of the motion vectors can be detected as a motion vector representing the full screen motion.

The drive control unit 42 drives an actuator 43 for moving the display panel 3 to move the display panel 3 on the basis of the motion vector from the motion vector detection unit 41 and the control of the controller 31.

The actuator 43 is controlled by the drive control unit 42 to drive the top panel 2, the display panel 3, and the support panel 5. Thus, the actuator 43 moves the display panel 3. The actuator 43 can be composed of, for example, a motor.

In the partition TV having such a structure, the tuner 11 selects a transport stream of a specific channel (frequency range) from among transport streams of broadcast signals of digital broadcast received the antenna and delivers the selected transport stream to the de-multiplexer 14 via the demodulation unit 12 and the error correction processing unit 13. The de-multiplexer 14 selects a TS packet for the specific program from the supplied transport streams and delivers the TS packet of video data and the TS packet of audio data to the video decoder 15 and the audio decoder 16, respectively.

The video decoder 15 MPEG-decodes the video data in the TS packet delivered from the de-multiplexer 14. The resultant image signal is delivered to the DRC unit 17. The DRC unit 17 converts the image signal from the video decoder 15 to a high-quality image signal, which is delivered to the display unit 3A. Thus, the display unit 3A displays a high-quality image.

The audio decoder 16 MPEG-decodes the audio data in the TS packet delivered from the de-multiplexer 14. The resultant audio signal is delivered to the speaker 20, which outputs the audio signal.

The image signal output from the video decoder 15 is delivered not only to the DRC unit 17 but also to the motion vector detection unit 41. The motion vector detection unit 41 detects a motion vector representing full screen motion on a frame basis and delivers it to the drive control unit 42.

The drive control unit 42 drives the actuator 43 on the basis of the motion vector from the motion vector detection unit 41. Thus, the display panel 3 moves in accordance with the motion vector.

Additionally, the drive control unit 42 receives an operation signal from the controller 31.

That is, if a user operates the remote control unit 10 to move the display panel 3, the light-receiving unit 35 receives an operation signal corresponding to the operation and delivers the operation signal to the remote control I/F 34. The remote control I/F 34 receives the operation signal from the light-receiving unit 35 and delivers it to the controller 31. The controller 31 delivers the operation signal from the remote control I/F 34 to the drive control unit 42.

The drive control unit 42 drives the actuator 43 on the basis of the operation signal from the controller 31. Thus, the display panel 3 moves in accordance with the user operation on the remote control unit 10.

Figure 9:
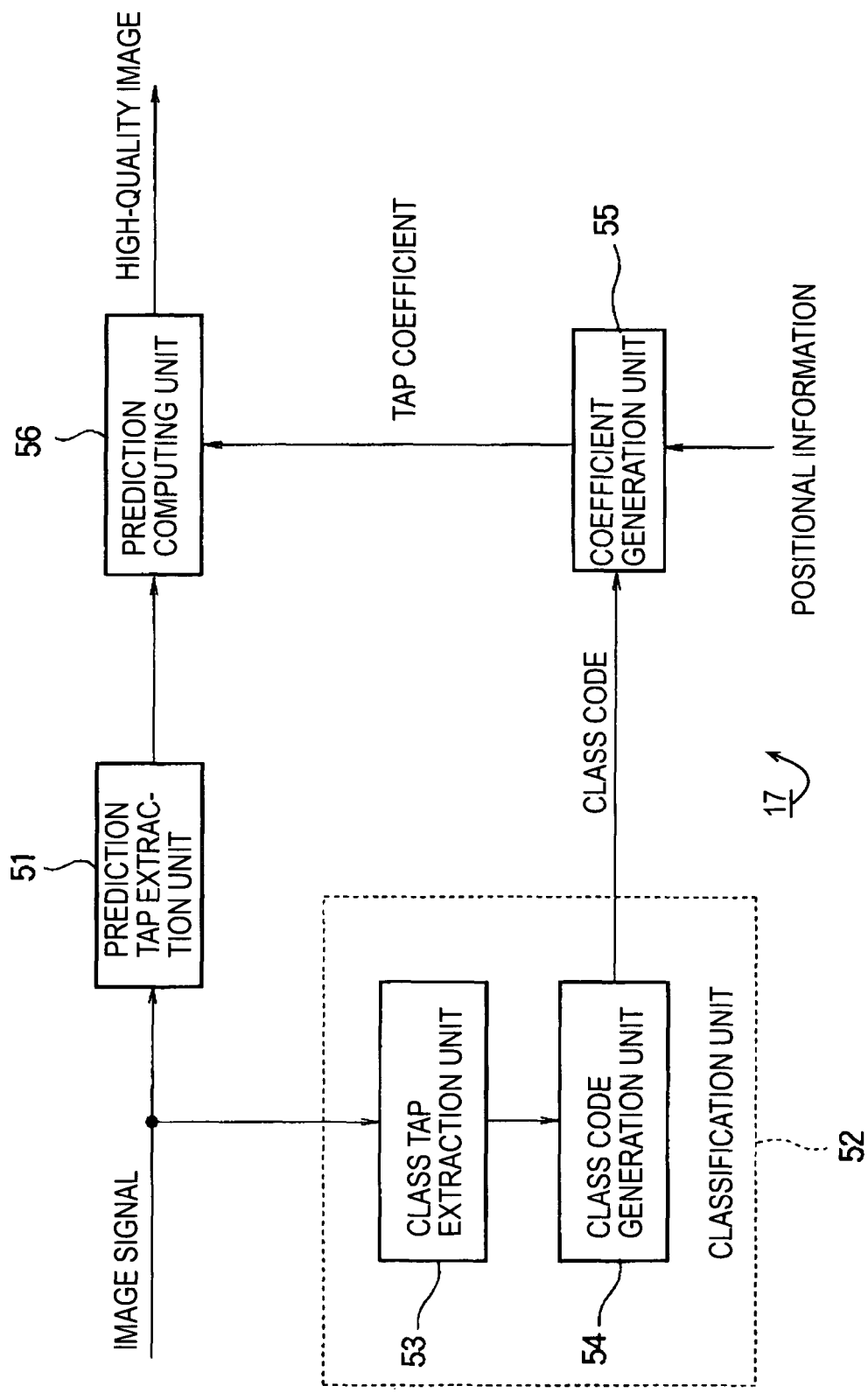
FIG. 9 is a block diagram of an example of the configuration of a DRC unit 17.

FIG. 9 is a block diagram of the detailed structure of the DRC unit 17 shown in FIG. 8.

As described above, the DRC unit 17 converts an image signal delivered from the video decoder 15, which is the first image signal, to a high-quality (high-resolution) image signal (another image signal), which is the second image signal.

That is, in the DRC unit 17, the image signal delivered from the video decoder 15 is supplied to a prediction tap extraction unit 51 and a class tap extraction unit 53 of a classification unit 52 as the first image signal.

The prediction tap extraction unit 51 sequentially determines a pixel of interest which forms the second image signal and extracts some of pixels (and pixel values) which form the first image signal and which are used for estimating the pixel value of the pixel of interest. The extracted pixels serve as a prediction tap.

More specifically, the prediction tap extraction unit 51 extracts, from the first image signal, a plurality of pixels (and pixel values) which are spatially or temporally located in the vicinity of a pixel in the first image signal that corresponds to the pixel of interest. The extracted pixel values are delivered to a prediction computing unit 56 as a prediction tap.

The classification unit 52 includes the class tap extraction unit 53 and a class code generation unit 54. The classification unit 52 carries out classification of the pixel of interest in accordance with the image signal (the first image signal) from the video decoder 15.

That is, the class tap extraction unit 53 extracts, as a class tap, some of pixels in the first image signal used for the classification in which the pixel of interest is classified into one of a plurality of classes.

More specifically, the class tap extraction unit 53 extracts, from the first image signal, a plurality of pixels (and pixel values) which are spatially or temporally located in the vicinity of a pixel in the first image signal that corresponds to the pixel of interest. The extracted pixel values are delivered to the class code generation unit 54 as a class tap.

The prediction tap and the class tap may have the same structure. Alternatively, the prediction tap and the class tap may have different structures.

The class code generation unit 54 carries out classification in which the pixel of interest is classified into one of a plurality of classes on the basis of the level of the pixels (i.e., pixel values) which are in the class tap from the class tap extraction unit 53 and which are distributed in a spatial or temporal direction in order to generate a class code representing the class of the pixel of interest. The class code is delivered to a coefficient generation unit 55.

Examples of the classification method include a method using the adaptive dynamic range coding (ADRC).

In the ADRC method, pixel values of pixels of the class tap is processed using the ADRC to obtain an ADRC code. The class of the pixel of interest is determined in accordance with the obtained ADRC code.

In the K-bit ADRC, for example, the maximum value MAX and the minimum value MIN of pixel values of pixels of the class tap are detected. DR(=MAX−MIN) is considered to be a local dynamic range of a set. The pixel values of the class tap is re-quantized into K bits on the basis of the dynamic range DR. That is, the minimum value MIN is subtracted from the pixel value of each pixel of the class tap. The resultant value is divided by $DR/2^K$ (quantization). K-bit pixel values of pixels of the class tap obtained by the above-described computation are arranged in a predetermined order to generate a bit string. This bit string is output as an ADRC code.

For example, the class code generation unit 54 performs 1-bit ADRC and outputs the resultant ADRC code to the coefficient generation unit 55 as a class code of the pixel of interest.

The coefficient generation unit 55 receives positional information indicating the position of the display panel 3 from the controller 31 as well as the class code from the class code generation unit 54. That is, as shown in FIG. 8, the controller 31 receives the amount of driving the actuator 43 from the drive control unit 42 to determine the position of the display panel 3. The controller 31 then delivers the positional information indicating the position of the display panel 3 to the coefficient generation unit 55.

Here, the controller 31 considers this position of the display panel 3 to be a default position. The controller 31 then determines the position of the display panel 3 using the amount of driving the actuator 43 and the default position as a reference. The default position of the display panel 3 may be, for example, a position at which the rotation angle of the top panel 2 is zero degree and at which the display panel 3 and the support panel 5 are located at the same position as the support panel 4 secured to the top panel 2.

The coefficient generation unit 55 stores a tap coefficient that is for each class obtained by learning described below and that is for each of a plurality of positions of the display panel 3. The coefficient generation unit 55 selects a tap coefficient for each class corresponding to the position closest to the position indicated by the positional information delivered from the controller 31. The coefficient generation unit 55 further selects a tap coefficient for a class corresponding to the class code supplied by the class code generation unit 54 from the tap coefficients for the classes and delivers (outputs) it to the prediction computing unit 56.

As used herein, the term "tap coefficient" refers to a coefficient that is multiplied by input data in a "tap" of a digital filter.

The prediction computing unit 56 obtains a prediction tap output from the prediction tap extraction unit 51 and the tap coefficient output from the coefficient generation unit 55. The prediction computing unit 56 then carries out a predetermined prediction calculation for calculating a prediction value of the actual value of the pixel of interest. Thus, the prediction computing unit 56 calculates a pixel value (prediction value) of the pixel of interest, namely, a pixel value of a pixel of the second image signal.

In this embodiment, the coefficient generation unit 55 stores a tap coefficient that is for each class obtained by learning described below and that is for each of a plurality of positions of the display panel 3. Alternatively, the coefficient generation unit 55 may store a set of tap coefficients for each class independent of the position of the display panel 3 and may deliver the tap coefficients of a class corresponding to the class code delivered from the class code generation unit 54 to the prediction computing unit 56.

Additionally, a DRC unit for audio signals having the same configuration as the DRC unit 17 can be further provided between the audio decoder 6 of the partition TV shown in FIG. 8 and the speaker 20. In this case, the newly installed DRC unit for audio signals converts the output of the audio decoder 16, which is a first audio signal, to a second high-quality (high-fidelity) audio signal to output it to the speaker 20.

The prediction calculation of the prediction computing unit 56 shown in FIG. 9 and the learning of a tap coefficient used for the prediction calculation are described next.

Here, a high-quality (high-resolution) image signal is considered to be a second image signal. The quality (resolution) of the high-resolution image signal is degraded by, for example, filtering using a low pass filter (LPF). Thus, a first image signal having low quality (resolution) is generated. A prediction tap is extracted from the low-resolution image signal. A pixel value of a high-resolution pixel is predicted with a predetermined prediction calculation using the prediction tap and a tap coefficient.

For example, if a linear first order prediction calculation is employed as the predetermined prediction calculation, a pixel value y of a high-resolution pixel is obtained by the following linear first order equation:

$$y = \sum_{n=1}^{N} W_n X_n \qquad (1)$$

where $x_n$ is an nth pixel of the low-resolution image signal (hereinafter appropriately referred to as a "low-resolution pixel"), which is an element of the prediction tap for the high-resolution pixel value y, and $W_n$ is an nth tap coefficient multiplied by the nth low-resolution pixel value. In equation (1), the prediction tap includes N low-resolution pixels $x_1$, $x_2, \ldots, x_N$.

The pixel value y of a high-resolution pixel can be calculated by using a high-order equation higher than second order in place of the first-order equation shown in equation (1).

Let the actual pixel value of the high-resolution pixel in the kth sample be $y_k$ and let the prediction value of the actual value $y_k$ obtained by equation (1) be $y_k'$. The prediction error $e_k$ is expressed as follows:

$$e_k = y_k - y_k' \qquad (2)$$

Since the prediction value $y_k'$ in equation (2) is obtained by equation (1), $y_k'$ in equation (2) is replaced by equation (1) as follows:

$$e_k = y_k - \left( \sum_{n=1}^{N} W_n X_{n,k} \right) \qquad (3)$$

where $x_{n,k}$ represents the nth low-resolution pixel in the prediction tap for a high-resolution pixel of the kth sample.

A tap coefficient $w_n$ that makes the prediction error $e_k$ in equation (3) (or equation (2)) zero is the optimum one for predicting the pixel value of high-resolution pixel. However, in general, it is difficult to obtain such tap coefficient $w_n$ for every high-resolution pixel.

Therefore, to determine whether the tap coefficient $w_n$ is the optimum one or not, the least-square method, for example, can be employed. In this case, the optimum tap coefficient $w_n$ can be obtained by making a total sum E of the squared errors in the following equation minimum.

$$E = \sum_{k=1}^{K} e_k^2 \qquad (4)$$

Here, K represents the number of samples of a set of a high-resolution pixel $y_k$ and low-resolution pixels $x_{1,k}$, $x_{2,k}, \ldots, x_{N,k}$ of a prediction tap of the high-resolution pixel $y_k$, namely, the number of training samples.

As shown by the following equation (5), the minimum value of the total sum E of the squared errors in equation (4) can be expressed as $w_n$ making the partial-differentiation of the total sum E with respect to $w_n$ zero.

$$\frac{\partial E}{\partial W_n} = e_1 \frac{\partial e_1}{\partial W_n} + e_2 \frac{\partial e_2}{\partial W_n} + \ldots + e_k \frac{\partial e_k}{\partial w_n} = 0 (n = 1, 2, \ldots, N) \qquad (5)$$

When the above-described equation (3) is partially differentiated with respect to the tap coefficient $w_n$, the following equation is obtained.

$$\frac{\partial e_k}{\partial w_1} = -x_{1,k}, \frac{\partial e_k}{\partial w_2} = -x_{2,k}, \ldots, \frac{\partial e_k}{\partial w_n} = -x_{N,k} (k = 1, 2, \ldots, K) \qquad (6)$$

Equations (5) and (6) give the following equation.

$$\sum_{k=1}^{K} e_k x_{1,k} = 0, \sum_{k=1}^{K} e_k x_{2,k} = 0, \cdots \sum_{k=1}^{K} e_k x_{N,k} = 0, \qquad (7)$$

By substituting equation. (3) for $e_k$ in equation (7), equation (7) can be rewritten as the normal equation (8).

$$\begin{bmatrix} \left(\sum_{k=1}^{K} x_{1,k}x_{1,k}\right) & \left(\sum_{k=1}^{K} x_{1,k}x_{2,k}\right) & \cdots & \left(\sum_{k=1}^{K} x_{1,k}x_{N,k}\right) \\ \left(\sum_{k=1}^{K} x_{2,k}x_{1,k}\right) & \left(\sum_{k=1}^{K} x_{2,k}x_{2,k}\right) & \cdots & \left(\sum_{k=1}^{K} x_{2,k}x_{N,k}\right) \\ \vdots & \vdots & \ddots & \vdots \\ \left(\sum_{k=1}^{K} x_{N,k}x_{1,k}\right) & \left(\sum_{k=1}^{K} x_{N,k}x_{2,k}\right) & \cdots & \left(\sum_{k=1}^{K} x_{N,k}x_{N,k}\right) \end{bmatrix} \begin{bmatrix} w_1 \\ w_2 \\ \vdots \\ w_N \end{bmatrix}$$

$$\begin{bmatrix} \left(\sum_{k=1}^{K} x_{1,k}y_k\right) \\ \left(\sum_{k=1}^{K} x_{2,k}y_k\right) \\ \vdots \\ \left(\sum_{k=1}^{K} x_{N,k}y_k\right) \end{bmatrix}$$

(8)

The normal equation in equation (8) can be solved by using a sweep method (Gauss-Jordan Elimination) with respect to the tap coefficient $w_n$.

By solving the normal equation for each class, the optimum tap coefficient $w_n$ (tap coefficient that minimizes the total sum E of the squared errors) can be obtained for each class.

Figure 10:
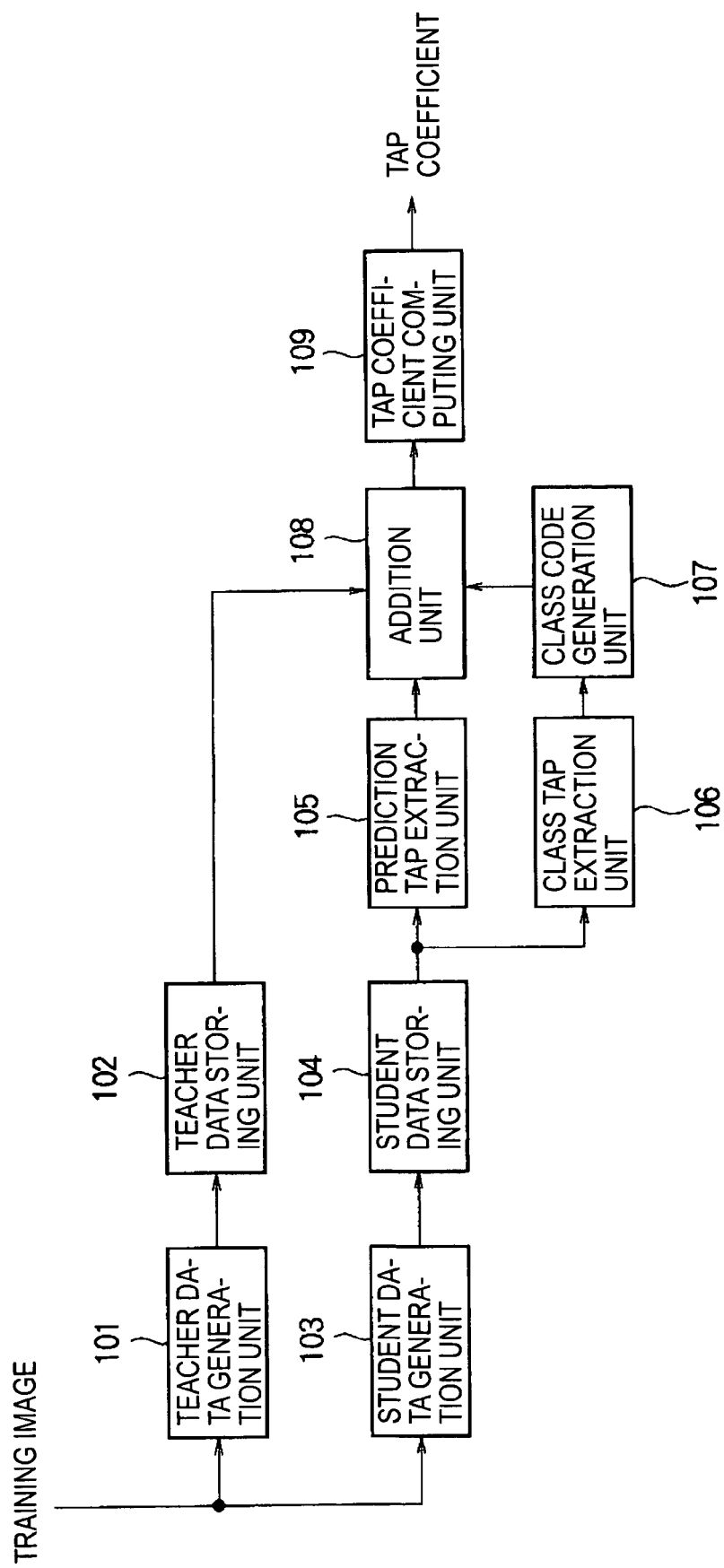
FIG. 10 is a block diagram of an example of the configuration of a learning apparatus for learning a tap coefficient.

FIG. 10 is a block diagram of the configuration of a learning apparatus for learning to find the tap coefficient $w_n$ for each class by generating a normal equation shown by equation (8).

The learning apparatus inputs a training image signal used for learning the tap coefficient $w_n$. For example, a high-resolution and high-quality image signal can be used as the training image signal.

In the learning apparatus, the training image signal is delivered to a teacher data generation unit 101 and a student data generation unit 103.

The teacher data generation unit 101 generates teacher data, which is a teacher or an answer of the learning process, from the supplied training image signal and delivers the teacher data to a teacher data storing unit 102. That is, the teacher data generation unit 101 directly delivers the high-quality image signal serving as the training image signal to the teacher data storing unit 102 as the teacher data. Alternatively, the teacher data generation unit 101 converts the contrast of the high-quality image signal and delivers the contrast-converted high-quality image signal to the teacher data storing unit 102 as the teacher data.

The teacher data storing unit 102 stores the high-quality image signal delivered from the teacher data generation unit 101 as teacher data.

The student data generation unit 103 generates student data, which is a student of the learning process, from the training image signal and delivers the student data to a student data storing unit 104. That is, the student data generation unit 103 filters the high-quality image signal serving as the training image signal to decrease the resolution of the high-quality image signal. The generated low-quality image signal is delivered to the student data storing unit 104 as student data.

The student data storing unit 104 stores the student data delivered from the student data generation unit 103.

A prediction tap extraction unit 105 sequentially determines a pixel of the high-quality image signal serving as the teacher data stored in the teacher data storing unit 102 to be a pixel of interest and then extracts predetermined pixels from among low-resolution pixels of a low-quality image signal serving as the student data stored in the student data storing unit 104. Thus, the prediction tap extraction unit 105 generates a prediction tap having the same structure as that from the prediction tap extraction unit 51 shown in FIG. 9 and delivers the prediction tap to an addition unit 108.

A class tap extraction unit 106 extracts predetermined low-resolution pixels of the low-quality image signal serving as the student data stored in the student data storing unit 104 with respect to the pixel of interest. Thus, the class tap extraction unit 106 generates a class tap having the same structure as that from the class tap extraction unit 53 shown in FIG. 9 and delivers the prediction tap to a class code generation unit 107.

The class code generation unit 107 carries out classification the same as that carried out by the class code generation unit 54 shown in FIG. 9 on the basis of the class tap output from the class tap extraction unit 106. The class code generation unit 107 then outputs a class code corresponding to the obtained class to the addition unit 108.

The addition unit 108 reads out the pixel value of the pixel of interest from the teacher data storing unit 102 and adds the pixel of interest to the student data of the prediction tap generated for the pixel of interest supplied from the prediction tap extraction unit 105 for each class code delivered from the class code generation unit 107.

That is, the teacher data $y_k$ stored in the teacher data storing unit 102, the prediction tap $x_{n,k}$ output from the prediction tap extraction unit 105, and the class code output from the class code generation unit 107 are supplied to the addition unit 108.

Thereafter, the addition unit 108 performs a calculation of a matrix in the left-hand side of equation (8), in which the student data are multiplied ($x_{n,k}x_{n',k}$) and summated ($\Sigma$) using the prediction tap (student data) $x_{n,k}$ for each class corresponding to the class code supplied from the class code generation unit 107.

Furthermore, for each class corresponding to the class code supplied from the class code generation unit 107, the addition unit 108 performs a calculation of a vector in the right-hand side of equation (8), in which the student data $x_{n,k}$ and the teacher data $y_k$ are multiplied ($x_{n,k}y_k$) and summated ($\Sigma$) using the prediction tap (student data) $x_{n,k}$ and the teacher data $y_k$.

That is, the addition unit 108 stores a component ($\Sigma x_{n,k}x_{n',k}$) of the matrix in the left-hand side of equation (8) and a component ($\Sigma x_{n,k}y_k$) of the vector in the right-hand side of equation (8) obtained for the teacher data which was previously determined to be a pixel of interest in the internal memory thereof (not shown).

Thereafter, the addition unit 108 adds the corresponding component $x_{n,k+1}x_{n',k+1}$ calculated by using student data $x_{n,k+1}$ of a prediction tap for the newly determined pixel of interest to the component ($\Sigma x_{n,k}x_{n',k}$) of the matrix in the left-hand side of equation (8). That is, the addition represented by the summation in the left-hand side of equation (8) is performed.

Furthermore, the addition unit 108 adds the corresponding component $x_{n,k+1}x_{n',k+1}$ calculated by using teacher data $y_{k+1}$ and student data $x_{n,k+1}$ of a prediction tap for the teacher data of the newly determined pixel of interest to the component ($\Sigma x_{n,k}y_k$) of the vector in the right-hand side of equation (8). That is, the addition represented by the summation in the right-hand side of equation (8) is performed.

The addition unit 108 then performs the above-described addition while determining all of the teacher data stored in the teacher data storing unit 102 to be pixels of interest to generate the normal equation shown by equation (8) for each class. The addition unit 108 delivers the normal equation to a tap coefficient computing unit 109.

The tap coefficient computing unit 109 solves the normal equation for each class and obtains the optimum tap coefficient $W_n$ to output it.

The coefficient generation unit 55 stores the obtained tap coefficient $W_n$ for each class.

In the above-described method, the training image signal or the training image signal having converted contrast is used as teacher data corresponding to the second image signal. In addition, a low-resolution image signal generated from the training image signal by degrading the resolution is used as student data corresponding to the first image signal. A tap coefficient is then trained with these data. Thus, a tap coefficient can be obtained that can provide image conversion from the first signal to the second signal while improving the resolution.

Here, by changing the selection of student data corresponding to the first image signal and teacher data corresponding to the second image signal, tap coefficients for a variety of image conversion processes can be obtained.

That is, for example, high-resolution image data is used as teacher data and image data generated from the high-resolution image data serving as the teacher data by adding noise is used as student data. A tap coefficient is then trained with these data. Thus, a tap coefficient can be obtained that can provide image conversion from a first signal to a second signal while removing or reducing noise from the first data.

Figure 11:
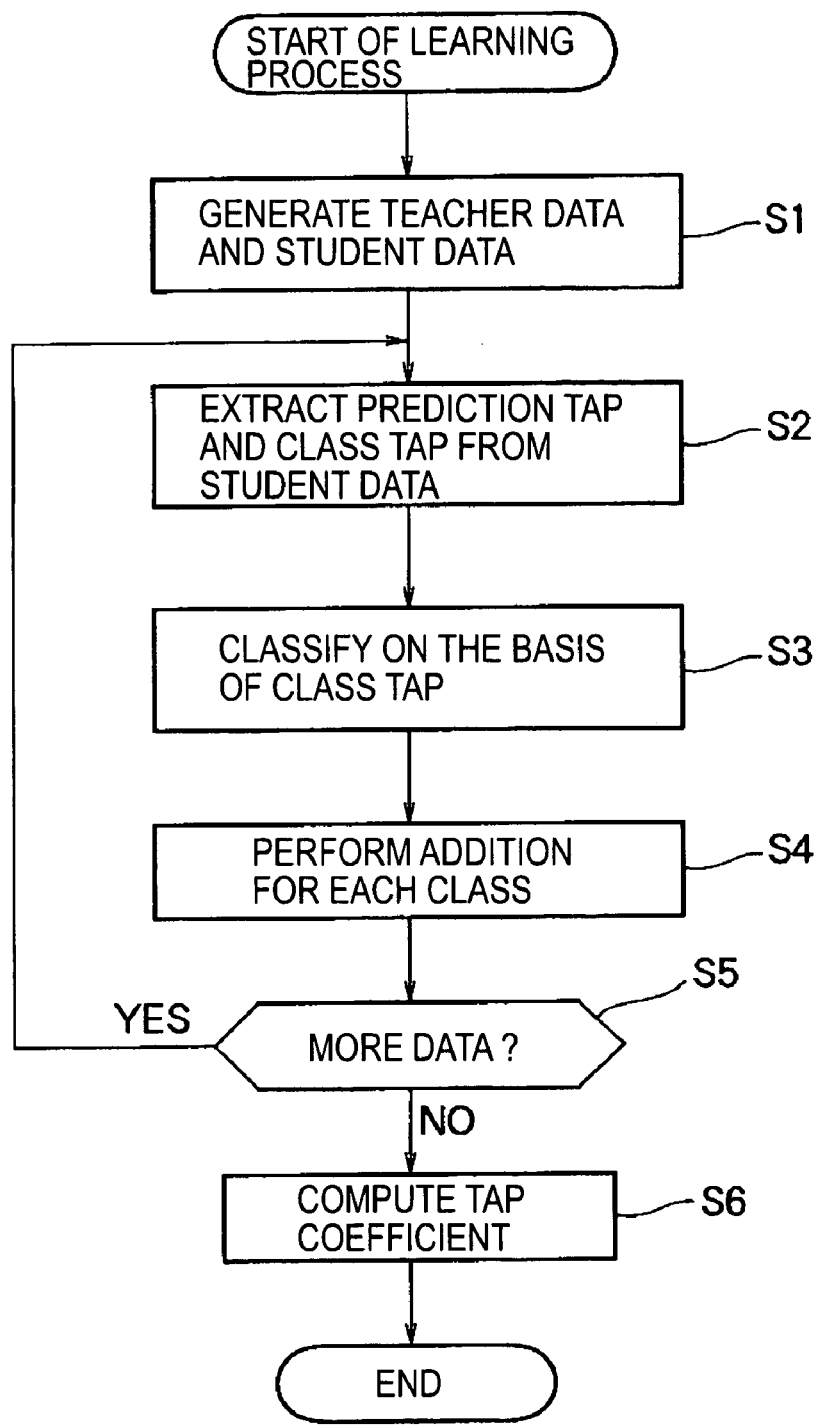
FIG. 11 is a flow chart illustrating a learning process of the learning apparatus.

The process of the learning apparatus shown in FIG. 10 (i.e., learning process) is described with reference to FIG. 11 when a tap coefficient for each class is trained with respect to a given position in the display panel 3.

At step S1, the teacher data generation unit 101 and the student data generation unit 103 generate and output teacher data and student data from a training image signal, respectively. That is, the teacher data generation unit 101 directly outputs the training image signal as the teacher data. Alternatively, the teacher data generation unit 101 converts the contrast of the training image signal and outputs the converted training image signal as the teacher data. Additionally, the student data generation unit 103 filters the training image signal with a LPF having a predetermined cutoff frequency to generate student data for the teacher data (training image signal) in each frame (or field) and outputs it.

The teacher data output from the teacher data generation unit 101 is delivered to the teacher data storing unit 102 to be stored. The student data from the student data generation unit 103 is delivered to the student data storing unit 104 to be stored.

Subsequently, the process proceeds to step S2, where the prediction tap extraction unit 105 selects a pixel of interest from among the teacher data stored in the teacher data storing unit 102 and previously not selected as a pixel of interest. Furthermore, at step S2, the prediction tap extraction unit 105 generates a prediction tap for the pixel of interest from the student data stored in the student data storing unit 104 and delivers the prediction tap to the addition unit 108. At the same time, the class tap extraction unit 106 generates a class tap for the pixel of interest from the student data stored in the student data storing unit 104 and delivers the prediction tap to the class code generation unit 107.

Thereafter, the process proceeds to step S3. The class code generation unit 107 classifies the pixel of interest on the basis of the class tap for the pixel of interest. The class code generation unit 107 then outputs a class code obtained by the classification to the addition unit 108. The process then proceeds to step S4.

At step S4, the addition unit 108 reads the pixel of interest out of the teacher data storing unit 102. The addition unit 108 then performs the addition shown by equation (8) for the student data of the prediction tap generated for the pixel of interest and delivered from the prediction tap extraction unit 105. The addition is performed for each class code supplied from the class code generation unit 107. The process then proceeds to step S5.

At step S5, the prediction tap extraction unit 105 determines whether the teacher data that does not become a pixel of interest is still stored in the teacher data storing unit 102. If it is determined at step S5 that the teacher data that does not become a pixel of interest is still stored in the teacher data storing unit 102, the prediction tap extraction unit 105 defines the teacher data that does not become a pixel of interest as a new pixel of interest. The process then returns to step S2. Thereafter, the same subsequent processes are repeated.

However, if it is determined at step S5 that no teacher data that does not become a pixel of interest is stored in the teacher data storing unit 102, the addition unit 108 delivers the obtained matrix in the left-hand side of equation (8) for each class and the obtained vector in the right-hand side of equation (8) to the tap coefficient computing unit 109. The process then proceeds to step S6.

At step S6, the tap coefficient computing unit 109 solves the normal equation for each class, which is generated from the matrix in the left-hand side and the vector in the right-hand side for each class, to acquire a tap coefficient $w_n$ for each class. The tap coefficient computing unit 109 then outputs the tap coefficient $w_n$. Thus, the process is completed.

For some classes, it may be difficult to generate the normal equations sufficient to obtain a tap coefficient due to, for example, the lack of the number of training image signals. For such classes, the tap coefficient computing unit 109, for example, outputs a predetermined tap coefficient.

In the learning apparatus shown in FIG. 10, the teacher data generation unit 101 generates teacher data of a plurality of contrasts (M types of contrast). A tap coefficient for each class is obtained for each of the teacher data of M types of contrast. That is, in the learning apparatus shown in FIG. 10, a tap coefficient for each class is obtained for each of M types of contrast.

Figure 12:
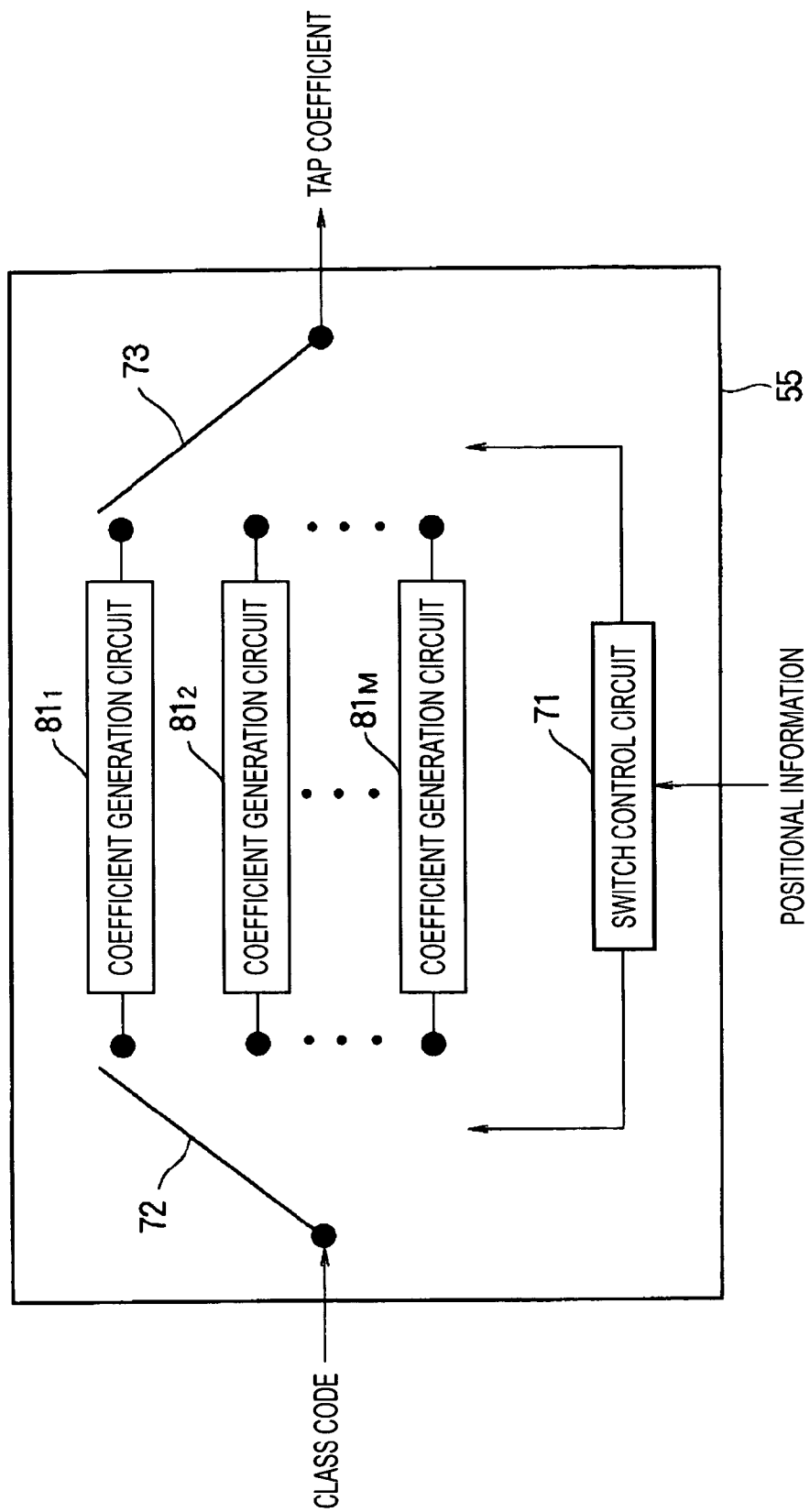
FIG. 12 is a block diagram of an example of a coefficient generation unit 55.

FIG. 12 illustrates a block diagram of the coefficient generation unit 55 shown in FIG. 9.

The positional information indicating the position of the display panel 3 is delivered from the controller 31 and is input to a switch control circuit 71.

The switch control circuit 71 controls switches 72 and 73 in response to the positional information delivered from the controller 31. That is, the switch control circuit 71 controls the switches 72 and 73 to select a coefficient generation circuit corresponding to the position indicated by the positional information delivered from the controller 31 from among coefficient generation circuits $81_1$ to $81_M$.

A coefficient generation circuit $81_m$ (m=1, 2, ..., M) stores a tap coefficient for each class for an mth contrast among tap coefficients for each class of M types of contrast.

When the coefficient generation circuit $81_m$ is selected by the switches 72 and 73, the coefficient generation circuit $81_m$ receives a class code from the class code generation unit 54 (see FIG. 9) via the switch 72. The coefficient generation circuit $81_m$ selects a tap coefficient of a class corresponding to the class code delivered from the class code generation unit 54 from among the stored tap coefficients for each class. The coefficient generation circuit $81_m$ then delivers (outputs) the selected tap coefficient to the prediction computing unit 56 via the switch 73.

In the partition TV, regional information about the region where the partition TV is installed is set by a user, for example, immediately after the user purchases the partition TV. Thus, the initial setting is performed in which, for example, a frequency band for each channel received by the tuner 11 is set. Additionally, in this initial setting, for example, each of the coefficient generation circuits $81_1$ to $81_M$ is associated with a position of the display panel 3.

More specifically, in the partition TV, for example, the display panel 3 is sequentially moved to M number of positions. At each of the M number of positions, the DRC unit 17 displays images obtained by using the tap coefficients stored in the coefficient generation circuits $81_1$ to $81_M$ on the display unit 3A of the display panel 3. At each of the M number of positions of the display panel 3, the user observes the images displayed on the display unit 3A of the display panel 3 to select the most desirable image. Thereafter, at each of the M number of positions of the display panel 3, the tap coefficient (i.e., a coefficient generation circuit $81_m$ storing the tap coefficient) used for generating the image selected by the user is associated with the position of the display panel 3 displaying the image.

After the above-described initial setting, the switch control circuit 71 causes the switches 72 and 73 to select, from among M coefficient generation circuits $81_1$ to $81_M$, a coefficient generation circuit $81_m$ storing the tap coefficient associated with the position closest to the position indicated by the positional information delivered by the controller 31. The coefficient generation circuit $81_m$ selected by the switches 72 and 73 then selects, from among the stored tap coefficients for classes, a tap coefficient corresponding to the class code supplied from the class code generation unit 54 and delivers the selected tap coefficient to the prediction computing unit 56.

The image conversion process of the DRC unit 17 shown in FIG. 9 is described next with reference to a flow chart in FIG. 13, in which an image signal (a first image signal) output from the video decoder 15 is converted to a high-quality (high-resolution) image signal (a second image signal).

At step S11, the prediction tap extraction unit 51 selects a pixel of interest from among pixels of the second image data previously not selected as a pixel of interest. Furthermore, the prediction tap extraction unit 51 extracts some of pixels (and pixel values thereof) of the first image signal used for predicting the pixel value of the pixel of interest as a prediction tap. The prediction tap extraction unit 51 also delivers the extracted prediction tap to the prediction computing unit 56. The process then proceeds to step S12. Here, the prediction tap extraction unit 51, for example, selects a pixel of the second image signal as a pixel of interest in an order of raster scanning.

At step S12, the class tap extraction unit 53 extracts some of pixels of the first image signal used for classifying the pixel of interest into one of classes as a class tap. The class tap extraction unit 53 then delivers the obtained class tap to the class code generation unit 54. The process then proceeds to step S13.

At step S13, the class code generation unit 54 classifies the pixel of interest on the basis of a pixel value (level) of a pixel of the class tap from the class tap extraction unit 53. The class code generation unit 54 generates a class code for the class obtained from the classification. The class code generation unit 54 then delivers the class code to the coefficient generation unit 55. Thereafter, the process proceeds to step S14.

At step S14, the switch control circuit 71 of the coefficient generation unit 55 (see FIG. 12) recognizes the position of the display panel 3. That is, the switch control circuit 71 receives the positional information delivered from the controller 31 (see FIG. 8) and recognizes the position of the display panel 3 indicated by the positional information.

The process proceeds from step S14 to step S15. The switch control circuit 71 selects, from among the M coefficient generation circuits $81_1$ to $81_M$, the coefficient generation circuit $81_m$ corresponding to the position of the display panel 3 recognized from the positional information delivered from the controller 31. The process then proceeds to step S16. At step S16, the coefficient generation circuit $81_m$ selected by the switch control circuit 71 delivers (outputs) the tap coefficient of the class corresponding to the class code delivered from the class code generation unit 54 to the prediction computing unit 56. The process then proceeds to step S17.

At step S17, the prediction computing unit 56 receives the prediction tap output from the prediction tap extraction unit 51 and the tap coefficient output from the coefficient generation unit 55 and performs a prediction calculation for equation (1) which finds a prediction value of the actual value of the pixel of interest using the prediction tap and the tap coefficient. Thus, the prediction computing unit 56 outputs the pixel value (the prediction value of the pixel value) of the pixel of interest, namely, the pixel value of the pixel of the second image signal.

Figure 13:
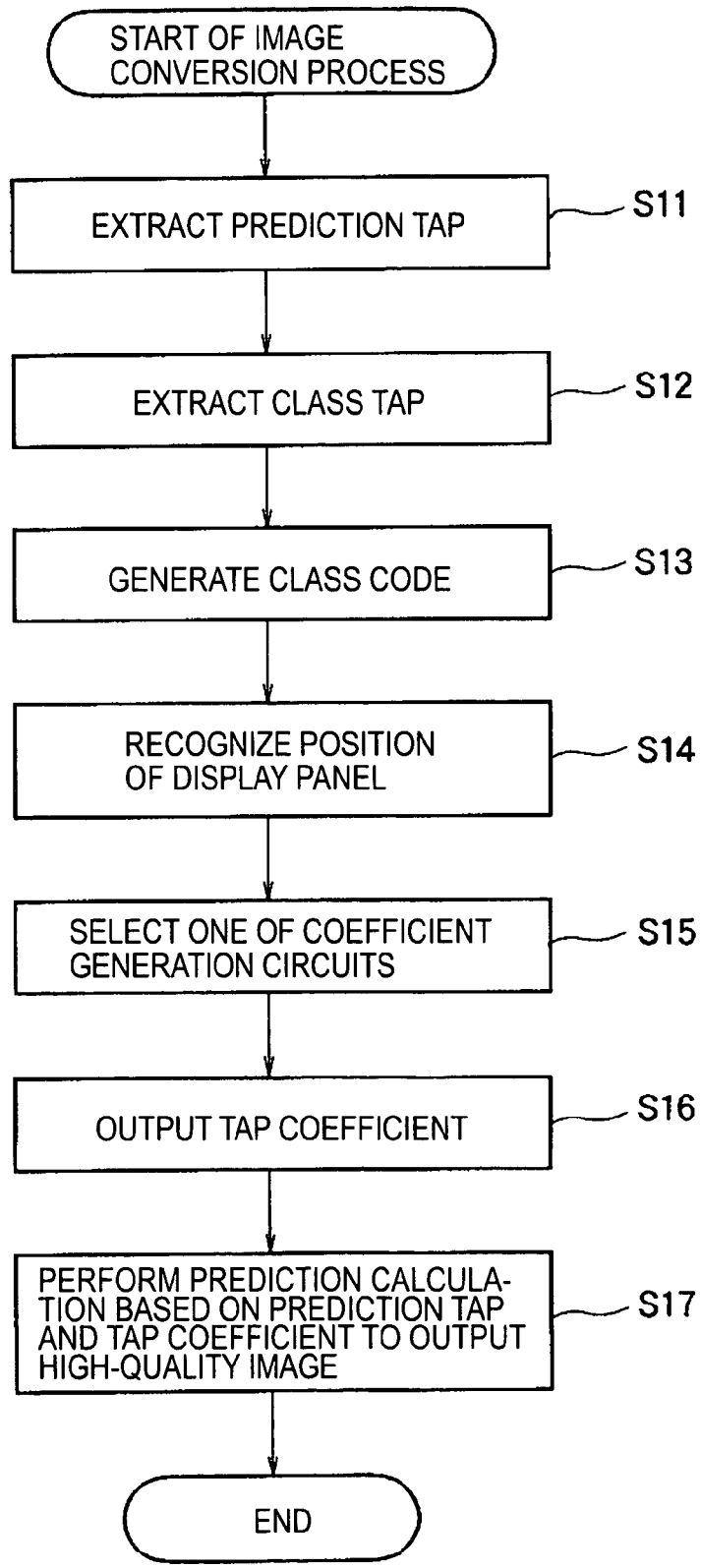
FIG. 13 is a flow chart illustrating an image conversion process of the DRC unit 17.

In the image conversion process shown in FIG. 13, pixels of the second image signal are sequentially selected as a pixel of interest.

Subsequently, since, as described above, the partition TV (see FIG. 8) functions as both an apparatus for displaying an image and a partition, the partition TV provides the following two operation modes: a display mode in which the partition TV functions as an apparatus for displaying an image; and a partition mode in which the partition TV functions as a partition.

The remote control unit 10 (see FIG. 8) of the partition TV includes at least a "TV" switch operated for changing the display mode to active or inactive and a "furniture" switch operated for changing the partition mode to active or inactive.

The operation of the partition TV is described next with reference to flow charts in FIGS. 14 through 17, in which one of the display mode and partition mode is active or both of the display mode and partition mode are active.

As well as the "TV" switch and the "furniture" switch, the remote control unit 10 includes at least a "movement permission" switch and a movement key. The "movement permission" switch is operated to permit or inhibit the movement (rotation) of the display panel 3. The movement key is operated to indicate the movement direction of the display panel 3. The movement key for indicating the movement direction can be composed of, for example, a cursor key or a joystick.

The operation of the partition TV is described with reference to the flow chart in FIG. 14 when the "furniture" switch of the remote control unit 10 is turned on to enable the partition mode.

When a user desires to use the partition TV as a partition, which is one piece of furniture, the user operates the remote control unit 10 to turn on the "furniture" switch.

When the user operates the remote control unit 10 to turn on the "furniture" switch, the remote control I/F 34 receives an operation signal corresponding to the operation via the light-receiving unit 35 of the partition TV (see FIG. 8). The remote control I/F 34 delivers the operation signal received from the remote control unit 10 to the controller 31. The controller 31 enables the partition mode in response to the operation signal from the remote control unit 10 (for example, enabling information is set to a flag which indicates whether to enable or disable the partition mode and is stored in the EEPROM 31D).

When the partition mode is enabled, the remote control I/F 34, at step S31, determines whether the movement key of the remote control unit 10 is operated. If it is determined at step S31 that the movement key of the remote control unit 10 is not operated, step S32 is skipped and the process proceeds to step S33.

If it is determined at step S31 that the movement key of the remote control unit 10 is operated, that is, if it is determined that an operation signal corresponding to the operation of the movement key is transmitted by the remote control unit 10 and is received by the remote control I/F 34 via the light-receiving unit 35, the remote control I/F 34 accepts the operation signal and delivers it to the controller 31. The process then proceeds to step S32.

At step S32, the controller 31 delivers, to the drive control unit 42, a control signal instructing the movement of the display panel 3 in response to the operation of the movement key based on the operation signal from the remote control I/F 34. The drive control unit 42 drives the actuator 43 in response to the control signal from the controller 31. Thus, the display panel 3 moves in response to the operation of the movement key.

That is, since the display panel 3 moves in response to the operation of the movement key, the arrangement of the partition, which is one of the functions of the partition TV, can be changed.

The process then proceeds from step S32 to step S33, where the remote control I/F 34 determines whether the "furniture" switch of the remote control unit 10 is operated to turn off. If it is determined at step S33 that the "furniture" switch is not operated to turn off, the process returns to step S31, where the same subsequent processes are repeated.

If it is determined at step S33 that the "furniture" switch is operated to turn off, that is, if it is determined that the user operates the remote control unit 10 to turn off the "furniture" switch and the remote control I/F 34 receives an operation signal corresponding to the operation via the light-receiving unit 35, the remote control I/F 34 accepts the operation signal and delivers it to the controller 31.

The controller 31 disables the partition mode in response to the operation signal from the remote control unit 10 (for example, disabling information is set to the flag which indicates whether to enable or disable the partition mode). The process is then completed.

Thus, when the user turns on the "furniture" switch of the remote control unit 10, the partition mode is enabled. The partition TV functions as a partition which changes the arrangement thereof in response to the operation of the movement key by the user.

The operation of the partition TV is described with reference to the flow chart in FIG. 15 when the "TV" switch of the remote control unit 10 is turned on to enable the display mode.

When a user desires to use the partition TV as a display unit of, for example, a television receiver, the user operates the remote control unit 10 to turn on the "TV" switch.

When the user operates the remote control unit 10 to turn on the "TV" switch, the remote control I/F 34 receives an operation signal corresponding to the operation via the light-receiving unit 35 of the partition TV (see FIG. 8). The remote control I/F 34 delivers the operation signal received from the remote control unit 10 to the controller 31. The controller 31 enables the display mode in response to the operation signal from the remote control unit 10 (for example, enabling information is set to a flag which indicates whether to enable or disable the partition mode and is stored in the EEPROM 31D).

When the display mode is enabled, an image is displayed on the display unit 3A of the display panel 3 and the corresponding sound is output from the speaker 20.

That is, in the partition TV, the tuner 11 selects a transport stream of a specific channel (frequency range) from among transport streams of a digital broadcast received by an antenna. The selected transport stream is delivered to the de-multiplexer 14 via the demodulation unit 12 and the error correction processing unit 13. The de-multiplexer 14 selects a TS packet of a specific program from the delivered transport stream under the control of the controller 31. The de-multiplexer 14 delivers the TS packet of video data and the TS packet of audio data to the video decoder 15 and the audio decoder 16, respectively.

The video decoder 15 MPEG-decodes the TS packet of video data delivered from the de-multiplexer 14. The resultant image signal is delivered to the DRC unit 17 and the motion vector detection unit 41. The DRC unit 17 converts the image signal from the video decoder 15 to a high-quality image signal and delivers the converted signal to the display unit 3A. Thus, the display unit 3A can display a high-resolution image.

The audio decoder 16 MPEG-decodes the TS packet of audio data delivered from the de-multiplexer 14. The resultant audio signal is delivered to the speaker 20, which outputs the corresponding sound.

As described above, when the "TV" switch is turned on to enable the display mode, the partition TV outputs images and sounds of the program. That is, the partition TV functions as a display unit of, for example, a television receiver which displays images and outputs the corresponding sound. Thus, a user can watch a television program. Accordingly, the "TV" switch corresponds to a power switch of a television receiver.

When the display mode is enabled, the controller 31, at step S41, determines whether the movement of the display panel 3 is permitted. If it is determined at step S41 that the movement of the display panel 3 is permitted, that is, for example, if permitting information is set to a flag which is stored in the EEPROM 31D and which indicates whether to permit or inhibit the movement of the display panel 3, the process proceeds to step S42.

At step S42, information is set to the flag which indicates whether to permit or inhibit the movement of the display panel 3 depending on the operation of a "movement permission" switch of the remote control unit 10.

That is, when the user operates the "movement permission" switch of the remote control unit 10 to permit the movement of the display panel 3, an operation signal corresponding to the operation is transmitted from the remote control unit 10 and is received by the remote control I/F 34 via the light-receiving unit 35. The remote control I/F 34 accepts the operation signal and delivers it to the controller 31. The controller 31 sets permitting information to the flag which indicates whether to permit or inhibit the movement of the display panel 3 depending on the operation signal from the remote control unit 10.

In contrast, when the user operates the "movement permission" switch of the remote control unit 10 to inhibit the movement of the display panel 3, an operation signal corresponding to the operation is transmitted by the remote control unit 10 and is received by the remote control I/F 34 via the light-receiving unit 35. The remote control I/F 34 accepts the operation signal and delivers it to the controller 31. The controller 31 sets inhibiting information to the flag which indicates whether to permit or inhibit the movement of the display panel 3 depending on the operation signal from the remote control unit 10.

At step S42, the motion vector detection unit 41 detects a motion vector representing full screen motion on a frame basis from the image signal delivered from the video decoder 15. The motion vector detection unit 41 then delivers the motion vector to the drive control unit 42. The process then proceeds to step S43.

At step S43, the drive control unit 42 drives the actuator 43 in accordance with the motion vector from the motion vector detection unit 41, so that the display panel 3 moves in accordance with the image signal delivered from the video decoder 15, namely, the motion of the image displayed on the display unit 3A of the display panel 3.

That is, when an image captured by, for example, a horizontally panning camera is displayed on the display unit 3A of the display panel 3, the display panel 3 horizontally moves in the same direction as the panning direction. The image displayed on the display unit 3A of the display panel 3 changes in response to the movement of the display panel 3.

Accordingly, in this case, the user has a sensation that the display unit 3A of the display panel 3 is a "moving window" and that the user observes the real scenes through the window.

The motion vector detected by the motion vector detection unit 41 from the image signal output from the video decoder 15 represents the motion of the entire image, which is obtained in such a case when the image is captured while a camera is panning, that is, represents the motion of the camera. Accordingly, for example, when a fixed camera captures an image of a motor vehicle passing through with a stationary background, the motion of the entire image does not exist. Therefore, the motion vector detection unit 41 detects a motion vector of zero. In this case, the display panel 3 does not move. However, the display panel 3 can move in accordance with the motion of a partial image instead of the motion of the entire image.

If it is determined at step S41 that the movement of the display panel 3 is not permitted, that is, for example, if inhibiting information is set to the flag of the EEPROM 31D which indicates whether to permit or inhibit the movement of the display panel 3, the process skips steps S42 and S43 and proceeds to step S44.

Accordingly, if the movement of the display panel 3 is not permitted, the display panel 3 does not move in accordance with the motion of the image displayed on the display unit 3A.

At step S44, the remote control I/F 34 determines whether the "TV" switch of the remote control unit 10 is operated to turn off. If it is determined at step S44 that the "TV" switch is not operated to turn off, the process returns to step S41, where the same subsequent processes are repeated.

If it is determined at step S44 that the "TV" switch is operated to turn off, that is, if it is determined that the user operates the remote control unit 10 to turn off the "TV" switch and the remote control I/F 34 receives an operation signal corresponding to the operation via the light-receiving unit 35, the remote control I/F 34 accepts the operation signal and delivers it to the controller 31.

The controller 31 disables the display mode in response to the operation signal from the remote control unit 10 (for example, disabling information is set to the flag which indicates whether to enable or disable the display mode). In addition, the controller 31 stops displaying the image on the display unit 3A of the display panel 3 and stops outputting the sound from the speaker 20. The process is then completed.

Thus, when the user turns on the "TV" switch of the remote control unit 10, the display mode is enabled. The partition TV functions as a display apparatus. Furthermore, if the movement of the display panel 3 is permitted, the display panel 3 moves in accordance with the motion of an image displayed on the display unit 3A of the display panel 3.

When the partition mode is enabled, the partition TV functions as a partition, as described above. Accordingly, the user can use the partition TV as a partition. When the display mode is enabled, the partition TV functions as a display apparatus, as described above. Accordingly, the user can use the partition TV as a display apparatus.

However, the user could possibly desire to use the partition TV as a display apparatus while they use the partition TV as a partition. Conversely, the user could possibly desire to use the partition TV as a partition while they use the partition TV as a display apparatus.

The operation of the partition TV is described below when both partition mode and display mode are enabled.

The operation of the partition TV is described next with reference to the flow chart in FIG. 16 when the "furniture" switch of the remote control unit 10 is turned on to enable the partition mode and subsequently the "TV" switch of the remote control unit 10 is turned on to enable the display mode.

Figure 14:
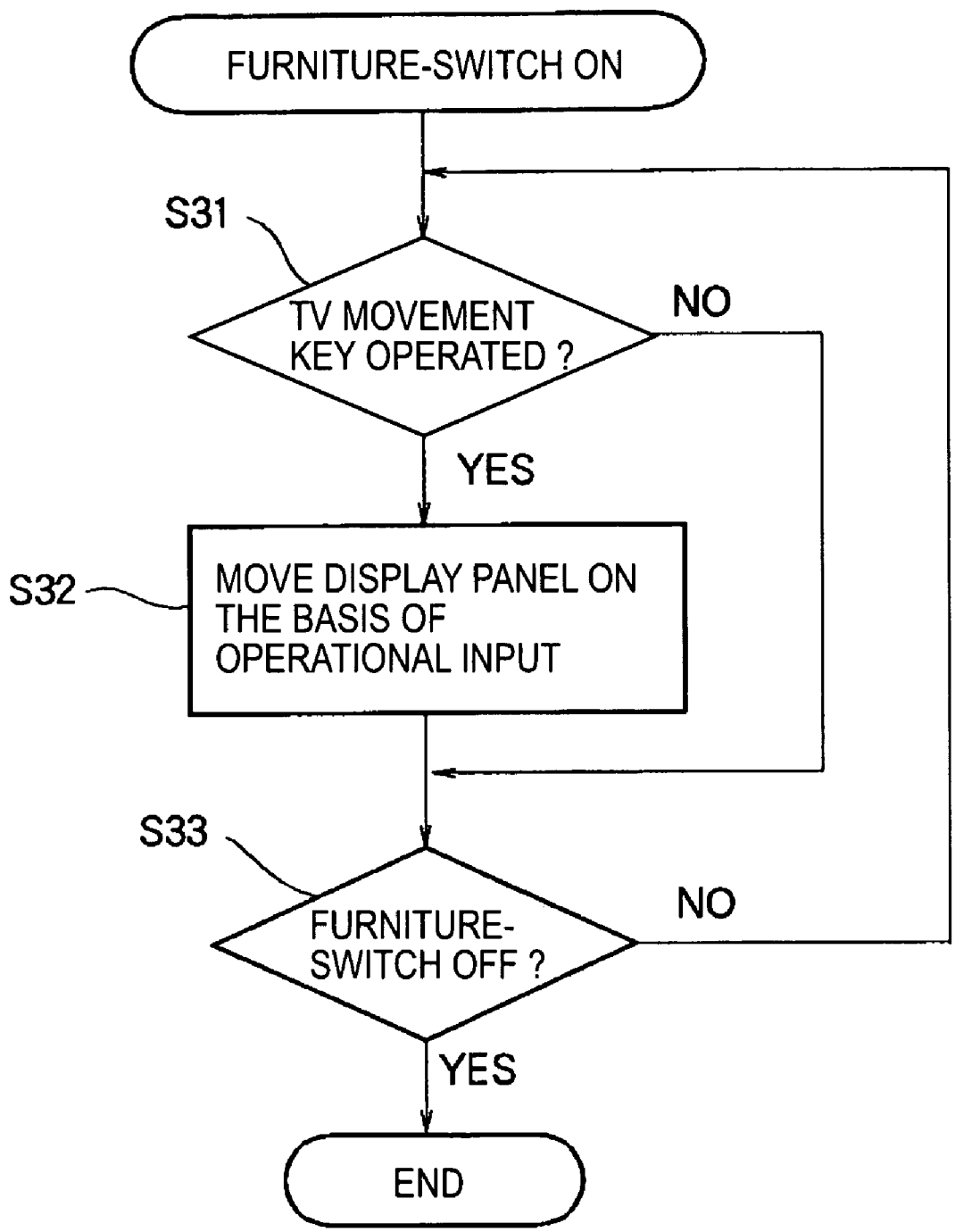
FIG. 14 is a flow chart illustrating the operation of the partition TV when a partition mode is enabled.

When the user operates the remote control unit 10 to turn on the "furniture" switch, the controller 31 enables the partition mode, as shown in FIG. 14.

When the partition mode is enabled, the same processes as those at steps S31 through S33 are executed at steps S51 through S56.

That is, as at the step S31 shown in FIG. 14, the remote control I/F 34, at step S51, determines whether the movement key of the remote control unit 10 is operated. If it is determined at step S51 that the movement key of the remote control unit 10 is not operated, step S52 is skipped and the process proceeds to step S53.

If it is determined at step S51 that the movement key of the remote control unit 10 is operated, the process proceeds to step S52. As at step S32 shown in FIG. 14, the controller 31 delivers a control signal instructing the movement of the display panel 3 in accordance with the operation of the movement key based on the operation signal to the drive control unit 42. The drive control unit 42 drives the actuator 43 in response to the control signal from the controller 31. Thus, the display panel 3 moves in response to the operation of the movement key.

The process proceeds from step S52 to step S53. As at step S33 shown in FIG. 14, the remote control I/F 34 determines whether the "furniture" switch of the remote control unit 10 is operated to turn off. If it is determined at step S53 that the "furniture" switch is operated to turn off, the controller 31 disables the partition mode and terminates the process.

If it is determined at step S53 that the "furniture" switch is not operated to turn off, the process proceeds to step S54, where the controller 31 determines whether the "TV" switch is operated to turn on.

If it is determined at step S54 that the "TV" switch is not operated to turn on, the process returns to step S51, where the same subsequent processes are repeated.

However, if it is determined at step S54 that the "TV" switch is operated to turn on, that is, if it is determined that the user operates the remote control unit 10 to turn on the "TV" switch and an operation signal corresponding to the operation is transmitted from the remote control unit 10 and is received by the remote control I/F 34 via the light-receiving unit 35, the remote control I/F 34 accepts the operation signal and delivers it to the controller 31. The controller 31 enables the display mode in response to the operation signal from the remote control unit 10. Thus, as shown in FIG. 15, an image is displayed on the display unit 3A of the display panel 3 and the corresponding sound is output from the speaker 20.

As described above, when the partition mode is enabled and subsequently the display mode is enabled at step S54, the process proceeds to step S55. At step S55, the controller 31 stores positional information indicating the current position of the display panel 3.

That is, as shown in FIG. 9, the controller 31 receives the driving amount of the actuator 43 from the drive control unit 42 to determine the position of the display panel 3. The controller 31 then stores the determined positional information indicating the current position of the display panel 3 at step S55.

Additionally, at step S55, the controller 31 delivers a control signal to instruct the drive control unit 42 to move the display panel 3 to the default position. The drive control unit 42 drives the actuator 43 in response to the control signal from the controller 31. Thus, the display panel 3 moves to the default position.

After the process at step S55 is performed, the same processes as those at step S41 through S44 in FIG. 15 are executed at step S56 through S59, respectively.

That is, as at step S41 shown in FIG. 15, the controller 31, at step S56, determines whether the movement of the display panel 3 is permitted or not. If it is determined at step S56 that the movement of the display panel 3 is permitted, the process proceeds to step S57, where, as at step S42 shown in FIG. 15, the motion vector detection unit 41 detects a motion vector representing a full screen motion on a frame basis from the image signal delivered from the video decoder 15. The motion vector detection unit 41 then delivers the motion vector to the drive control unit 42. The process then proceeds to step S58.

At step S58, as at step S43 shown in FIG. 15, the drive control unit 42 drives the actuator 43 in response to the control signal from the controller 3. The process then proceeds to step S59. Thus, the display panel 3 moves in accordance with the image signal delivered from the video decoder 15, namely, the motion of the image displayed on the display unit 3A of the display panel 3.

In this case, the display panel 3 moves to the default position at step S55. Accordingly, at step S58, the display panel 3 moves in accordance with (based on) the motion of the image displayed on the display unit 3A of the display panel 3 using the default position as a reference.

In contrast, if it is determined at step S56 that the movement of the display panel 3 is not permitted, the process skips steps S57 and S58 and proceeds to step S59. As at step S44 shown in FIG. 15, the remote control I/F 34 determines whether the "TV" switch of the remote control unit 10 is operated to turn off. If it is determined at step S59 that the "TV" switch is not operated to turn off, the process returns to step S56, where the same subsequent processes are repeated.

If it is determined at step S59 that the "TV" switch is operated to turn off, the controller 31 disables the display mode. That is, the state in which both partition mode and display mode are enabled is changed to a state in which only the partition mode is enabled. In addition, the display of an image on the display unit 3A of the display panel 3 and the output of sound from the speaker 20 are stopped. The process then proceeds to step S60.

At step S60, the controller 31 delivers, to the drive control unit 42, a control signal to instruct the drive control unit 42 to move the display panel 3 to the position indicated by the positional information stored at step S55, namely, the position when the display mode is enabled. The drive control unit 42 drives the actuator 43 in response to the control signal from the controller 31. Thus, the display panel 3 moves to the position when the display mode is enabled (i.e., the original position).

After the process at step S60 is performed, the process returns to step S51, where the same subsequent processes are repeated.

When the partition mode is enabled and subsequently the display mode becomes enabled at step S54, the processes from step S56 through step S59 are repeated, as shown in FIG. 16, unless the display mode is disabled. If the display mode is disabled, the process of step S60 is performed. The process then returns to step S51.

In contrast, when the partition mode is enabled and subsequently the display mode becomes enabled at step S54 and when the display mode is not disabled and the partition mode becomes disabled during the repetitive process from step S56 through step S59, that is, when only the display mode becomes enabled, the processes from step S56 through step S59 are repeated, as shown in FIG. 16, the partition TV terminates the process of the flow chart shown in FIG. 16 and starts the process of the flow chart shown in FIG. 15.

Additionally, in FIG. 16, when the partition mode is enabled and subsequently the display mode becomes enabled at step S54 and when, at step S55, the display panel 3 is moved to the default position and then, at step S59, the display mode becomes disabled, the display panel 3 moves (returns) to the position at which the display mode was enabled. However, the processes of steps S55 and S60 may be skipped, that is, the processes of steps S55 and S60 need not be performed.

If the processes of steps S55 and S60 are skipped, the partition mode is enabled. Subsequently, when the display mode becomes enabled at step S54, the display panel 3 starts to move in accordance with the motion of an image displayed on the display unit 3A at step S58 if the movement of the display panel 3 is permitted. Accordingly, in this case, the display panel 3 moves in accordance with the motion of an image displayed on the display unit 3A using the position at which the display mode was enabled as a reference instead of using the default position as a reference.

Subsequently, when the display mode becomes disabled at step S59, the process of step S60 is skipped and the process returns to step S51. If the user operates the movement key of the remote control unit 10, the display panel 3, at step S52, moves in response to the operation of the movement key. Accordingly, in this case, the display panel 3 moves in accordance with the operation of the movement key using the position at which the display mode was disabled as a reference.

The operation of the partition TV is described next with reference to the flow chart in FIG. 17 when the "TV" switch of the remote control unit 10 is turned on to enable the display mode and subsequently the "furniture" switch of the remote control unit 10 is turned on to enable the partition mode.

When the user operates the remote control unit 10 to turn on the "TV" switch, the controller 31 enables the display mode, as shown in FIG. 15. Thus, as shown in FIG. 15, an image is displayed on the display unit 3A of the display panel 3 and the corresponding sound is output from the speaker 20.

After the display mode is enabled, the same processes as those at step S41 through S44 in FIG. 15 are executed at step S81 through S84, respectively.

That is, as at step S41 shown in FIG. 15, the controller 31, at step S81, determines whether the movement of the display panel 3 is permitted or not. If it is determined at step S81 that the movement of the display panel 3 is permitted, the process proceeds to step S82, where, as at step S42 shown in FIG. 15, the motion vector detection unit 41 detects a motion vector representing a full screen motion on a frame basis from the image signal delivered from the video decoder 15. The motion vector detection unit 41 then delivers the motion vector to the drive control unit 42. The process then proceeds to step S83.

At step S83, as at step S43 shown in FIG. 15, the drive control unit 42 drives the actuator 43 in response to the control signal from the controller 31. The process then proceeds to step S84. Thus, the display panel 3 moves in accordance with the image signal delivered from the video decoder 15, namely, the motion of the image displayed on the display unit 3A of the display panel 3.

In contrast, if it is determined at step S81 that the movement of the display panel 3 is not permitted, the process skips steps S82 and S83 and proceeds to step S84. As at step S44 shown in FIG. 15, the remote control I/F 34 determines whether the "TV" switch of the remote control unit 10 is operated to turn off. If it is determined at step S84 that the "TV" switch is operated to turn off, the controller 31 disables the display mode and stops the display of an image on the display unit 3A of the display panel 3 and the output of sound from the speaker 20. The process is then completed.

If it is determined at step S84 that the "TV" switch is not operated to turn off, the process proceeds to step S85, where the remote control I/F 34 determines whether the "furniture" switch is operated to turn on or not.

If it is determined at step S85 that the "furniture" switch is not operated to turn on, the process returns to step S81, where the same subsequent processes are repeated.

If it is determined at step S85 that the "furniture" switch is operated to turn on, that is, if it is determined that the user operates the remote control unit 10 to turn on the "furniture" switch and an operation signal corresponding to the operation is transmitted from the remote control unit 10 and is received by the remote control I/F 34 via the light-receiving unit 35, the remote control I/F 34 accepts the operation signal and delivers it to the controller 31. The controller 31 enables the partition mode in response to the operation signal from the remote control unit 10.

Thus, when the display mode is enabled and subsequently the partition mode becomes enabled at step S85, the process proceeds to step S86, where the controller 31 delivers a control signal to instruct the drive control unit 42 to move the display panel 3 to the default position. The drive control unit 42 drives the actuator 43 in response to the control signal from the controller 31. Thus, the display panel 3 moves to the default position.

In the above-described example, the display panel 3 is moved to the default position at step S86. However, at step S86, the display panel 3 may be moved to its position immediately before the display mode was enabled. Alternatively, the process at step S86 may be skipped.

After the process at step S86 is performed, the same processes as those at step S31 through S33 in FIG. 14 are executed at step S87 through S89, respectively.

That is, as at step S31 shown in FIG. 14, the remote control I/F 34, at step S87, determines whether the movement key of the remote control unit 10 is operated. If it is determined at step S87 that the movement key of the remote control unit 10 is not operated, the process skips step S88 and proceeds to step S89.

If it is determined at step S87 that the movement key of the remote control unit 10 is operated, the process proceeds to step S88, where, as at step 32 shown in FIG. 14, the controller 31 delivers, to the drive control unit 42, a control signal to instruct the drive control unit 42 to move the display panel 3 to a position in accordance with the operation. The drive control unit 42 drives the actuator 43 in response to the control signal from the controller 31. Thus, the display panel 3 moves in accordance with the operation of the movement key.

The process then proceeds from step S88 to step S89. At step S89, as at step S33 shown in FIG. 14, the remote control I/F 34 determines whether the "furniture" switch of the remote control unit 10 is operated to turn off. If it is determined at step S89 that the "furniture" switch is not operated to turn off, the process returns to step S87, where the same subsequent processes are repeated.

If it is determined at step S89 that the "furniture" switch is operated to turn off, the controller 31 disables the partition mode. The process returns to step S81, where the same subsequent processes are repeated.

Figure 17:
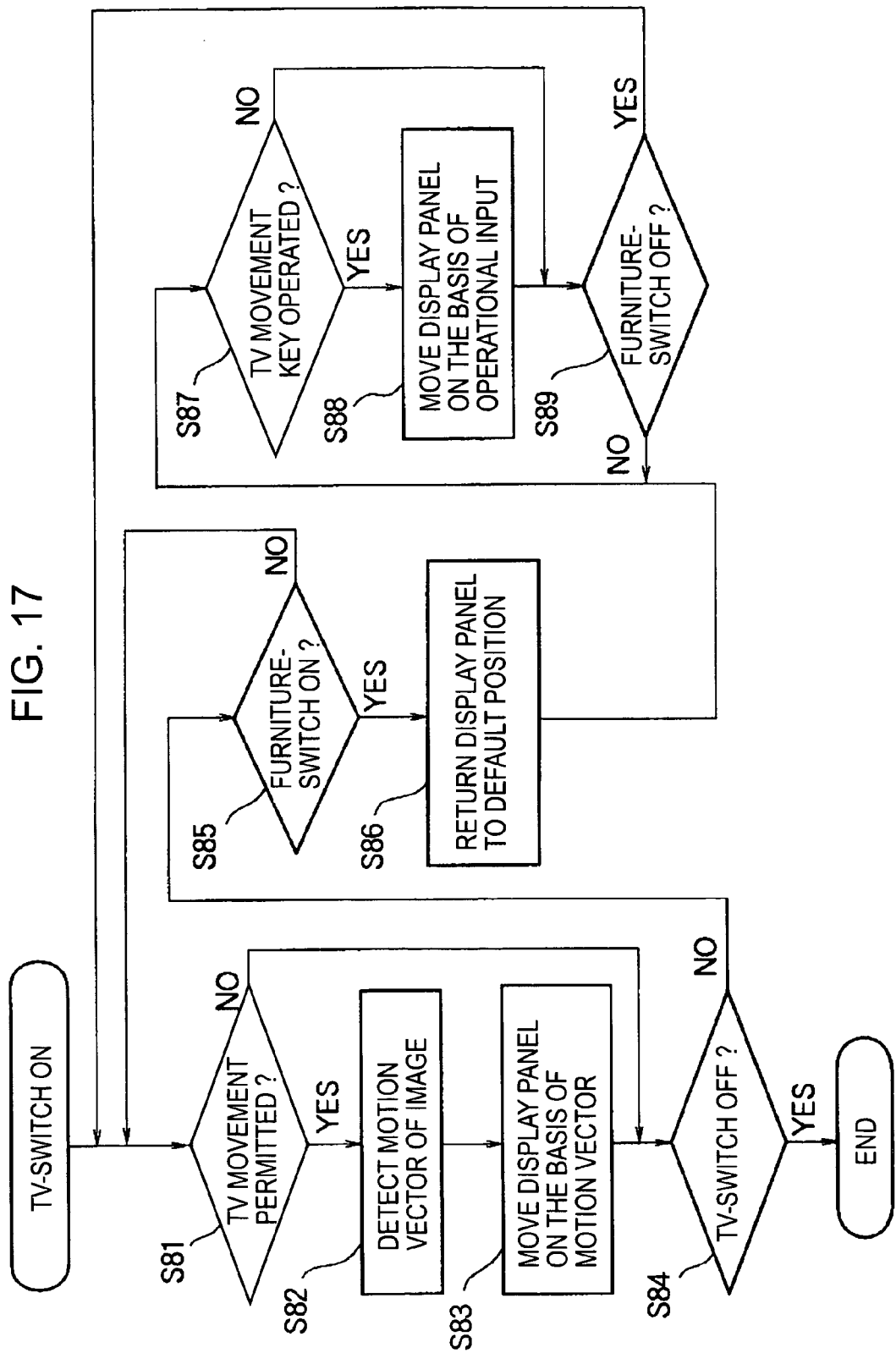
FIG. 17 is a flow chart illustrating the operation of the partition TV when the display mode is enabled and subsequently the partition mode is enabled.

When the display mode is enabled and subsequently the partition mode becomes enabled at step S85, the processes from step S87 through step S89 are repeated, as shown in FIG. 17, unless the partition mode is disabled. If the partition mode is disabled, the process returns to step S81.

In contrast, when the display mode is enabled and subsequently the partition mode becomes enabled at step S85 and when the partition mode is not disabled and the display mode becomes disabled during the repetitive process from step S87 through step S89, that is, when only the partition mode becomes enabled, the partition TV terminates the process of the flow chart shown in FIG. 17 and starts the process of the flow chart shown in FIG. 14.

Figure 18:
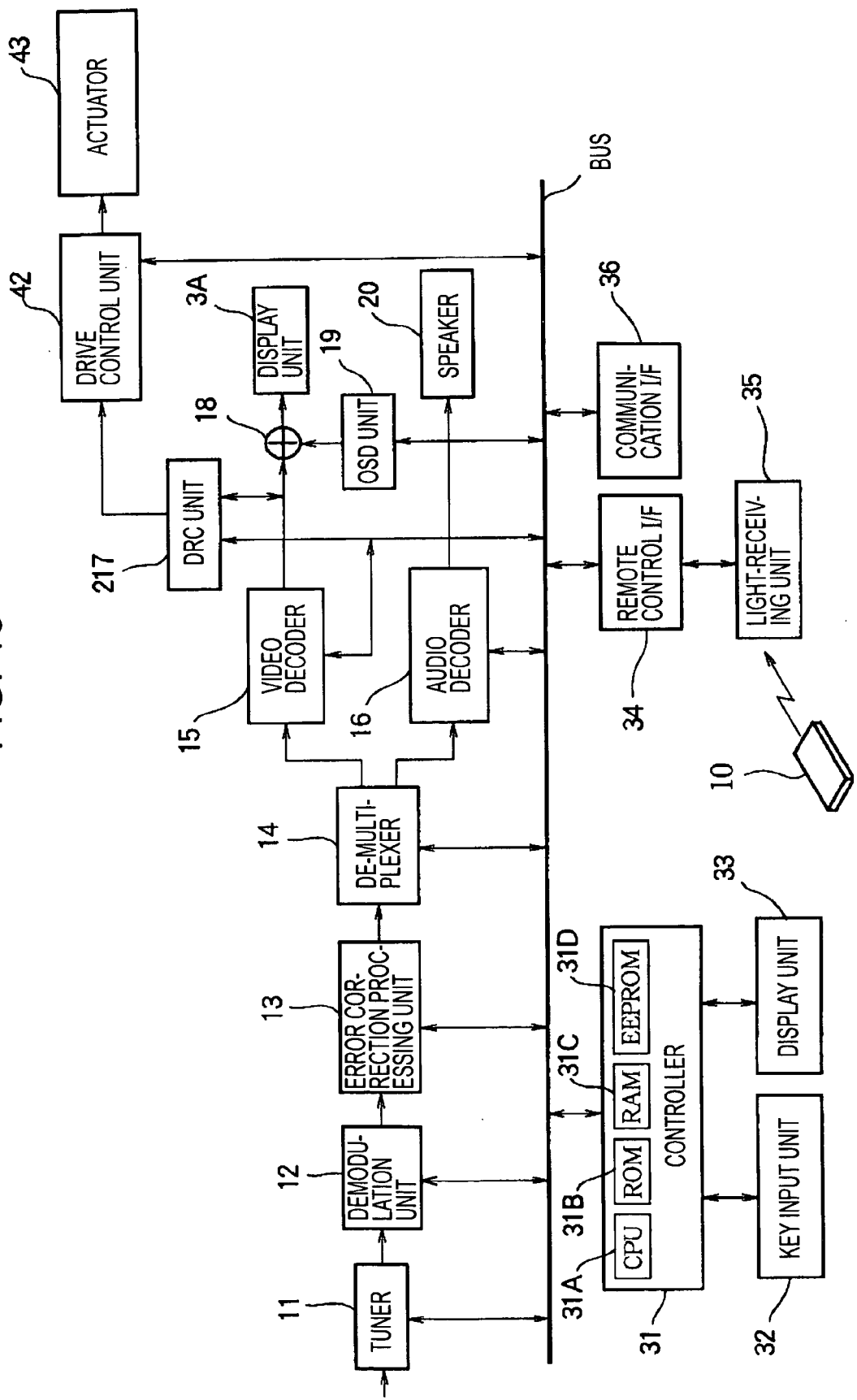
FIG. 18 is a block diagram of another electrical configuration of the partition TV.

FIG. 18 illustrates a block diagram of another electrical configuration of the partition TV shown in FIGS. 1 and 5. In the drawing, identical elements to those illustrated and described in relation to FIG. 8 are designated by identical reference numerals, and therefore, the descriptions are not repeated here. That is, the partition TV shown in FIG. 18 is basically identical to that shown in FIG. 8 except that the partition TV shown in FIG. 18 includes no motion vector detection unit 41 and includes a DRC unit 217 in place of the DRC unit 17.

In an image conversion process that converts a first image signal to a second image signal, the DRC unit 17 shown in FIGS. 8 and 9 carries out a class classification in which the pixel of interest is classed into one of a plurality of classes on the basis of the level of the pixels (i.e., pixel values) which are in the class tap from the class tap extraction unit 53 and which are distributed in a spatial or temporal direction in order to generate a class code representing the class of the pixel of interest. In the image conversion process, the DRC unit 217 shown in FIG. 18 further detects the motion of an image from the first image signal, which is a target of the image conversion process. The DRC unit 217 carries out the classification also using the result of the detection.

Figure 19:
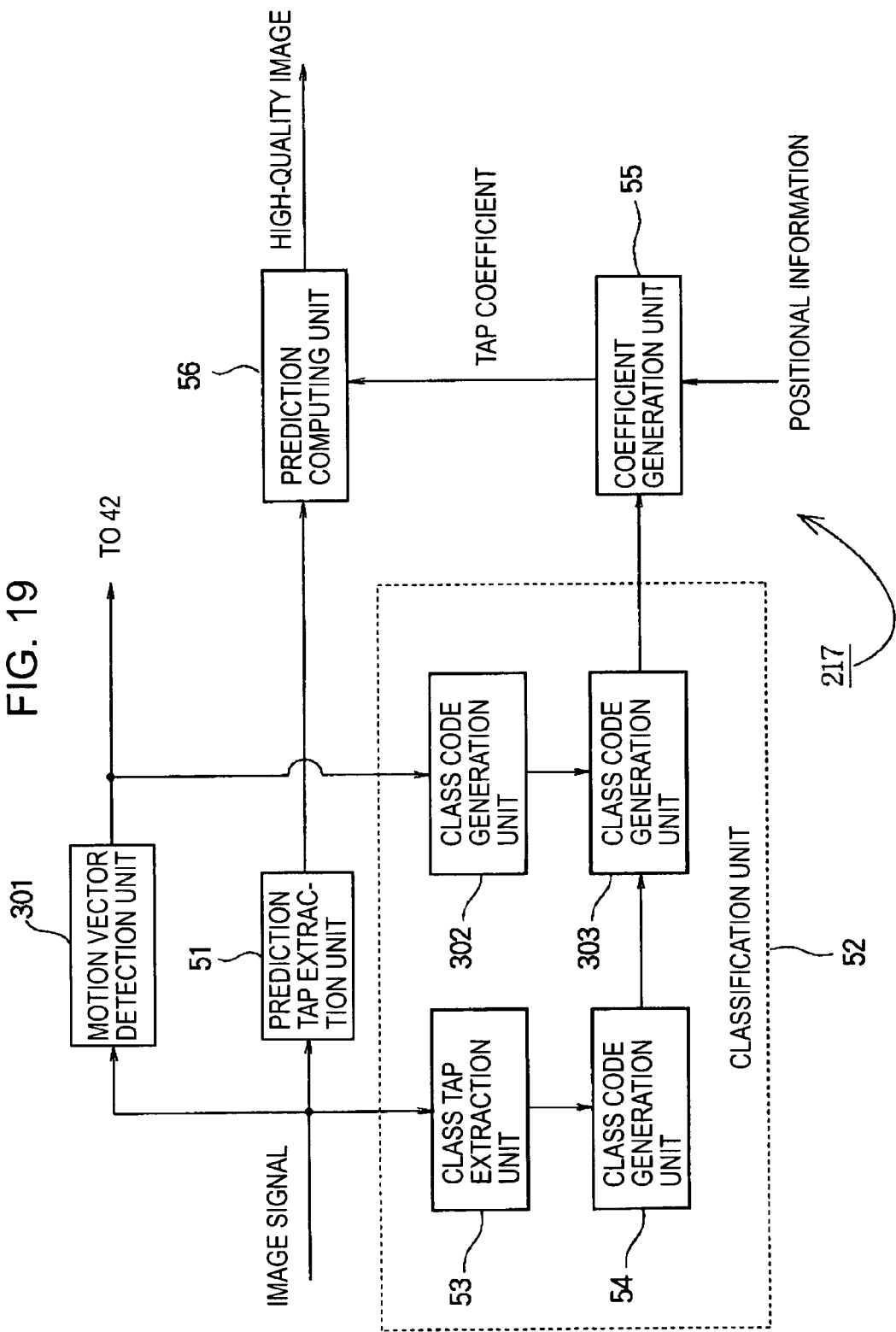
FIG. 19 is a block diagram of an example of the configuration of a DRC unit 217.

That is, FIG. 19 illustrates the exemplary configuration of the DRC unit 217 shown in FIG. 18. In the drawing, identical elements to those illustrated and described in relation to the DRC unit 17 shown in FIG. 9 are designated by identical reference numerals, and therefore, the descriptions are not repeated here. That is, the DRC unit 217 further includes a motion vector detection unit 301. The classification unit 52 includes class code generation units 302 and 303 in addition to the class tap extraction unit 53 and the class code generation unit 54. The other components of the DRC unit 217 are identical to those of the DRC unit 17.

The motion vector detection unit 301 receives an image signal from the video decoder 15 (see FIG. 18), namely, the first signal, which is a target of the image conversion process of the DRC unit 217. Like the motion vector detection unit 41 shown in FIG. 8, the motion vector detection unit 301 detects a motion vector representing a full screen motion on a frame basis from an image signal delivered from the video decoder 15 and delivers the detected motion vector to the class code generation unit 302 of the classification unit 52.

Additionally, the motion vector detection unit 301 delivers the motion vector to the drive control unit 42 shown in FIG. 18 as well as the class code generation unit 302. When the display mode is enabled, the drive control unit 42 shown in FIG. 18 drives the actuator 43 to move the display panel 3 on the basis of the motion vector delivered from the motion vector detection unit 301.

The class code generation unit 302 carries out a class classification in which a pixel of interest is classified into one of a plurality of classes on the basis of a motion vector obtained from, for example, the same frame as that of the pixel of interest among the motion vectors delivered from the motion vector detection unit 301. Thus, the class code generation unit 302 generates a class code representing the class of the pixel of interest and delivers it to the class code generation unit 303. The method for carrying out a class classification includes, for example, the following method: a motion vector is vector-quantized. The result of the vector quantization (i.e., a code assigned to a code vector (centroid vector) in the code book used for the vector quantization) is defined as the class code.

As used herein, the class code obtained by the class code generation unit 54 performing the class classification on a pixel of interest on the basis of the level of the pixels (i.e., pixel values) which are distributed in a spatial or temporal direction of the class tap is referred to as a "spatial or temporal class code". Additionally, the class code obtained by the class code generation unit 302 performing the class classification on a pixel of interest on the basis of the motion vector from the motion vector detection unit 301 is referred to as a "motion class code".

The class code generation unit 303 receives the spatial or temporal class code of the pixel of interest from the class code generation unit 54 in addition to the motion class code of the pixel of interest from the class code generation unit 302. The class code generation unit 303 generates a class code representing the final class of the pixel of interest on the basis of the motion class code of the pixel of interest from the class code generation unit 302 and the spatial or temporal class code of the pixel of interest from the class code generation unit 54. The class code generation unit 303 then delivers the class code to the coefficient generation unit 55.

That is, for example, the class code generation unit 303 generates, as a class code representing the final class of the pixel of interest, a bit string in which a bit string representing the motion class code is followed by a bit string representing the spatial or temporal class code.

Additionally, the coefficient generation unit 55 of the DRC unit 217 shown in FIG. 19 stores a tap coefficient for each class obtained by performing the same class classification as that performed by the classification unit 52 shown in FIG. 19, that is, a tap coefficient for each position among a plurality of positions of the display panel 3.

The image conversion process of the DRC unit 217 shown in FIG. 19 is described next with reference to a flow chart in FIG. 20, in which an image signal (a first image signal) output from the video decoder 15 is converted to a high-quality (high-resolution) image signal (a second image signal).

In the DRC unit 217, the same processes as those at step S11 through S13 in FIG. 13 are executed at step S101 through S103, respectively.

That is, as at step S11 shown in FIG. 13, the prediction tap extraction unit 51, at step S101, selects a pixel of interest from among pixels of the second image data previously not selected as a pixel of interest. Furthermore, the prediction tap extraction unit 51 extracts some of pixels (and pixel values thereof) of the first image signal used for predicting the pixel value of the pixel of interest as a prediction tap. The prediction tap extraction unit 51 then delivers the prediction tap of the pixel of interest to the prediction computing unit 56. The process then proceeds to step S102.

At step S102, as at step S12 shown in FIG. 13, the class tap extraction unit 53 extracts some of pixels of the first image signal used for performing a class classification of the pixel of interest as a class tap. The class tap extraction unit 53 then delivers the obtained class tap to the class code generation unit 54. The process then proceeds to step S103.

At step S103, as at step S13 shown in FIG. 13, the class code generation unit 54 classifies the pixel of interest on the basis of a pixel value (level) of a pixel of the class tap from the class tap extraction unit 53. The class code generation unit 54 generates a spatial or temporal class code corresponding to the class obtained from the classification. The class code generation unit 54 then delivers the spatial or temporal class code to the class code generation unit 303. Thereafter, the process proceeds to step S104.

At step S104, the motion vector detection unit 301 detects a motion vector of the first signal in the same frame as that of the pixel of interest and delivers the detected motion vector to the class code generation unit 302. The process then proceeds to step S105.

At step S105, the class code generation unit 302 classifies the pixel of interest on the basis of the motion vector delivered from the motion vector detection unit 301 and generates a motion class code corresponding to the obtained class. The class code generation unit 302 then delivers the motion class code to the class code generation unit 303. The process then proceeds to step S106.

Here, the motion vector detection unit 301 may detect a vector representing the motion of the class tap obtained by the class tap extraction unit 53, and the class code generation unit 302 may perform classification of the pixel of interest on the basis of the motion vector of the class tap.

At step S106, the class code generation unit 303 generates a class code representing the final class of the pixel of interest on the basis of the spatial or temporal class code of the pixel of interest from the class code generation unit 54 and the motion class code of the pixel of interest from the class code generation unit 302. The class code generation unit 303 delivers the generated class code to the coefficient generation unit 55. The process then proceeds to step S107.

At step S107, as at step S14 shown in FIG. 13, the switch control circuit 71 of the coefficient generation unit 55 (see FIG. 12) recognizes the position of the display panel 3. That is, the switch control circuit 71 receives the positional information delivered from the controller 31 (see FIG. 8) and recognizes the position of the display panel 3 indicated by the positional information.

The process then proceeds from step S107 to step S108. As at step S15 shown in FIG. 13, the switch control circuit 71 selects, from among the M coefficient generation circuits $81_1$ to $81_M$ shown in FIG. 12, the coefficient generation circuit $81_m$ corresponding to the position of the display panel 3 recognized from the positional information delivered from the controller 31. The process then proceeds to step S109. At step S109, the coefficient generation circuit $81_m$ selected by the switch control circuit 71 delivers the tap coefficient of the class corresponding to the class code delivered from the class code generation unit 303 to the prediction computing unit 56. The process then proceeds to step S110.

At step S110, as at step S17 shown in FIG. 13, the prediction computing unit 56 receives the prediction tap output from the prediction tap extraction unit 51 and the tap coefficient output from the coefficient generation unit 55 and performs a prediction calculation for equation (1) which finds a prediction value of the actual value of the pixel of interest using the prediction tap and the tap coefficient. Thus, the prediction computing unit 56 outputs the pixel value (the prediction value of the pixel value) of the pixel of interest, namely, the pixel value of the pixel of the second image signal.

Figure 20:
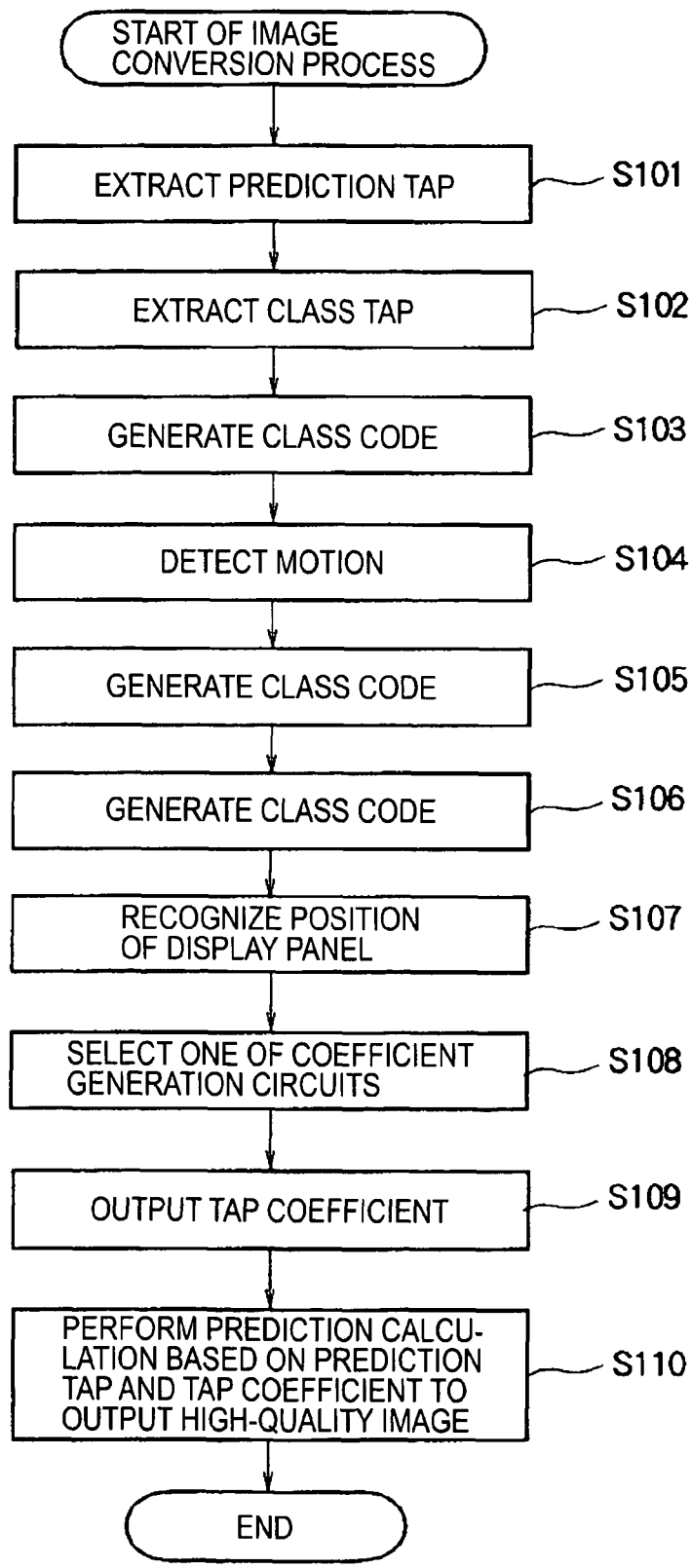
FIG. 20 is a flow chart illustrating an image conversion process of the DRC unit 217.

In the image conversion process shown in FIG. 20, pixels of the second image signal are sequentially selected as a pixel of interest.

As described above, the partition TV includes the display panel 3 for displaying an image, the remote control I/F 34 for receiving an operational input from a user (i.e., an operation signal from the remote control unit 10), and the drive control unit 42 capable of moving the display panel 3 by driving the actuator 43. Since the drive control unit 42 moves the display panel 3 on the basis of the operational input received by the remote control I/F 34 and changes the arrangement of the display panel 3 functioning as a partition, the partition TV can provide a convenient apparatus that functions as both a television receiver (display apparatus) and a partition.

The partition TV can also be considered to be a signal processing apparatus that functions as a television receiver and a partition by including signal processing means for processing an input signal (e.g., the motion vector detection unit 41 or the motion vector detection unit 301); reception means for receiving an operational input from a user (e.g., the remote control I/F 34); drive control means (e.g., the drive control unit 42) for controlling the actuator 43 to drive the partition TV (i.e., the top panel 2, the display panel 3, and the support panel 5) on the basis of the motion vector which is a signal obtained from the process (signal processing) of the motion vector detection unit 41 or the operational input received by the remote control I/F 34.

However, in such a signal processing apparatus, the signal processing means is not limited to the motion vector detection unit 41 and the reception means is not limited to the remote control I/F 34. Furthermore, the signal processing apparatus may be an apparatus that functions as an apparatus performing a signal processing other than that of a television receiver and a furniture other than a partition. Still furthermore, the signal processing apparatus may be an apparatus that functions as a plurality of apparatuses other than a television receiver and a partition.

Figure 21:
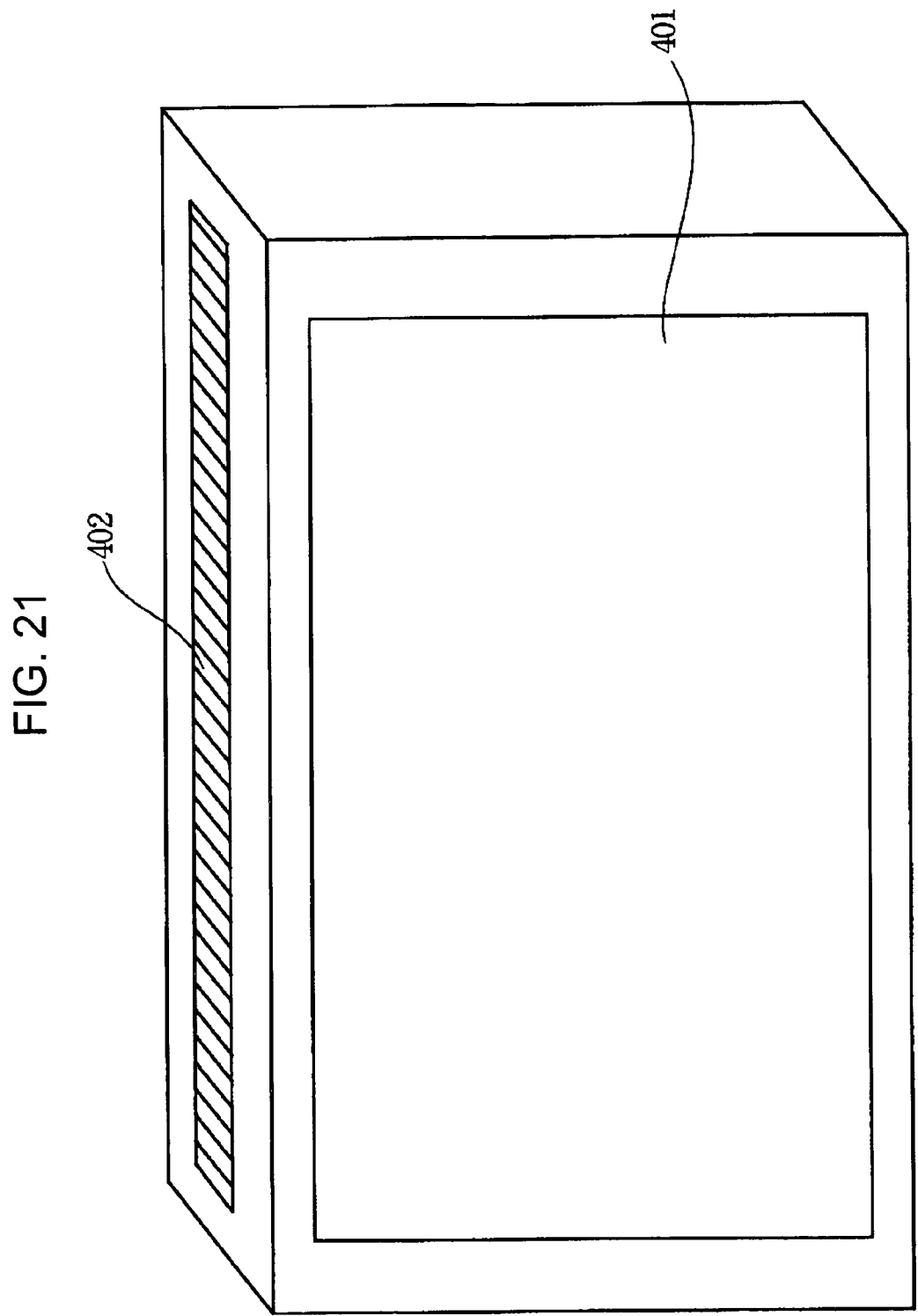
FIG. 21 illustrates a perspective view of an air conditioner TV.
Figure 22:
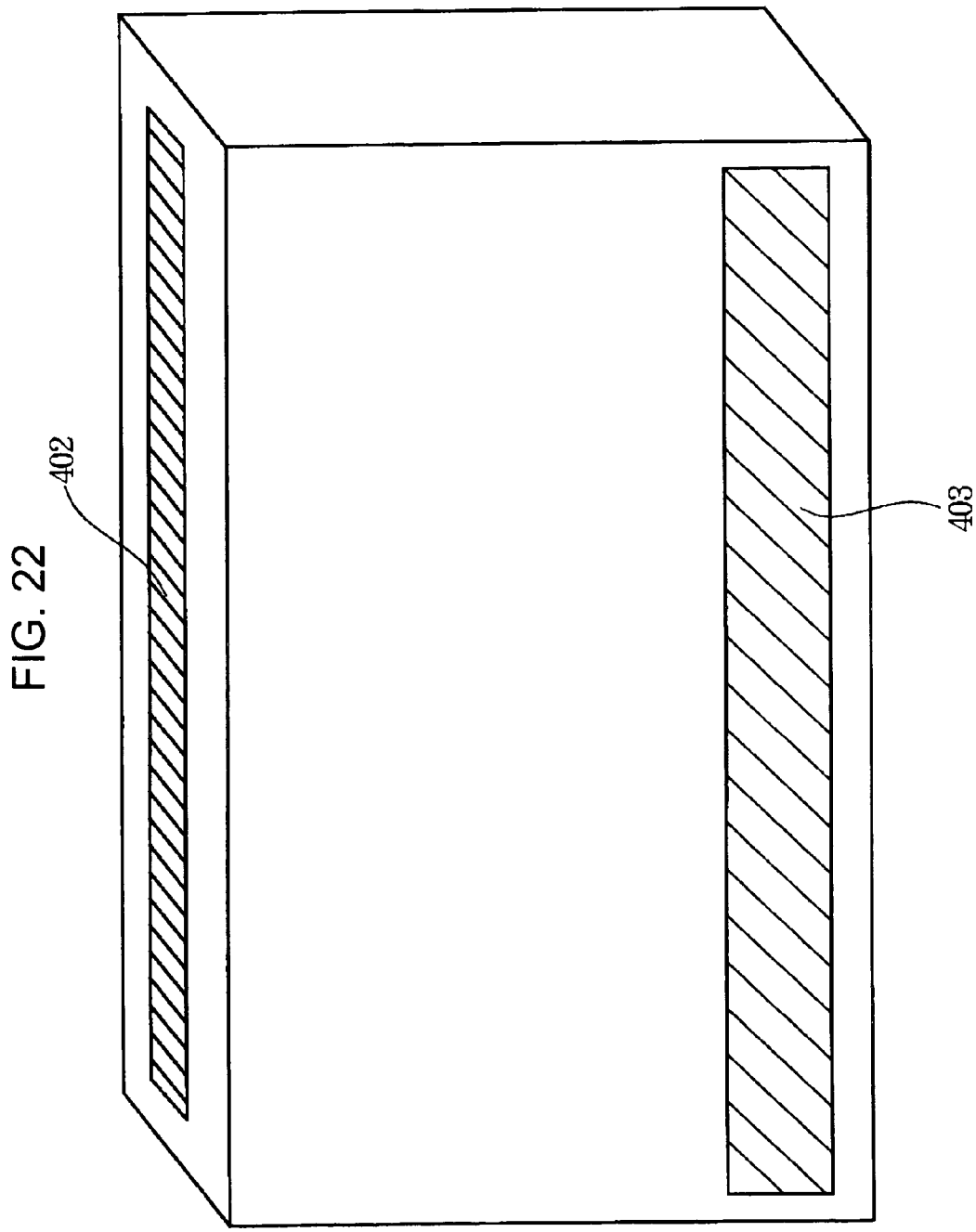
FIG. 22 illustrates a perspective view of the air conditioner TV.

FIGS. 21 and 22 illustrate perspective views of an air conditioner TV, which is a signal processing apparatus functioning as a television receiver and an air conditioner.

FIG. 21 illustrates a perspective view of the air conditioner TV viewed from the front thereof and FIG. 22 illustrates a perspective view of the air conditioner TV viewed from the back thereof.

By decreasing the thickness (the length in the depth direction) of the air conditioner TV to some degree, the air conditioner TV can function as a partition of furniture just like the partition TV.

However, when the air conditioner TV also functions as a partition, a heat problem may occur.

That is, in apparatuses having an electronic circuit (electric circuit) including a television receiver, an electrical current flowing in the electronic circuit generates heat, thus increasing the temperature. To prevent the temperature from rising, it is designed to dissipate the heat. For example, a normal television receiver is designed to dissipate the heat from the back surface thereof.

Like the normal television receiver, the air conditioner TV functioning as a partition can simply dissipate the heat from the back surface thereof. However, in this case, a user who sits on the back surface of the air conditioner TV functioning as a partition may feel uncomfortable due to the dissipation of heat, in particular, in the hot summer season.

In the cold winter season, for example, an air conditioner supplies heat. However, in general, an air conditioner is installed at a high position in a room and warm air heated by the air conditioner tends to stay at a high position in the room. Thus, it is difficult to warm the vicinity of a floor of the room.

Accordingly, the air conditioner TV shown in FIGS. 21 and 22 can adaptively change a direction to dissipate the heat (a heat dissipation direction).

That is, as shown in FIG. 21, a display unit 401 including, for example, a liquid crystal display panel or a display using a plasma display method is mounted on the front surface of the air conditioner TV.

Additionally, as shown in FIGS. 21 and 22, a rectangular air vent 402, for example, is provided on the top of the air conditioner TV to dissipate the heat. As shown in FIG. 22, a rectangular air vent 403, for example, is further provided on the lower section of the back surface of the air conditioner TV to dissipate the heat.

Figure 23:
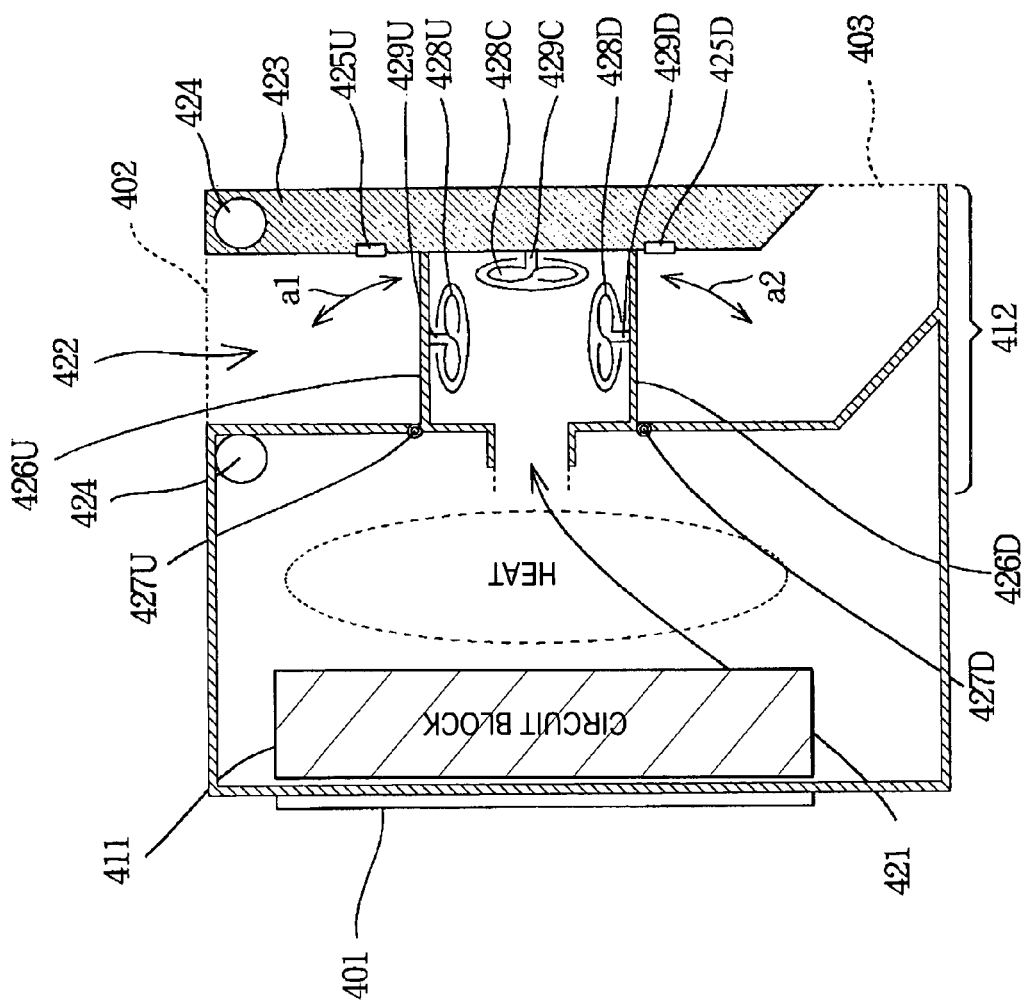
FIG. 23 illustrates a right side cross-sectional view of the structure of the air conditioner TV.

FIG. 23 illustrates a right side cross-sectional view of the air conditioner TV shown in FIGS. 21 and 22.

A circuit block 411, which is an electronic circuit (electric circuit) for processing signals, is disposed at the front side of the air conditioner TV, namely, at the side adjacent to the display unit 401. The circuit block 411 performs a signal process to allow the air conditioner TV to function as a television receiver and further performs a signal process to control a heat processing unit 412, which is described below, so as to allow the air conditioner TV to function as an air conditioner.

The heat processing unit 412 processes heat generated by the circuit block 411.

That is, when the circuit block 411 processes signals, an electrical current flows in an electronic circuit of the circuit block 411. The flow of the electrical current generates heat. The heat processing unit 412 processes the heat generated by the circuit block 411. Since the circuit block 411 generates heat, the circuit block 411 is considered to be a heat source.

The heat processing unit 412 is disposed on the back surface of the air conditioner TV. An intake port 421 is formed on a surface adjacent to the front of the air conditioner TV to draw air heated by the circuit block 411 serving as a heat source.

In the heat processing unit 412, the heated air transferred from the intake port 421 is led to a heat exhaust air duct 422. The heat exhaust air duct 422 is a cylindrical duct to dissipate the heat transferred from the intake port 421. It should be noted that the shape of the heat exhaust air duct 422 in cross section may be any shape. The heat exhaust air duct 422 communicates with the air vent 402 (see FIGS. 21 and 22) disposed on the top of the air conditioner TV and the air vent 403 (see FIG. 22) disposed in the lower section of the back surface of the air conditioner TV. Consequently, the heated air transferred from the intake port 421 is dissipated from the air vent 402 or 403 via the heat exhaust air duct 422.

A thermal insulator 423 is disposed on the back surface of the air conditioner TV to prevent the heat passing through the heat exhaust air duct 422 from dissipating through the back surface of the air conditioner TV. Consequently, a user sitting behind the air conditioner TV does not feel uncomfortable due to the unwanted heat dissipated from the back surface of the air conditioner TV.

Additionally, in the heat processing unit 412, a cooling pipe 424 is disposed in the vicinity of the air vent 402.

That is, the cooling pipe 424 is disposed in the vicinity of the air vent 402 and outside the heat exhaust air duct 422 such that the cooling pipe 424 surrounds the cylindrical heat exhaust air duct 422. The cooling pipe 424 is filled with cooling liquid. The circulation (flow) of the cooling liquid in the cooling pipe 424 cools the heated air dissipated from the heat exhaust air duct 422 via the air vent 402.

Furthermore, temperature sensors 425U and 425D are disposed on the upper and lower section of thermal insulator 423 facing the intake port 421, respectively. The temperature sensor 425U senses the temperature of the heated air passing through the heat exhaust air duct 422 and dissipated from the upper air vent 402. On the other hand, the temperature sensor 425D senses the temperature of the heated air passing through the heat exhaust air duct 422 and dissipated from the lower air vent 403.

In the heat processing unit 412, a flat plate cover 426U is disposed in the heat exhaust air duct 422 at a position above the intake port 421 to block the heated air flowing to the upper air vent 402. A part of periphery of the cover 426U is attached to a shaft 427U mounted in the heat exhaust air duct 422 at a position above the intake port 421. The cover 426U is pivotable about the shaft 427U so that the cover 426U is openable and closable, as shown by arrow a1. In FIG. 23, the cover 426U is in a closed condition.

A fan 428U is mounted on the lower surface of the cover 426U in a closed condition. That is, a shaft 429U is attached to the lower surface of the cover 426U in a closed condition. The fan 428U rotates about the shaft 429U so that an air flow is propagated downward.

Furthermore, in the heat processing unit 412, a flat plate cover 426D is disposed in the heat exhaust air duct 422 at a position under the intake port 421 to block the heated air flowing to the lower air vent 403. A part of periphery of the cover 426D is attached to a shaft 427D mounted in the heat exhaust air duct 422 at a position under the intake port 421. The cover 426D is pivotable about the shaft 427D so that the cover 426D is openable and closable, as shown by arrow a2. In FIG. 23, the cover 426D is in a closed condition.

A fan 428D is mounted on the upper surface of the cover 426D in a closed condition. That is, a shaft 429D is attached to the upper surface of the cover 426D in a closed condition. The fan 428D rotates about the shaft 429D so that an air flow is propagated upward.

The angle between the shaft 429D attached to the cover 426D and the cover 426D can be changed by, for example, a few degrees to few dozens of degrees so that the direction of the air flow generated by the rotation of the fan 428D can be changed.

In the heat processing unit 412, as well as the fans 428U and 428D, a fan 428C is mounted in the heat exhaust air duct 422 at a position opposed to the intake port 421. That is, a shaft 429C is attached to the inner wall of the heat exhaust air duct 422 at a position opposed to the intake port 421. The fan 428C rotates about the shaft 429C so that an air flow is propagated towards the intake port 421.

Like the shaft 429D, the angle between the shaft 429C and the inner wall of the heat exhaust air duct 422 can be changed by, for example, a few degrees to few dozens of degrees so that the direction of the air flow generated by the rotation of the fan 428C can be changed.

The air conditioner TV having such a structure adaptively changes the direction to dissipate the heat generated by the circuit block 411 in accordance with, for example, the seasons (in Japan).

That is, if the seasons are spring, summer, fall, and winter, the air conditioner TV provides four operation modes, namely, a spring mode, a summer mode, a fall mode, and a winter mode corresponding to the seasons.

Figure 24:
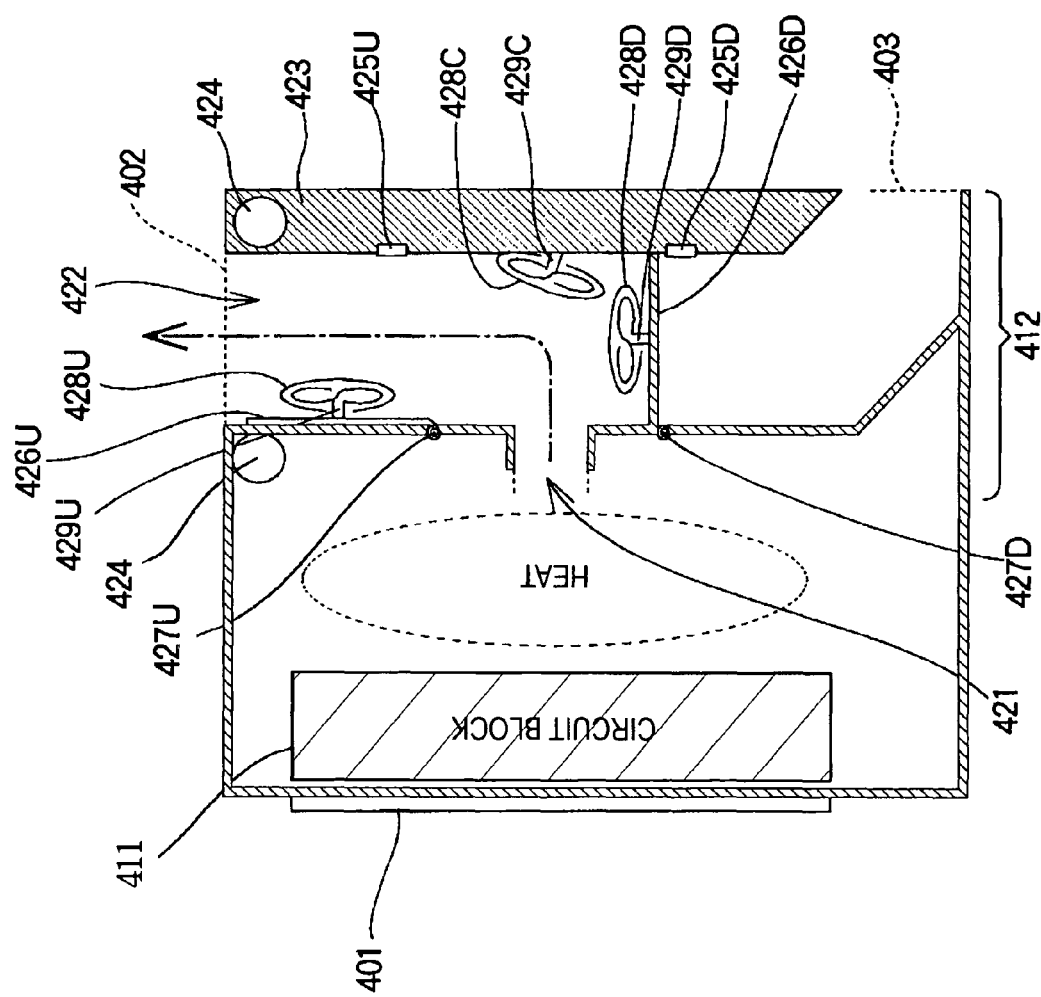
FIG. 24 illustrates a right side cross-sectional view of the structure of the air conditioner TV.

FIG. 24 illustrates a cross-sectional view of the air conditioner TV the same as that of FIG. 23 when the operation mode is a spring or summer mode.

In the spring or summer mode, the upper cover 426U is open and the lower cover 426D is closed. Thus, a route in which the heated air transferred from the intake port 421 is dissipated from the upper air vent 402 via the heat exhaust air duct 422 is created and a route in which the heated air is dissipated from the lower air vent 403 is blocked.

Additionally, in the spring or summer mode, the shaft 429C of the fan 428C is tilted so that the air flow generated by the fan 428C is directed obliquely upward.

Thereafter, the fan 428C starts rotating and an air flow is propagated obliquely upward. Thus, the heated air transferred from the intake port 421 is dissipated from the upper air vent 402.

Furthermore, the cooling liquid in the cooling pipe 424 is circulated and the fan 428D rotates as needed.

By circulating the cooling liquid in the cooling pipe 424, the heated air dissipated from the upper air vent 402 is cooled. Additionally, by rotating the fan 428D, an air flow is propagated upward in FIG. 24. Consequently, the heated air transferred from the intake port 421 is more rapidly dissipated from the upper air vent 402.

As described above, in the spring or summer mode, since the heated air is upwardly dissipated from the upper air vent 402, the user sitting behind the air conditioner TV is prevented from feeling uncomfortable due to the heat dissipated from the air conditioner TV, for example, in a hot summer.

Figure 25:
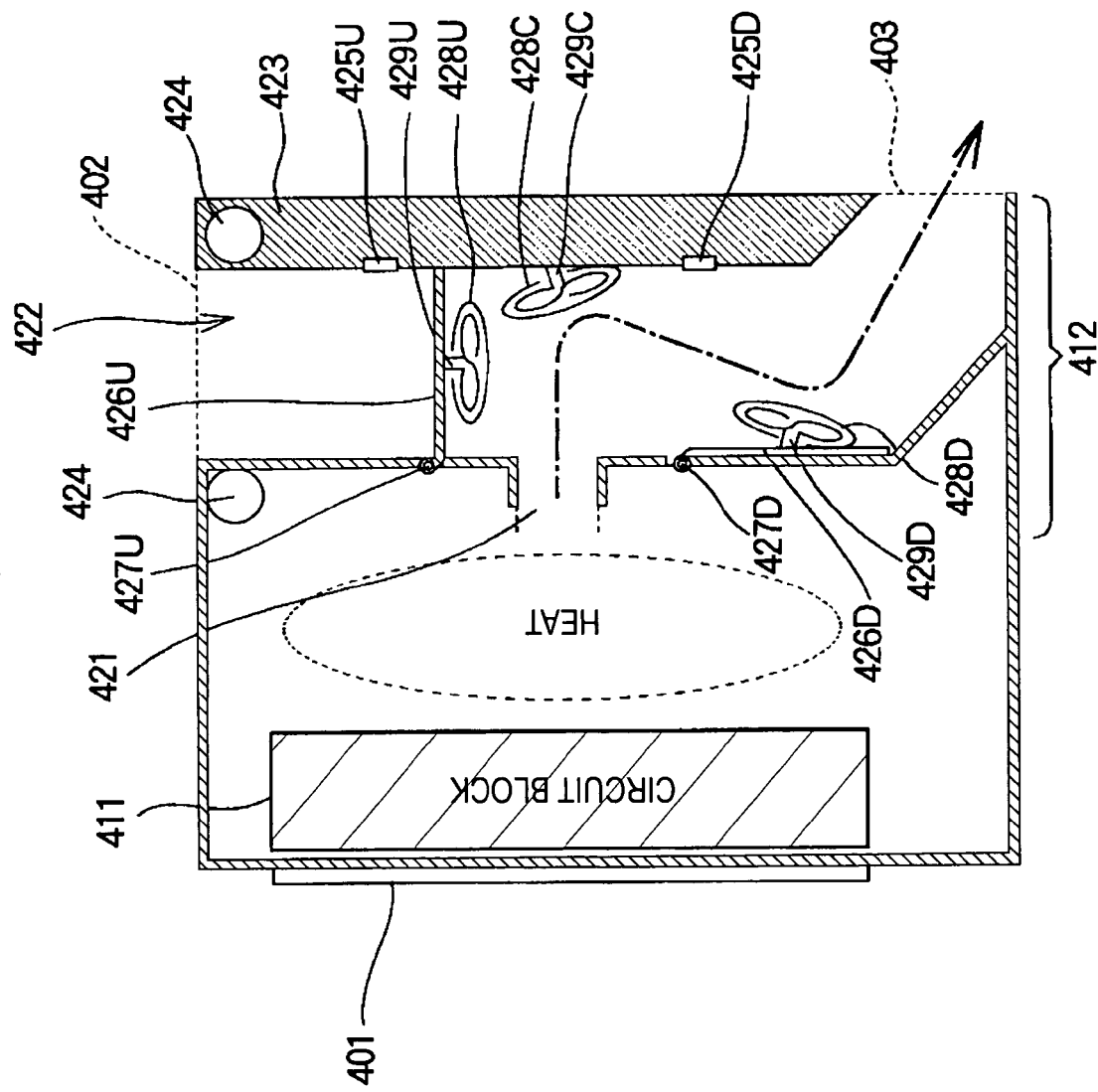
FIG. 25 illustrates a right side cross-sectional view of the air conditioner TV.

FIG. 25 illustrates a cross-sectional view of the air conditioner TV the same as that of FIG. 23 when the operation mode is a fall or winter mode.

In the fall or winter mode, the upper cover 426U is closed and the lower cover 426D is open. Thus, the route in which the heated air transferred from the intake port 421 is dissipated from the upper air vent 402 via the heat exhaust air duct 422 is blocked and the route in which the heated air is dissipated from the lower air vent 403 is created.

Additionally, in the fall or winter mode, the shaft 429C of the fan 428C is tilted so that an air flow generated by the fan 428C is directed obliquely downward.

Thereafter, the fans 428C and 428U start rotating and an air flow is propagated downward. Thus, the heated air transferred from the intake port 421 is dissipated from the lower air vent 403.

Furthermore, the shaft 429D of the fan 428D attached to the open cover 426D is tilted so that the air flow direction of the fan 428D is determined to be obliquely downward and the fan 428D starts rotating as needed.

In this case, the air flow is propagated downward more strongly. Consequently, the heated air transferred from the intake port 421 is more rapidly dissipated from the lower air vent 403.

As described above, in the spring or summer mode, since the heated air is dissipated from the lower air vent 403, the vicinity of the floor can be efficiently heated, for example, in a cold winter. That is, the heat generated by the circuit block 411 is efficiently utilized for heating.

Although not shown in FIGS. 23 through 25, an actuator (e.g., a motor) is attached to the heat processing unit 412 as needed. The actuator attached to the heat processing unit 412 rotates the fans 428C, 428D, and 428U, tilts the shafts 429C and 429D, opens and closes the covers 426D and 426U, and circulates the cooling liquid in the cooling pipe 424.

Figure 26:
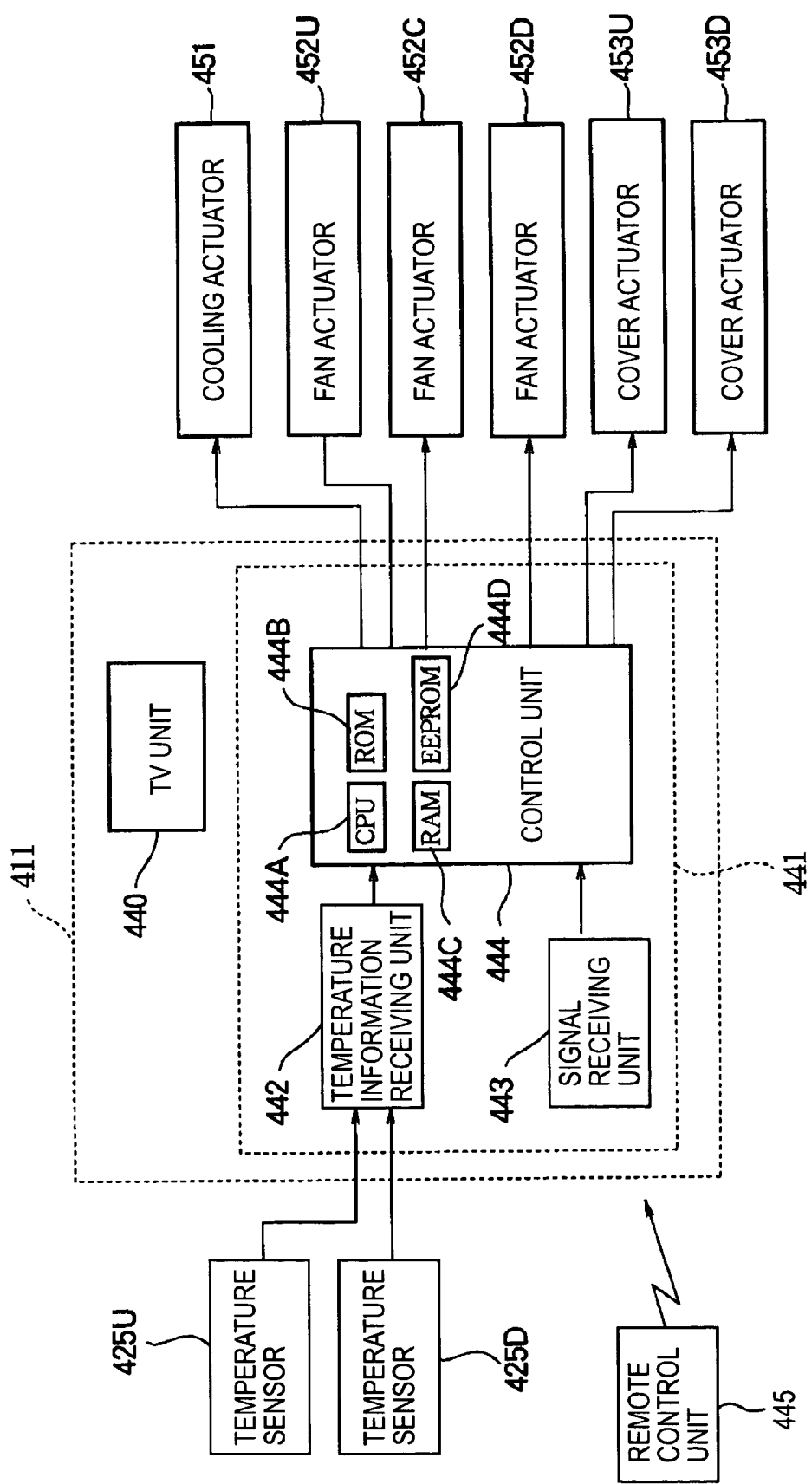
FIG. 26 is a block diagram of the electrical configuration of a circuit block 411.

FIG. 26 illustrates the electrical configuration of the circuit block 411 shown in FIG. 23.

The circuit block 411 includes a TV unit 440 and an air conditioner unit 441.

The TV unit 440 performs signal processing for the air conditioner TV to function as a television receiver.

The air conditioner unit 441 includes a temperature information receiving unit 442, a signal receiving unit 443, and a control unit 444 to control the heat processing unit 412 (see FIG. 23).

That is, the temperature information receiving unit 442 receives temperature information which indicates the temperature in the heat exhaust air duct 422 and which is output from the temperature sensors 425U and 425D. The temperature information receiving unit 442 then delivers the temperature information to the control unit 444.

The signal receiving unit 443 receives, for example, an operation signal from a remote control unit 445 operated by a user to remotely control the air conditioner TV, namely, a signal corresponding to the user operation when the user operates the remote control unit 445. The signal receiving unit 443 then delivers the operation signal to the control unit 444.

The control unit 444 includes a CPU 444A, a ROM 444B, a RAM 444C, and an EEPROM 444D. The CPU 444A executes programs stored in the ROM 444B and the EEPROM 444D. The CPU 444A also executes programs loaded in the RAM 444C. The ROM 444B stores a program to be executed first when power is supplied to the control unit 444 and data required for the program. The EEPROM 444D stores a variety of application programs to be executed by the CPU 444A and data required for the programs. The application program to be executed by the CPU 444A is loaded in the RAM 444C from the EEPROM 444D. The RAM 444C also stores data required for the execution of the CPU 444A.

In the control unit 444, the CPU 444A executes the programs stored in the ROM 444B and the EEPROM 444D and the programs loaded in the RAM 444C to perform a variety of processes including processes described below. Thus, the control unit 444 controls, for example, a cooling actuator 451, fan actuators 452U, 452C, and 452D, and a cover actuators 453U and 453D.

The programs to be executed by the CPU 444A can be preinstalled in the ROM 444B or the EEPROM 444D. Alternatively, the programs can be supplied as package software by being temporarily or permanently stored (recorded) in a removable recoding medium, such as a flexible disk, a CD-ROM, an MO disk, a DVD, a magnetic disk, and a semiconductor memory.

Furthermore, the programs can be wirelessly transferred to the air conditioner TV from a download site via an artificial satellite for digital satellite broadcast or can be transferred to the air conditioner TV by wire from the download site via a network, such as a local area network (LAN) or the Internet. The air conditioner TV can receive the transferred programs and install them in the EEPROM 444D.

The cooling actuator 451, the fan actuators 452U, 452C, and 452D, and the cover actuators 453U and 453D are mounted in the heat processing unit 412 (none are shown in FIGS. 23 through 25).

The cooling actuator 451 circulates cooling liquid in the cooling pipe 424 (see FIG. 23) under the control of the control unit 444.

The fan actuators 452U, 452C, and 452D drive the fans 428U, 428C, and 428D to rotate, respectively, under the control of the control unit 444. Additionally, the fan actuators 452C and 452D tilt the shafts 429C and 429D (change the tilt angles of the shafts 429C and 429D), respectively, under the control of the control unit 444.

The cover actuators 453U and 453D drive the covers 426U and 426D to be open or closed, respectively, under the control of the control unit 444.

Figure 27:
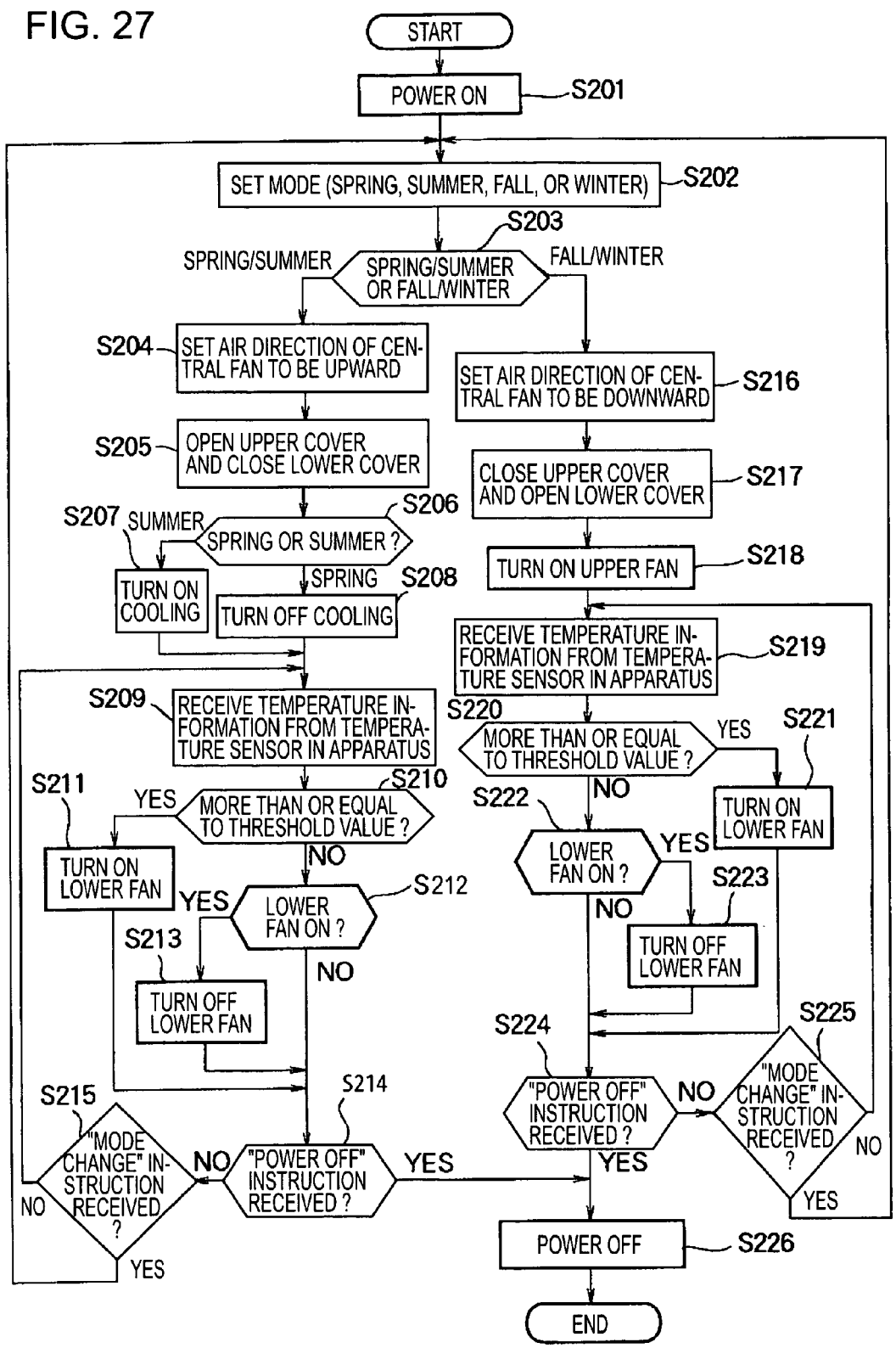
FIG. 27 is a flow chart illustrating the operation of the air conditioner TV.

The operation of the air conditioner TV is described below with reference to a flow chart shown in FIG. 27.

For example, when a user operates the remote control unit 445 to power on the air conditioner TV, the remote control unit 445 transmits an operation signal corresponding to the operation. The operation signal is received by the signal receiving unit 443 and is delivered to the control unit 444. Upon receiving the operation signal instructing power-on of the air conditioner TV from the signal receiving unit 443, the control unit 444, at step S201, starts supplying power from a power supply (not shown) to each block of the air conditioner TV. The process then proceeds to step S202.

At step S202, the control unit 444 determines the operation mode.

That is, for example, the remote control unit 445 includes a key for inputting the operation mode. When the user operates the key and the signal receiving unit 443 receives an operation signal corresponding to the operation and delivers it to the control unit 444, the control unit 444, at step S202, sets the operation mode corresponding to the operation signal from the signal receiving unit 443. More specifically, if the operation signal indicates one of the spring, summer, fall, and winter modes, the control unit 444 sets a flag for indicating an operation mode in the EEPROM 444D to indicate the operation mode corresponding to the operation signal.

When a remote control unit of an air conditioner (not shown) is operated, the signal receiving unit 443 can receive an operation signal corresponding to the operation of the air conditioner and deliver it to the control unit 444. In this case, if the operation signal from the remote control unit of the air conditioner instructs the cooling mode to turn on or off, the control unit 444, at step S202, determines the operation mode to be a summer mode. In contrast, if the operation signal from the remote control unit of the air conditioner instructs the heating mode to turn on or off, the control unit 444, at step S202, determines the operation mode to be a winter mode.

After the operation mode is set at step S202, the process proceeds to step S203, where the control unit 444 determines which one of the spring, summer, fall, and winter modes corresponds to the current operation mode.

If it is determined at step S203 that the current operation mode is one of the spring and summer modes, that is, if it is determined that information indicating the spring or summer mode is set to the operation mode flag in the EEPROM 444D, the process proceeds to step S204. The heat processing unit 412 (see FIG. 23) includes the fan 428U attached to the upper section thereof (hereinafter also referred to an upper fan), the fan 428D attached to the lower section thereof (hereinafter also referred to an lower fan), and the fan 428C attached to the central section thereof (hereinafter also referred to an central fan). At step S204, the control unit 444 drives the fan actuator 452C to tilt the shaft 429C of the central fan 428C so that an air flow generated by the central fan 428C is propagated obliquely upwards. The process then proceeds to step S205.

Thus, as shown in FIG. 24, the shaft 429C of the central fan 428C is tilted so that the direction of the air flow generated by the central fan 428C is obliquely upward.

Additionally, at step S204, the control unit 444 drives the fan actuator 452C, which rotates the central fan 428C, to rotate the central fan 428C.

Thus, an air flow is propagated upward in the heat exhaust air duct 422.

At step S205, the control unit 444 drives the cover actuator 453U, which opens and closes the upper cover 426U of the heat processing unit 412 (see FIG. 23), to open the upper cover 426U and drives the cover actuator 453D, which opens and closes the lower cover 426D, to close the lower cover 426D.

Thus, as shown in FIG. 24, a route in which the heated air transferred from the intake port 421 is dissipated from the upper air vent 402 via the heat exhaust air duct 422 is created and a route in which the heated air is dissipated from the lower air vent 403 is blocked.

As described above, in the spring or summer mode, the air flow is propagated upward in the heat exhaust air duct 422. Furthermore, a route in which the heated air transferred from the intake port 421 is dissipated from the upper air vent 402 via the heat exhaust air duct 422 is created and a route in which the heated air is dissipated from the lower air vent 403 is blocked.

As a result, the heat air transferred from the intake port 421 is upwardly dissipated from only the upper air vent 402 without being dissipated from the lower air vent 403. Consequently, a user sitting behind the air conditioner TV does not feel uncomfortable due to the heat dissipated from the circuit block 411.

After the process at step S205 is performed, the process proceeds to step S206, where the control unit 444 determines which one of the spring and summer modes corresponds to the current operation mode.

If, at step S206, it is determined that the current operation mode is the summer mode, the process proceeds to step S207, where the control unit 444 drives the cooling actuator 451 to circulate the cooling liquid in the cooling pipe 424. The process then proceeds to step S209.

Thus, the heated air transferred from the intake port 421 is cooled by the cooling liquid in the cooling pipe 424 immediately before being dissipated from the upper air vent 402. The heated air is then dissipated from the upper air vent 402. That is, in a hot summer suitable for the summer mode, the heated air dissipated from the upper air vent 402 may raise the temperature of the room although the user would not feel uncomfortable due to the direct heated air. As a result, the user may feel uncomfortable due to the indirect heated air. Accordingly, in the summer mode, the heated air transferred from the intake port 421 is dissipated from the upper air vent 402 after the heated air is cooled by the cooling liquid in the cooling pipe 424.

In contrast, if it is determined at step S206 that the current operation mode is the spring mode, the process proceeds to step S208, where the control unit 444 controls the cooling actuator 451 to stop the circulation of the cooling liquid in the cooling pipe 424. The process then proceeds to step S209. If the circulation of the cooling liquid has been already stopped, the process at step S208 is skipped.

At step S209, the temperature information receiving unit 442 receives the temperature information from the upper temperature sensor 425U, which is one of the upper temperature sensor 425U and the lower temperature sensor 425D, that is, the temperature information receiving unit 442 receives the temperature information indicating the temperature of the heated air transferred from the intake port 421 and dissipated from the upper air vent 402. The temperature information receiving unit 442 delivers the temperature information to the control unit 444. The process then proceeds to step S210.

At step S210, the control unit 444 determines whether the temperature represented by the temperature information from the upper temperature sensor 425U is higher than or equal to a predetermined threshold value.

If it is determined at step S210 that the temperature represented by the temperature information from the upper temperature sensor 425U is higher than or equal to a predetermined threshold value, the process then proceeds to step S211. At step S211, as shown in FIG. 24, the control unit 444 drives the fan actuator 452D, which rotates the lower fan 428D attached to the closed lower cover 426D, to rotate the lower fan 428D. The process then proceeds to step S214.

Consequently, when the temperature of the heated air transferred from the intake port 421 and dissipated from the upper air vent 402 is high, the central fan 428C and the lower fan 428D rotate so that a stronger air flow is propagated upwards. Thus, the heated air transferred from the intake port 421 is more rapidly dissipated from the upper air vent 402.

Here, the heat transferred from the intake port 421, namely, the air heated by this heat moves upward without the help of the upward air flow generated by the fan. Therefore, at step S204, only the central fan 428C, which is one of the central fan 428C and the lower fan 428D, is rotated and the lower fan 428D is not rotated. However, at step S204, both the central fan 428C and lower fan 428D may be rotated.

If, at step S211, the lower fan 428D has already rotated, the process at step S211 is skipped.

In contrast, if it is determined at step S210 that the temperature represented by the temperature information from the upper temperature sensor 425U is lower than the predetermined threshold value, the process then proceeds to step S212. At step S212, the control unit 444 then determines whether the lower fan 428D is rotating. If it is determined at step S212 that the lower fan 428D is not rotating, the process at step S213 is skipped. The process then proceeds to step S214.

If it is determined at step S212 that the lower fan 428D is rotating, that is, if it is determined that the lower fan 428D is unnecessarily rotating although the temperature represented by the temperature information from the upper temperature sensor 425U, namely, the temperature of the heated air transferred from the intake port 421 and dissipated from the upper air vent 402 is low and the rapid dissipation of the heated air is not necessary, the process then proceeds to step S213. At step S213, the control unit 444 controls the fan actuator 452D to stop the rotation of the fan 428D. The process then proceeds to step S214.

At step S214, the control unit 444 determines whether it has received the instruction to power off the air conditioner TV. If it is determined at step S214 that the control unit 444 has received the instruction to power off the air conditioner TV, that is, if, for example, the user operates the remote control unit 445 to power off the air conditioner TV and the operation signal corresponding to the operation is transmitted from the remote control unit 445 and if the operation signal is received by the signal receiving unit 443 and is delivered to the control unit 444, the process then proceeds to step S226. At step S226, the control unit 444 stops supplying power from a power supply (not shown) to each block of the air conditioner TV. The process is then completed.

If it is determined at step S214 that the control unit 444 has received no instruction to power off the air conditioner TV, the process then proceeds to step S215. At step S215, the control unit 444 determines whether it has received the instruction to change the operation mode of the air conditioner TV.

If it is determined at step S215 that the control unit 444 has received no instruction to change the operation mode of the air conditioner TV, the process returns to step S209, where the same subsequent processes are repeated.

If it is determined at step S215 that the control unit 444 has received the instruction to change the operation mode of the air conditioner TV, that is, if, for example, the user operates the remote control unit 445 to input the operation mode and the operation signal corresponding to the operation is transmitted from the remote control unit 445 and if the operation signal is received by the signal receiving unit 443 and is delivered to the control unit 444, the process then returns to step S202. At step S202, the operation mode is set (changed) in response to the instruction to change the operation mode. Thereafter, the same subsequent processes are repeated.

In contrast, if it is determined at step S203 that the current operation mode is one of the fall and winter modes, that is, if it is determined that information indicating the fall or winter mode is set to the operation mode flag in the EEPROM 444D, the process proceeds to step S216. At step S216, the control unit 444 drives the fan actuator 452C to tilt the shaft 429C of the central fan 428C, which is one of the upper fan 428U, the lower fan 428D, and the central fan 428C of the heat processing unit 412 (see FIG. 23), so that an air flow generated by the central fan 428C is propagated obliquely downwards. The process then proceeds to step S217.

Thus, as shown in FIG. 25, the shaft 429C of the central fan 428C is tilted so that the air flow generated by the central fan 428C is propagated obliquely downward.

Additionally, at step S216, the control unit 444 drives the fan actuator 452C, which rotates the central fan 428C, to rotate the central fan 428C.

Thus, the air flow is propagated downward in the heat exhaust air duct 422.

At step S217, the control unit 444 drives the cover actuator 453U, which opens and closes the upper cover 426U of the heat processing unit 412 (see FIG. 23), to close the upper cover 426U and drives the cover actuator 453D, which opens and closes the lower cover 426D, to open the lower cover 426D.

Thus, as shown in FIG. 25, a route in which the heated air transferred from the intake port 421 is dissipated from the upper air vent 402 via the heat exhaust air duct 422 is blocked and a route in which the heated air is dissipated from the lower air vent 403 is created.

As described above, in the fall or winter mode, the air flow is propagated downward in the heat exhaust air duct 422. Furthermore, a route in which the heated air transferred from the intake port 421 is dissipated from the upper air vent 402 via the heat exhaust air duct 422 is blocked and a route in which the heated air is dissipated from the lower air vent 403 is created.

As a result, the heated air transferred from the intake port 421 is dissipated from only the lower air vent 403 along the floor without being dissipated from the upper air vent 402. Consequently, in low-temperature fall and winter seasons suitable for the fall and winter modes, the heat dissipated from the circuit block 411 can be efficiently utilized to warm the vicinity of the floor.

After the process at step S217 is performed, the process proceeds to step S218, where, as shown in FIG. 25, the control unit 444 drives the fan actuator 452U, which rotates the upper fan 428U attached to the closed upper cover 426U, to rotate the upper fan 428U. The process then proceeds to step S219.

Accordingly, in this case, the central fan 428C and the upper fan 428U rotate so that a stronger air flow is propagated downward. Thus, the heated air transferred from the intake port 421 is more rapidly dissipated from the lower air vent 403.

Here, the heat transferred from the intake port 421, namely, the air heated by this heat has a characteristic to move upward. Therefore, to dissipate the heat from the lower air vent 403, the stronger downward air flow is generated by rotating both the central fan 428C and the upper fan 428U.

At step S219, the temperature information receiving unit 442 receives the temperature information from the temperature sensor 425D, which is one of the upper temperature sensor 425U and the lower temperature sensor 425D, that is, the temperature information receiving unit 442 receives the temperature information indicating the temperature of the heated air transferred from the intake port 421 and dissipated from the lower air vent 403. The temperature information receiving unit 442 delivers the temperature information to the control unit 444. The process then proceeds to step S220.

At step S220, the control unit 444 determines whether the temperature represented by the temperature information from the lower temperature sensor 425D is higher than or equal to a predetermined threshold value.

If it is determined at step S220 that the temperature represented by the temperature information from the lower temperature sensor 425D is higher than or equal to a predetermined threshold value, the process then proceeds to step S221. At step S221, as shown in FIG. 25, the control unit 444 tilts the shaft 429D of the lower fan 428D so that the air flow generated by the lower fan 428D attached to the open lower cover 426D is propagated obliquely downward, and drives the fan actuator 452D, which rotates the fan 428D. The process then proceeds to step S224. Thus, the stronger air flow is propagated in the heat exhaust air duct 422.

Consequently, when the temperature of the heated air transferred from the intake port 421 and dissipated from the lower air vent 403 is high, the central fan 428C, the upper fan 428U, and also the lower fan 428D rotate so that an air flow is propagated downward. Thus, the heated air transferred from the intake port 421 is more rapidly dissipated from the lower air vent 403 than in the case where only the central fan 428C and the upper fan 428U rotate.

If, at step S221, the lower fan 428D has already rotated, the process at step S221 is skipped.

In contrast, if it is determined at step S220 that the temperature represented by the temperature information from the lower temperature sensor 425D is lower than the predetermined threshold value, the process then proceeds to step S222. At step S222, the control unit 444 then determines whether the lower fan 428D is rotating. If it is determined at step S222 that the lower fan 428D is not rotating. The process at step S223 is skipped. The process then proceeds to step S224.

If it is determined at step S222 that the lower fan 428D is rotating, that is, if it is determined that the lower fan 428D is unnecessarily rotating although the temperature represented by the temperature information from the lower temperature sensor 425D, namely, the temperature of the heated air transferred from the intake port 421 and dissipated from the lower air vent 403 is low and the rapid dissipation of the heated air is not necessary, the process then proceeds to step S223. At step S223, the control unit 444 drives the fan actuator 452D to stop the rotation of the fan 428D. The process then proceeds to step S224.

At step S224, as at step S214, the control unit 444 determines whether it has received the instruction to power off the air conditioner TV.

If it is determined at step S224 that the control unit 444 has not received an instruction to power off the air conditioner TV, the process then proceeds to step S225. At step S225, the control unit 444, as at step S215, determines whether it has received the instruction to change the operation mode of the air conditioner TV.

If it is determined at step S225 that the control unit 444 has not received an instruction to change the operation mode of the air conditioner TV, the process returns to step S219, where the same subsequent processes are repeated.

If it is determined at step S225 that the control unit 444 has received the instruction to change the operation mode of the air conditioner TV, the process then returns to step S202. At step S202, the operation mode is set (changed) in response to the instruction to change the operation mode. Thereafter, the same subsequent processes are repeated.

In contrast, if it is determined at step S224 that the control unit 444 has received the instruction to power off the air conditioner TV, the process then proceeds to step S226. At step S226, the control unit 444 stops supplying power from a power supply (not shown) to each block of the air conditioner TV, as described above. The process is then completed.

The heat processing unit 412 of the air conditioner TV has the structure shown in FIG. 23. However, the heat processing unit 412 may have the structure, for example, shown in FIGS. 28 and 29.

Figure 28:
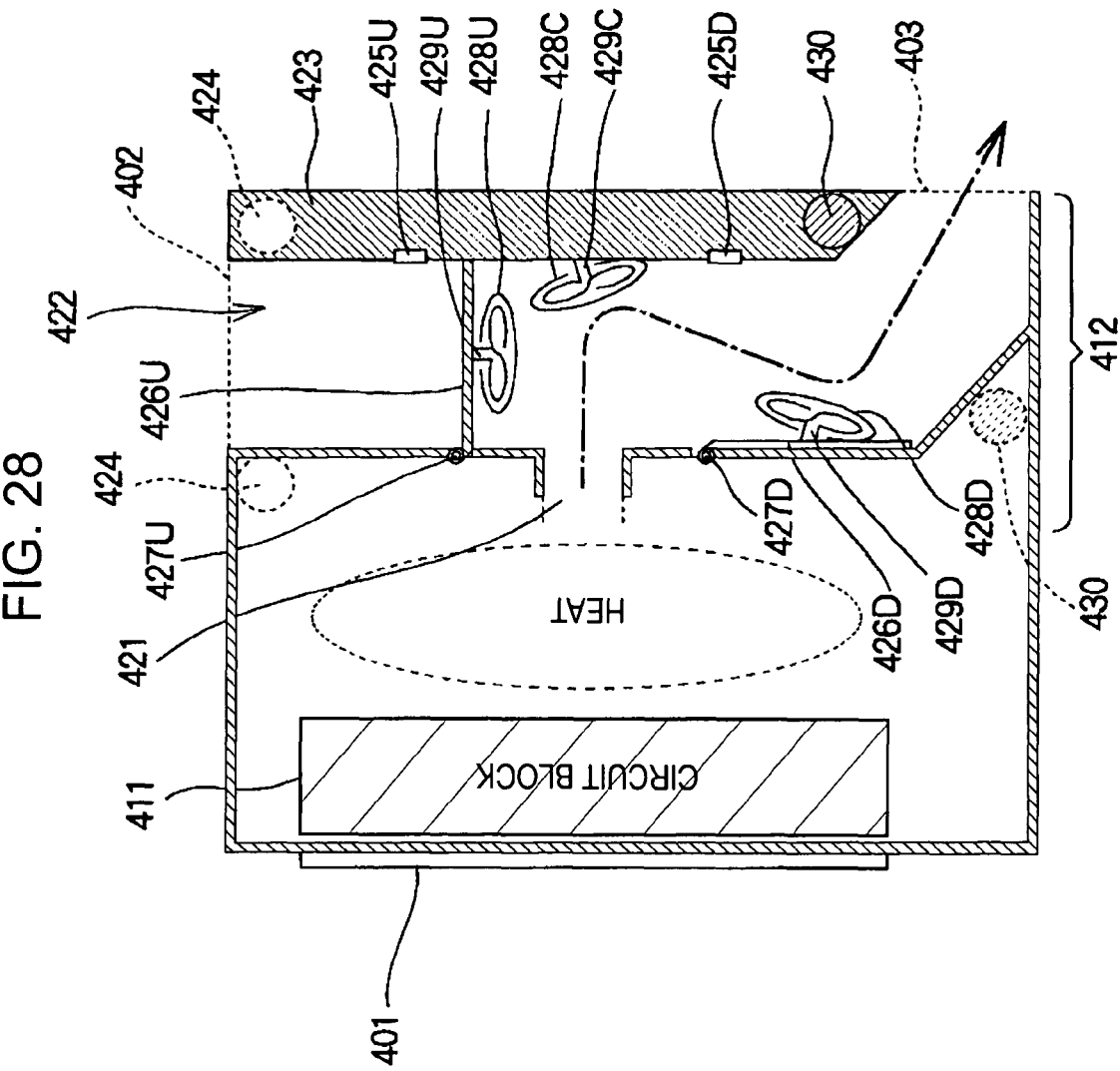
FIG. 28 illustrates a right side cross-sectional view of another structure of the air conditioner TV.
Figure 29:
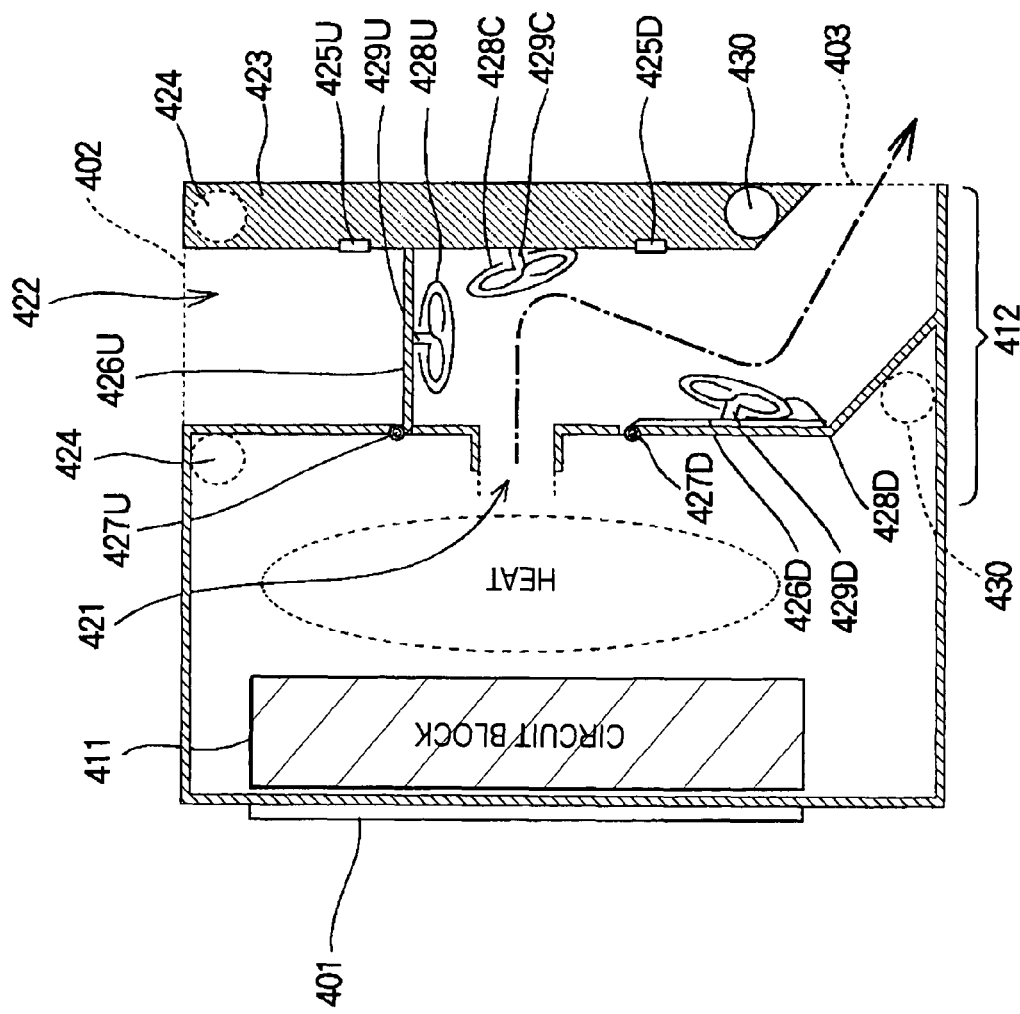
FIG. 29 illustrates a right side cross-sectional view of another structure of the air conditioner TV.

That is, FIGS. 28 and 29 illustrate right side cross-sectional views of another example of the air conditioner TV shown in FIG. 21. In the drawings, identical elements to those illustrated and described in relation to FIG. 23 are designated by identical reference numerals, and therefore, the descriptions are not repeated here. That is, the air conditioner TV shown in FIGS. 28 and 29 is basically identical to that shown in FIG. 23 except that the heat processing unit 412 further includes a cooling pipe 430.

As shown in FIGS. 28 and 29, the cooling pipe 430 is provided in the vicinity of the air vent 403 of the heat exhaust air duct 422.

That is, the cooling pipe 430 is disposed in the vicinity of the lower air vent 403 and outside the heat exhaust air duct 422 such that the cooling pipe 430 surrounds the cylindrical heat exhaust air duct 422. The cooling pipe 430 is filled with cooling liquid. The circulation (flow) of the cooling liquid in the cooling pipe 430 cools the heated air dissipated from the heat exhaust air duct 422 via the air vent 403.

In the air conditioner TV having the structure shown in FIGS. 28 and 29, for example, if the operation mode is the fall mode, the cooling liquid circulates in the cooling pipe 430, as shown by hatching in FIG. 28. Thus, the heated air transferred from the intake port 421 is cooled by the cooling liquid in the cooling pipe 430 immediately before being dissipated from the lower air vent 403. The heated air is then dissipated from the lower air vent 403.

That is, in a not-so-cold season like fall suitable for the fall mode, since heating of a room is sometimes not required, the heat transferred from the intake port 421 can be cooled by the cooling liquid in the cooling pipe 430 and can be dissipated from the lower air vent 403 in the fall mode.

In contrast, if the operation mode is the winter mode, the cooling liquid does not circulate in the cooling pipe 430, as shown in FIG. 29. Thus, the heated air transferred from the intake port 421 is dissipated from the lower air vent 403 without cooling the heated air.

That is, in a cold season like winter suitable for the winter mode, since heating of the room is required, the heated air transferred from the intake port 421 can be directly dissipated from the lower air vent 403 without cooling the heated air, like the air conditioner TV shown in FIG. 23.

In FIGS. 21 through 29, the circuit block 411 serving as a heat source includes the TV unit 440 which performs signal processing of the television receiver. However, a block included in the circuit block 411 serving as a heat source is not limited to the block that performs signal processing of the television receiver. Alternatively, the block may be a block that performs another signal processing. In this case, a whole apparatus including the circuit block 411 has a function corresponding to the signal processing performed by the block included in the circuit block 411.

In the present specification, the steps described with reference to the above-described flow charts are not necessarily executed in the above-described sequence, but may be executed in parallel or independently.

According to an embodiment of the present invention, an apparatus that functions as a plurality of apparatuses (e.g., an apparatus for displaying an image and a partition) can be provided.

It should be understood by those skilled in the art that various modifications, combinations, sub-combinations and alterations may occur depending on design requirements and other factors insofar as they are within the scope of the appended claims or the equivalents thereof.

What is claimed is:

1. An image display apparatus functioning as both an apparatus for displaying an image and a partition, comprising:
   image display means for displaying the image;
   reception means for receiving an operational input from a user; and
   drive control means for driving an actuator for moving the image display means to move the image display means;
   wherein the drive control means changes the arrangement of the image display apparatus functioning as the partition by moving the image display means on the basis of the operational input received by the reception means; and
   motion detection means for detecting motion information on motion of the image displayed on the image display means;
   wherein the image display apparatus provides, as an operation mode, a display mode in which the image display apparatus functions as the apparatus for displaying the image and a partition mode in which the image display apparatus functions as the partition and wherein, when the partition mode is enabled, the drive control means moves the image display means on the basis of the operational input and, when the display mode is enabled, the drive control means moves the image display means on the basis of the motion information detected by the motion detection means.

2. The image display apparatus according to claim 1, wherein, when the display mode is selected while the partition mode is enabled, the drive control means moves the image display means on the basis of the motion information using a position of the image display means when the display mode is enabled as a reference position.

3. The image display apparatus according to claim 1, wherein, when the display mode is selected while the partition mode is enabled, the drive control means moves the image display means to a default position and moves the image display means on the basis of the motion information using the default position as a reference position.

4. The image display apparatus according to claim 1, wherein, when the partition mode is selected while the display mode is enabled, the drive control means moves the image display means on the basis of the operational input.

5. The image display apparatus according to claim 1, further comprising:
   conversion means for converting an image signal of the image displayed on the image display means to a different image signal having higher image quality than the image displayed on the image display means, the conversion means including classification means, tap coefficient output means, and computing means;
   wherein the classification means classifies a pixel of the different image signal into one of a plurality of classes on the basis of the image signal and outputs a class code for representing the class of the pixel, the tap coefficient output means stores a tap coefficient obtained from a learning process for each of the plurality of classes and outputs a tap coefficient of a class indicated by the class code output from the classification means, and the computing means determines a pixel value of the different image signal by performing a computation based on the tap coefficient output from the tap coefficient output means and the image signal.

6. The image display apparatus according to claim 5, wherein the tap coefficient output means stores a tap coefficient corresponding to each position of the image display means and corresponding to each of the plurality of classes, and outputs a tap coefficient corresponding to a class indicated by the class code output from the classification means and corresponding to the position of the image display means.

7. A method of controlling an image display apparatus configured to function as both an apparatus for displaying an image and a partition, comprising the steps of:
   (a) receiving an operational input from a user; and
   (b) controlling an actuator configured to move image display means to move the image display means;
   wherein step (b) changes the arrangement of the image display apparatus functioning as the partition by moving the image display means on the basis of the operational input received in step (a); and
   (c) detecting motion information on motion of the image displayed on the image display means;
   wherein the method provides, as an operation mode, a display mode in which the image display apparatus functions as the apparatus for displaying the image and a partition mode in which the image display apparatus functions as the partition and wherein, when the partition mode is enabled, step (b) moves the image display means on the basis of the operational input and when the display mode is enabled, step (b) moves the image display means on the basis of the motion in formation detected in step (c).

8. A signal processing apparatus functioning as both an apparatus for processing a signal and furniture, comprising:
   signal processing means for processing an input signal;
   reception means for receiving an operational input from a user; and
   drive control means for controlling drive means for driving the signal processing apparatus on the basis of one of a signal obtained by signal processing of the signal processing means and the operational input received by the reception means; and
   motion detection means for detecting motion information on motion of the image displayed on the image display means;
   wherein the image display apparatus provides, as an operation mode, a display mode in which the image display apparatus functions as the apparatus for displaying the image and a partition mode in which the image display apparatus functions as the partition and wherein, when the partition mode is enabled, the drive control means moves the image display means on the basis of the operational input and, when the display mode is enabled, the drive control means moves the image display means on the basis of the motion information detected by the motion detection means.

9. A signal processing apparatus functioning as both an apparatus configured to process a signal and furniture, comprising:
   a signal processing unit configured to process an input signal;
   a reception unit configured to receive an operational input from a user; and
   a drive control unit configured to control a drive unit configured to drive the signal processing apparatus on the basis of one of a signal obtained by signal processing of the signal processing unit and the operational input received by the reception unit; and
   motion detection means for detecting motion information on motion of the image displayed on the image display means;
   wherein the image display apparatus provides, as an operation mode, a display mode in which the image display apparatus functions as the apparatus for displaying the image and a partition mode in which the image display apparatus functions as the partition and wherein, when the partition is enabled, the drive control means moves the image display means on the basis of the operational input and, when the display mode is enabled, the drive control means moves the image display means on the basis of the motion information detected by the motion detection means.

10. An image display apparatus functioning as both an apparatus configured to display an image and a partition, comprising:
   an image display unit configured to display the image;
   a reception unit configured to receive an operational input from a user; and
   a drive control unit configured to drive an actuator configured to move the image display unit to move the image display unit;
   wherein the drive control unit changes the arrangement of the image display apparatus functioning as the partition by moving the image display unit on the basis of the operational input received by the reception unit; and
   motion detection means for detecting motion information on motion of the image displayed on the image display means;
   wherein the image display apparatus provides, as an operation mode, a display mode in which the image display apparatus functions as the apparatus for displaying the image and a partition mode in which the image display apparatus functions as the partition and wherein, when the partition mode is enabled, the drive control means moves the image display means on the basis of the operational input and, when the display mode is enabled the drive control means moves the image display means on the basis of the motion information detected by the motion detection means.

* * * * *